United States Patent
Peng et al.

(10) Patent No.: US 12,335,873 B2
(45) Date of Patent: Jun. 17, 2025

(54) DATA TRANSMISSION METHOD AND DEVICE, AND COMPUTER-READABLE STORAGE MEDIUM

(71) Applicant: ZTE CORPORATION, Guangdong (CN)

(72) Inventors: Focai Peng, Shenzhen (CN); Jun Xu, Shenzhen (CN); Mengzhu Chen, Shenzhen (CN); Xuan Ma, Shenzhen (CN); Qiujin Guo, Shenzhen (CN); Bo Dai, Shenzhen (CN); Xiaoying Ma, Shenzhen (CN); Cuihong Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 288 days.

(21) Appl. No.: 17/670,166

(22) Filed: Feb. 11, 2022

(65) Prior Publication Data

US 2022/0248329 A1    Aug. 4, 2022

Related U.S. Application Data

(63) Continuation of application No. PCT/CN2020/109206, filed on Aug. 14, 2020.

(30) Foreign Application Priority Data

Aug. 15, 2019   (CN) .......................... 201910755610.5

(51) Int. Cl.
*H04W 52/02*   (2009.01)
(52) U.S. Cl.
CPC ............... *H04W 52/0235* (2013.01)

(58) Field of Classification Search
CPC ......... H04W 52/0235; H04W 52/0216; H04W 52/0232; H04W 52/0248; Y02D 30/70
See application file for complete search history.

(56) References Cited

U.S. PATENT DOCUMENTS

| | | | |
|---|---|---|---|
| 2012/0213137 A1* | 8/2012 | Jeong | H04W 52/0235 370/311 |
| 2018/0063883 A1* | 3/2018 | Nagaraja | H04W 16/32 |

(Continued)

FOREIGN PATENT DOCUMENTS

| | | | |
|---|---|---|---|
| AU | 2013374030 B2 * | 7/2016 | ........... H04B 7/0417 |
| CN | 110536387 A | 12/2019 | |

(Continued)

OTHER PUBLICATIONS

Office Action for RU Appl. No. 2022103569 dated Aug. 28, 2023 (with English translation, 10 pages).
Search Report for RU Appl. No. 2022103569 dated Aug. 24, 2023 (with English translation, 4 pages).

(Continued)

*Primary Examiner* — Dinh Nguyen
(74) *Attorney, Agent, or Firm* — Foley & Lardner LLP

(57) ABSTRACT

Disclosed are a data transmission method and device, and a computer-readable storage medium. The data transmission method includes: acquiring, by a first communication node, a configuration parameter configured by a second communication node for the first communication node, receiving, by the first communication node, a first message transmitted by the second communication node, where the first message includes a power saving signal or a power saving channel, and transmitting, by the first communication node, a second message to the second communication node.

21 Claims, 6 Drawing Sheets

(56) References Cited

U.S. PATENT DOCUMENTS

| | | |
|---|---|---|
| 2019/0053321 A1 | 2/2019 | Islam et al. |
| 2019/0110332 A1* | 4/2019 | Wikström ............. H04W 76/28 |
| 2019/0297577 A1* | 9/2019 | Lin ................... H04W 52/0235 |
| 2020/0037247 A1* | 1/2020 | Liao ................... H04W 72/0453 |
| 2020/0100178 A1* | 3/2020 | Kim ..................... H04W 52/028 |

FOREIGN PATENT DOCUMENTS

| | | |
|---|---|---|
| CN | 111083770 A | 4/2020 |
| EP | 3 751 891 A1 | 12/2020 |
| RU | 2453076 C2 | 6/2012 |
| RU | 2590906 C2 | 7/2016 |
| RU | 2625812 C2 | 7/2017 |
| WO | WO-2018/084971 A1 | 5/2018 |
| WO | WO-2019/032280 A1 | 2/2019 |
| WO | WO-2019/032886 A1 | 2/2019 |

OTHER PUBLICATIONS

Mediatek Inc., "Per serving cell MIMO layer configuration", 3GPP TSG-RAN WG2 #104, R2-1816539, Nov. 16, 2018, Spokane, USA (5 pages).

Second Office Action for CN Appl. No. 201910755610.5, dated Feb. 11, 2023 (with English translation, 19 pages).

CMCC, "Discussion on UE power saving schemes with adaption to UE traffic" 3GPP TSG RAN WG1 #96, R1-1903344, Mar. 1, 2019, Athens, Greece (14 pages).

International Search Report and Written Opinion for PCT Appl. No. PCT/CN2020/109206, mailed Nov. 5, 2020 (with English translation, 9 pages).

Mediatek Inc., "NR UE Power Saving Designs" 3GPP TSG RAN WG1 Meeting #96, R1-1903353, Mar. 1, 2019, Athens, Greece (28 pages).

Extended European Search Report for EP Appl. No. 20852143.5, dated Aug. 2, 2023 (9 pages).

Apple Inc., "Design of PDCCH-based Power Saving Signal and Channel", 3GPP TSG RAN WG1 #97, R1-1907345, May 17, 2019, Reno, USA (12 pages).

CATT, "Power saving scheme with UE adaptation to maximum MIMO layer", 3GPP TSG-RAN WG2 Meeting 106, R2-1905668, May 17, 2019, Reno, USA (3 pages).

First Office Action for CN Appl. No. 201910755610.5, dated Nov. 23, 2022 (with English translation, 28 pages).

Communication pursuant to Article 94(3) EPC for EP Appl. No. 20852143.5, dated Oct. 10, 2024 (6 pages).

* cited by examiner

DATA TRANSMISSION METHOD AND DEVICE, AND COMPUTER-READABLE STORAGE MEDIUM

CROSS-REFERENCE TO RELATED APPLICATIONS

This application claims the benefit of priority under 35 U.S.C. § 120 as a continuation of PCT Patent Application No. PCT/CN2020/109206, filed on Aug. 14, 2020, which claims priority to Chinese Patent Application No. 201910755610.5 filed on Aug. 15, 2019, the disclosure of each of which is incorporated herein by reference in its entirety.

TECHNICAL FIELD

The present application relates to radio communication networks, for example, to a data transmission method and device, and a computer-readable storage medium.

BACKGROUND

Discontinuous reception (DRX) refers to that a user equipment (UE) intermittently receives signals or channels transmitted by a base station instead of continuously receiving signals or channels transmitted by the base station. A cycle of the discontinuous reception of the UE is called a DRX cycle. One DRX cycle includes an ON duration of the DRX cycle (DRX-ON) and an OFF duration of the DRX cycle (DRX-OFF). However, the 3rd Generation Partnership Project (3GPP) has not yet determined what operations the base station and the UE can perform during the period before the DRX-ON to save power for the UE.

SUMMARY

The present application provides a data transmission method and apparatus, and a computer-readable storage medium, which can improve the transmission efficiency between a first communication node and a second communication node, thereby saving the power of the first communication node.

An embodiment of the present application provides a data transmission method. The method includes that: a first communication node acquires a configuration parameter configured by a second communication node for the first communication node; the first communication node receives a first message transmitted by the second communication node, where the first message includes a power saving signal or a power saving channel; and the first communication node transmits a second message to the second communication node.

An embodiment of the present application provides a data transmission method. The method includes that: a second communication node configures a configuration parameter for a first communication node; the second communication node transmits a first message to the first communication node, where the first message includes a power saving signal or a power saving channel; and the second communication node transmits a third message to the first communication node, where the third message includes a reference signal.

An embodiment of the present application provides a transmission apparatus. The transmission apparatus includes a processor, which is configured to, when executing a computer program, implement the data transmission method of any one of the above embodiments.

An embodiment of the present application further provides a computer readable storage medium, which is configured to store a computer program which, when executed by a processor, implements the data transmission method of any one of the above embodiments.

DETAILED DESCRIPTION

Figure 1:
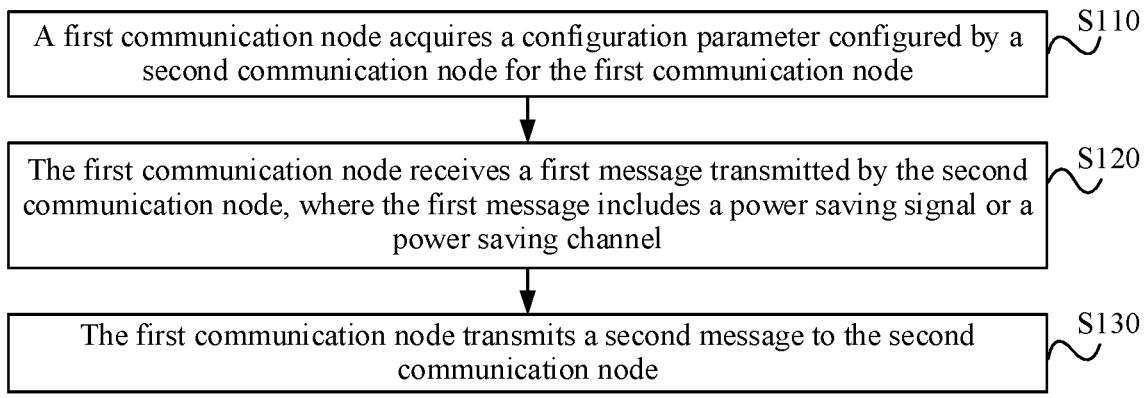
FIG. 1 is a flowchart of a data transmission method according to an embodiment.

Embodiments of the present application are described hereinafter in detail in conjunction with the drawings.

DRX refers to that a UE intermittently receives signals or channels transmitted by a base station instead of continuously receiving the signals or channels sent by the base station. A cycle of the discontinuous reception of the UE is called a DRX cycle, and one DRX cycle includes a DRX-ON and a DRX-OFF. If a UE receives special scheduling information for the UE when the UE is in the DRX-ON, then an inactive timer is started, and the inactive timer causes the UE to keep awake until the inactive timer fails. If the UE receives the special scheduling information for the UE again before the inactive timer fails, the inactive timer will be restarted. A period of time during which the UE remains awake (including the awaking time caused by the DRX-ON and the timer, the waiting time after a scheduling request is transmitted, etc.) is called activity time or active time. Accordingly, in one DRX cycle, the time other than the active time is called outside of active time.

According to 3GPP protocols, UE needs to receive a physical downlink control channel (PDCCH), downlink control information (DCI) carried by the PDCCH and a possible physical downlink shared channel (PDSCH) (the PDSCH is scheduled by the PDCCH) when the UE is in the DRX-ON, and may also transmit physical uplink shared channel (PUSCH) (the PUSCH is scheduled by the PDCCH). In the DRX-OFF (or the outside of active time), since a channel condition of the UE changes and a base station cannot know what the channel condition of the UE actually has changed during the DRX-OFF (or the outside of active time) of the UE, if the UE needs to receive or transmit data during the DRX-ON, the data transmission efficiency may be relatively low in this case. Low transmission efficiency will cause the UE to waste more electric energy and lead to overheating of a chip of the UE.

If the base station needs to know the channel condition (including a condition of beams) of the UE, the base station may transmit a channel-state information reference signal (CSI-RS) and a tracking reference signal (T-RS), and the base station may also allow the UE to transmit a sounding reference signal (SRS). When the base station transmits the above reference signal, it is necessary to specify transmission configuration indicator (TCI) information of the reference signal. The UE reports channel-state information (CSI) using the PUSCH or a physical uplink control channel (PUCCH) after obtaining the above reference signal through measurement. The base station may configure a PUCCH resource for reporting the CSI to the UE.

The base station may configure one or more radio network temporary identifiers (RNTIs) to the UE. The RNTI is used for receiving or transmitting a signal/channel (i.e. a signal or a channel).

Assuming that the base station knows that the UE needs to receive or transmit data (for example, there is data to be transmitted in a downlink direction, and another example is that the UE reports measurement results, such as channel quality indicator (CQI)) when the UE is in the DRX-ON, the base station may transmit a power saving signal or channel (the power saving signal or channel also belongs to the PDCCH) to wake up the UE or let the UE perform a certain operation when the base station is in the DRX-ON or the DRX-OFF. In this way, the UE can be prepared to receive or transmit the data, so that data transmission can be completed more efficiently, thereby saving power for the UE.

Assuming that the base station knows that the UE does not need to receive data or transmit data when the UE is in the DRX-ON, the base station may transmit the power saving signal or channel to the UE to skip this DRX-ON time (even several subsequent DRX-ON times). In this way, the UE does not need to wake up, thus saving power for the UE.

However, the 3GPP has not yet determined what the base station and the UE can do to save power in the period before the DRX-ON. Therefore, the embodiments of the present application provide a mobile communication network (including but not limited to the fifth-generation mobile communication network (5G)). The network architecture of the network may include network-side devices (for example, one or more types of base stations, a transmission node, an access point (AP), a relay, a Node B (NB), universal terrestrial radio access (UTRA), evolved universal terrestrial radio access (EUTRA), etc.) and terminals (a UE, a user equipment data card, a relay, a mobile device, etc.). The embodiments of the present application provide a data transmission method and apparatus, and a computer-readable storage medium which can be operated on the network architecture, which can make the second communication node know a link condition (including uplink and downlink) of the first communication node better, improve the transmission efficiency between the first communication node and the second communication node, and thereby save the power of the first communication node. The operating environment of the above data transmission method provided in the embodiments of the present application is not limited to the above network architecture.

The data transmission method and apparatus and technical effects are described below.

FIG. 1 is a flowchart of a data transmission method according to an embodiment. As shown in FIG. 1, the method provided in this embodiment is applicable to a first communication node (such as a UE). The method includes the steps below.

In S110, the first communication node acquires a configuration parameter configured by a second communication node for the first communication node.

In one embodiment, the manner for the first communication node to acquire the configuration parameter configured by the second communication node for the first communication node may be obtained through broadcast of the second communication node, or the configuration parameter transmitted by the second communication node may be directly received.

In one embodiment, the configuration parameter includes a demodulation reference signal (DM-RS) resource used for decoding a first message, and a scrambling code identity (ID) of the DM-RS.

In one embodiment, the configuration parameter indicates an initialization manner of a CSI-RS sequence, and that a power saving RNTI (PS-RNTI) is used as part of an initialization seed of the CSI-RS sequence.

In one embodiment, the configuration parameter includes a time offset of the CSI-RS transmitted earlier than the first message.

In one embodiment, the configuration parameter includes a maximum number of multi-input multi-output layers for one bandwidth part (BWP).

In this embodiment, if the configuration parameter does not include the maximum number of multi-input multi-output layers for the one BWP, the configuration parameter includes a maximum number of multi-input multi-output layers for a serving cell where the one BWP is located.

In S120, the first communication node receives a first message transmitted by the second communication node, where the first message includes a power saving signal or a power saving channel.

In one embodiment, the first message belonging to a primary cell is used for triggering the first communication node to transmit CSI of a plurality of serving cells to the second communication node.

In one embodiment, the first message includes a CSI-RS resource configured on a resource of a control-resource set (CORESET) of the first message and associated with the resource of the CORESET, an SRS resource configured for the first communication node and associated with the first message, a PUCCH resource configured for the first communication node and associated with the first message, and a PUSCH resource configured for the first communication node and associated with the first message.

In one embodiment, a to-be-transmitted bit in the first message may be scrambled according to a PS-RNTI.

In one embodiment, an encoded bit in the first message may be scrambled according to a PS-RNTI.

In one embodiment, an initialization seed of a DM-RS sequence in the first message may include a PS-RNTI.

In one embodiment, a cyclic redundancy check (CRC) bit of the first message may be scrambled according to a PS-RNTI.

In one embodiment, when the first communication node calculates CRC of the first message, L "0"s are added before original information to be calculated, where L is a positive integer.

In one embodiment, when receiving the first message, the first communication node assumes that a DM-RS of the first message and a synchronization signal block (SSB) have a same quasi-co-location (QCL) characteristic.

In S130, the first communication node transmits a second message to the second communication node.

In one embodiment, the second message is triggered by the first message.

In one embodiment, the manner for the first communication node to transmit the second message to the second communication node may be that the first communication node transmits an SRS to the second communication node according to the first message.

In one embodiment, the manner for the first communication node to transmit the second message to the second communication node may be that after the first message is decoded, the first communication node transmits aperiodic CSI to the second communication node by using a PUSCH.

A resource used when the aperiodic CSI is transmitted to the second communication node by using the PUSCH may be represented by a resource indication value (MV), or may be configured by a higher layer. This is not specifically limited in the embodiments of the present application.

In one embodiment, a to-be-transmitted bit in the PUSCH may be scrambled according to a PS-RNTI.

In one embodiment, an initialization seed of a DM-RS sequence in the PUSCH may include a PS-RNTI.

In one embodiment, a CRC bit in the PUSCH may be scrambled with a PS-RNTI.

In one embodiment, the manner for the first communication node to transmit the second message to the second communication node may be that after the first message is decoded, the first communication node transmits aperiodic CSI to the second communication node by using a PUCCH.

In this embodiment, a to-be-transmitted bit in the PUCCH may be scrambled according to a PS-RNTI.

In this embodiment, an initialization seed of a DM-RS sequence in the PUCCH may include a PS-RNTI.

In this embodiment, a CRC bit of the PUCCH may be scrambled with a PS-RNTI.

A PUCCH resource used when the first communication node transmits the aperiodic CSI is indicated by the first message. Specifically, a PUCCH resource identity used when the first communication node transmits the aperiodic CSI is implicitly indicated by the first message.

In one embodiment, on the basic of S110-S130 of the above embodiment, if the method may further include that the first communication node performs a BWP handover, where the BWP handover is triggered by the first message, in this embodiment, the manner for the first communication node to transmit the second message to the second communication node may be that when the BWP handover exists, the first communication node transmits CSI to the second communication node. In one embodiment, when the BWP handover exists, the manner for the first communication node to transmit the CSI to the second communication node may be that the first communication node transmits the CSI to the second communication node on an $X^{th}$ slot after the BWP handover is completed, where X is a positive integer.

In one embodiment, in a case where the second message is the CSI, the manner for the first communication node to transmit the CSI to the second communication node may be that the first communication node transmits the CSI to the second communication node according to a mask of the CSI.

In one embodiment, in a case where the second message is the CSI, the manner for the first communication node to transmit the CSI to the second communication node may be that the first communication node transmits CSI of a secondary cell defining a dormant behavior to the second communication node according to specific signaling.

In one embodiment, in a case where the second message is the CSI, the manner for the first communication node to transmit the CSI to the second communication node may be that the first communication node transmits CSI of a secondary cell configured with a temporary reference signal to the second communication node according to specific signaling.

Figure 2:
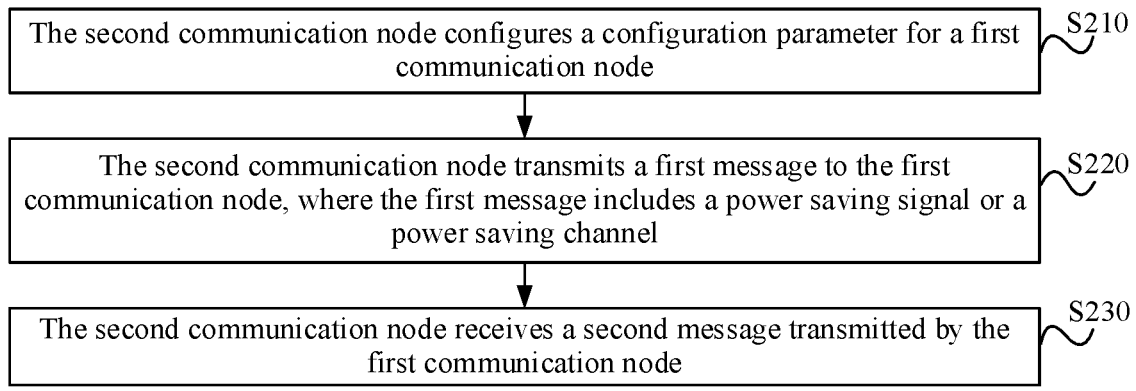
FIG. 2 is a flowchart of another data transmission method according to another embodiment.

FIG. 2 is a flowchart of another data transmission method according to an embodiment. As shown in FIG. 2, the method provided in this embodiment is applicable to a second communication node (such as a base station). The method includes the steps described below.

In S210, the second communication node configures a configuration parameter for a first communication node.

In one embodiment, the configuration parameter includes a DM-RS resource of the first message, and a scrambling code identity of the DM-RS.

In one embodiment, the configuration parameter indicates an initialization manner of a CSI-RS sequence, and that a PS-RNTI is used as part of an initialization seed of the CSI-RS sequence.

In one embodiment, the configuration parameter includes a time offset of the CSI-RS transmitted earlier than the first message.

In one embodiment, the configuration parameter includes a maximum number of multi-input multi-output layers for one BWP.

In one embodiment, in this embodiment, if the configuration parameter does not include the maximum number of multi-input multi-output layers for the one BWP, the configuration parameter includes a maximum number of multi-input multi-output layers for a serving cell where the one BWP is located.

In S220, the second communication node transmits a first message to the first communication node, where the first message includes a power saving signal or a power saving channel.

In one embodiment, the first message belonging to a primary cell is used for triggering the first communication node to transmit CSI of a plurality of serving cells to the second communication node.

In one embodiment, the first message includes a CSI-RS resource configured on a resource of a CORESET of the first message and associated with the resource of the CORESET, an SRS resource configured for the first communication node and associated with the first message, a PUCCH resource configured for the first communication node and associated with the first message, and a PUSCH resource configured for the first communication node and associated with the first message.

In one embodiment, a to-be-transmitted bit in the first message may be scrambled according to a PS-RNTI.

In one embodiment, an encoded bit in the first message may be scrambled according to a PS-RNTI.

In one embodiment, an initialization seed of a DM-RS sequence in the first message may include a PS-RNTI.

In one embodiment, a CRC bit of the first message may be scrambled with a PS-RNTI.

In S230, the second communication node receives a second message transmitted by the first communication node.

In one embodiment, the second message is triggered by the first message.

In one embodiment, the manner for the second communication node to receive the second message transmitted by the first communication node may be that the second communication node receives an SRS transmitted by the first communication node according to the first message.

In one embodiment, the manner for the second communication node to receive the second message transmitted by the first communication node may be that the second communication node receives aperiodic CSI transmitted by the first communication node by using a PUSCH.

In this embodiment, a to-be-transmitted bit in the PUSCH may be scrambled according to a PS-RNTI.

In this embodiment, an initialization seed of a DM-RS sequence in the PUSCH may include a PS-RNTI.

In this embodiment, a CRC bit of the PUSCH may be scrambled with a PS-RNTI.

In one embodiment, the manner for the second communication node to receive the second message transmitted by the first communication node may be that the second communication node receives aperiodic CSI transmitted by the first communication node by using a PUCCH.

In this embodiment, a to-be-transmitted bit in the PUCCH is scrambled according to a PS-RNTI.

In this embodiment, an initialization seed of a DM-RS sequence in the PUCCH may include a PS-RNTI.

In this embodiment, a CRC bit of the PUCCH may be scrambled with a PS-RNTI.

In one embodiment, in a case where the second message is the CSI, the manner for the second communication node to receive the second message transmitted by the first communication node may be that the second communication node receives the CSI transmitted by the first communication node according to a mask of the CSI.

In one embodiment, in a case where the second message is the CSI, the manner for the second communication node to receive the second message transmitted by the first communication node may be that the second communication node receives CSI of a secondary cell defining a dormant behavior transmitted by the first communication node according to specific signaling.

In one embodiment, in a case where the second message is the CSI, the manner for the second communication node to receive the second message transmitted by the first communication node may be that the second communication node receives CSI of a secondary cell configured with a temporary reference signal and transmitted by the first communication node according to specific signaling.

In one embodiment, the second communication may initialize an SRS sequence according to a PS-RNTI.

Figure 3:
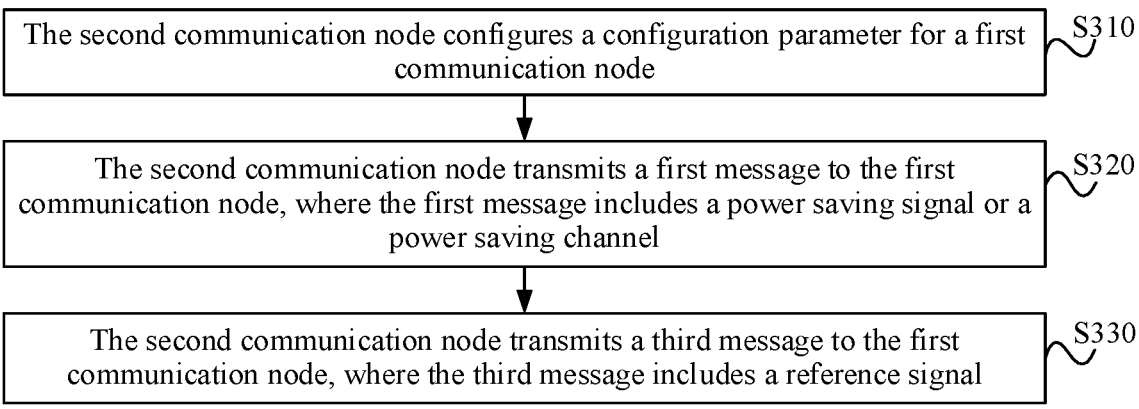
FIG. 3 is a flowchart of another data transmission method according to an embodiment.

FIG. 3 is a flowchart of another data transmission method according to an embodiment. As shown in FIG. 3, the method provided in this embodiment is applicable to a second communication node (such as a base station). The method includes the steps described below.

In S310, the second communication node configures a configuration parameter for a first communication node.

In one embodiment, the configuration parameter includes a DM-RS resource of the first message, and a scrambling code identity of the DM-RS.

In one embodiment, the configuration parameter indicates an initialization manner of a CSI-RS sequence, and that a PS-RNTI is used as part of an initialization seed of the CSI-RS sequence.

In one embodiment, the configuration parameter includes a time offset of the CSI-RS transmitted earlier than the first message.

In S320, the second communication node transmits a first message to the first communication node, where the first message includes a power saving signal or a power saving channel.

In one embodiment, a CRC bit of the first message may be scrambled with a PS-RNTI.

In this embodiment, the PS-RNTI is used for initializing a sequence in sequence generation, and the sequence is used for generating the reference signal described below.

In one embodiment, the first message includes a CSI-RS resource configured on a resource of a CORESET of the first message and associated with the resource of the CORESET, an SRS resource configured for the first communication node and associated with the first message, a PUCCH resource configured for the first communication node and associated with the first message, and a PUSCH resource configured for the first communication node and associated with the first message.

In S330, the second communication node transmits a third message to the first communication node, where the third message includes a reference signal.

In one embodiment, the third message is triggered by the first message.

Figure 4:
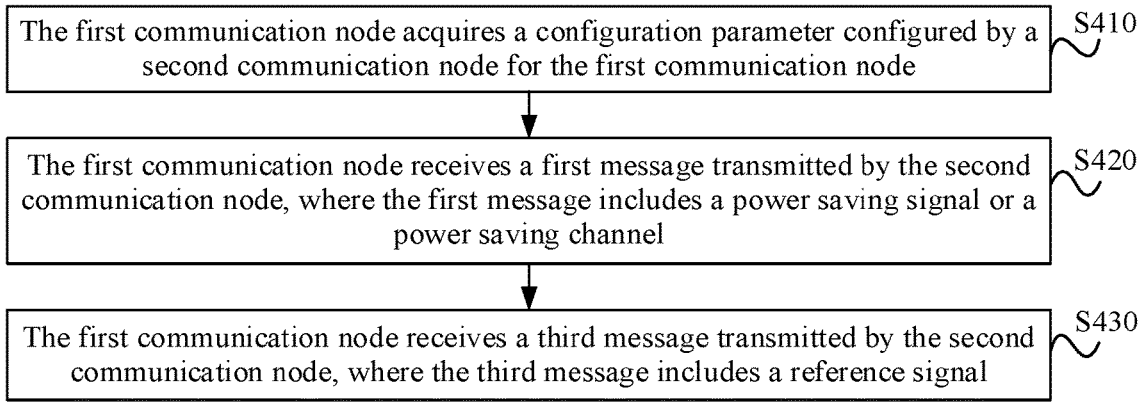
FIG. 4 is a flowchart of another data transmission method according to an embodiment.

FIG. 4 is a flowchart of another data transmission method according to an embodiment. As shown in FIG. 4, the method provided in this embodiment is applicable to a first communication node (such as a UE). The method includes the steps described below.

In S410, the first communication node acquires a configuration parameter configured by a second communication node for the first communication node.

In one embodiment, the configuration parameter includes a DM-RS resource used for decoding the first message, and a scrambling code identity of the DM-RS.

In one embodiment, the configuration parameter indicates an initialization manner of a CSI-RS sequence, and that a PS-RNTI is used as part of an initialization seed of the CSI-RS sequence.

In one embodiment, the configuration parameter includes a time offset of the CSI-RS transmitted earlier than the first message.

In S420, the first communication node receives a first message transmitted by the second communication node, where the first message includes a power saving signal or a power saving channel.

In one embodiment, a CRC bit of the first message may be scrambled with a PS-RNTI. That is, the first communication node may descramble the first message according to the PS-RNTI.

In one embodiment, the first message includes a CSI-RS resource configured on a resource of a CORESET of the first message and associated with the resource of the CORESET, an SRS resource configured for the first communication node and associated with the first message, a PUCCH resource configured for the first communication node and associated with the first message, and a PUSCH resource configured for the first communication node and associated with the first message.

In S430, the first communication node receives a third message transmitted by the second communication node, where the third message includes a reference signal.

In one embodiment, the third message is triggered by the first message.

Hereinafter, some exemplary embodiments are listed for explaining the data transmission method provided by the embodiments of the present application by taking the first communication node being a UE, the second communication node being a base station, and the first message being a power saving signal or a power saving channel (hereinafter referred to as a power saving signal/channel for simplicity) as examples.

Figure 5:
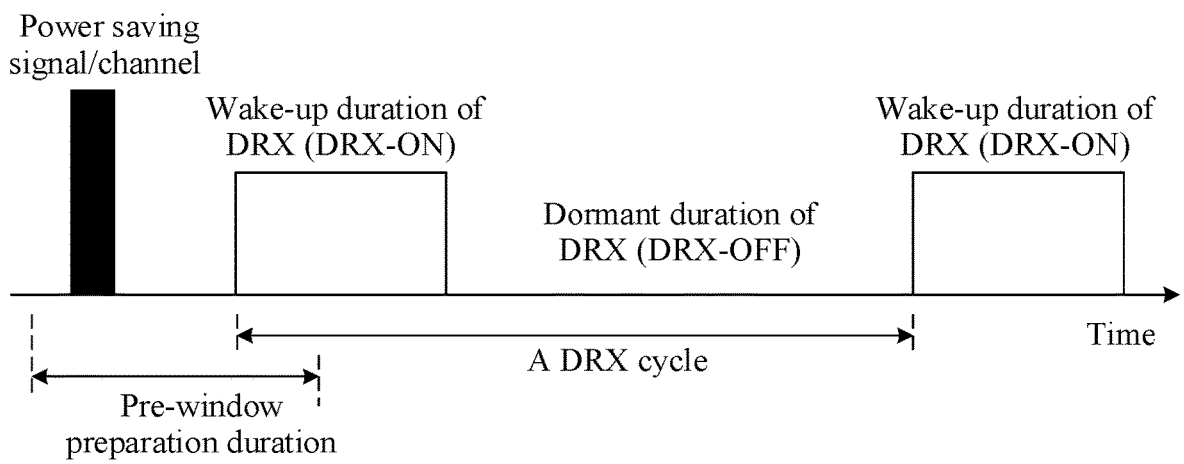
FIG. 5 is a time position diagram of a pre-window according to an embodiment.

FIG. 5 is a time position diagram of a pre-window according to an embodiment. As shown in FIG. 5, the pre-window (also known as preparation period) refers to a period before or early in DRX-ON. During a pre-window period, the UE is required to be ready to receive data transmitted by a base station or transmit data to a base station. In addition, in a carrier aggregation (CA) of 5G-New Radio Access Technology (NR), the base station can configure a plurality of secondary carriers (i.e., secondary cells (SCell)) to the UE. The SCell may be activated or deactivated in an operation process of the SCell. In order to save power for the UE, the base station may make one SCell in a deactivated state, but when the base station needs to use the one SCell, the base station needs to activate the one SCell quickly. In this activation process, the base station may activate the one SCell by cross-carrier scheduling or cross-carrier activation. The base station may configure a reference signal (such as a SSB, a CSI-RS, a TRS, a primary synchronization signal (PSS), a secondary synchronization signal (SSS), an SRS, a DM-RS, a phase tracking reference signal (PT-RS)), also known as a temporary reference signal (RS), so that the UE can perform synchronization, automatic gain control (AGC), CSI measurement and so on. After these tasks are completed, the transmission efficiency between the base station and the UE can be improved, so that the power of the UE can be saved. Embodiments of the present application are related to the pre-window and the temporary reference signal.

If a DRX cycle configured by the base station to the UE is large (e.g. 10240 ms), it is necessary for the base station (and UE) to use the pre-window (to transmit a reference signal, a measurement reference signal and report a channel condition) in order to obtain the channel condition in time; if a downlink signal/channel (e.g. a SSB, a CSI-RS, a TRS) received by UE last time exceeds a certain time (e.g. 100 ms), it is also necessary to use the pre-window; if the base station (or UE) needs to transmit a large amount of data (such as 100 MByte), it is also necessary to use the pre-window; if the UE needs to receive a paging message in a next period (e.g. 10 ms), it is also necessary to use the pre-window; in a scenario where a signal changes dramatically (e.g. high-speed rail and expressway), it is also necessary to use the pre-window; and if the base station does not configure DRX to the UE but uses the power saving signal/channel (enabling the UE to monitor/skip monitoring the PDCCH) having a larger transmission interval or cycle (e.g. 20480 ms), it is also necessary to use the pre-window.

In an operation for the pre-window, if the base station expects to obtain a downlink channel condition but does not need a uplink channel condition, then the base station may transmit a CSI-RS, and the UE may measure and report the CSI; if the base station needs to perform a beam management, the base station may transmit the CSI-RS, and the UE may transmit an associated SRS according to a measurement result of the CSI-RS; and if the base station may enable the UE to transmit the SRS to obtain the uplink channel condition.

In order to make decoding of the power saving signal/channel more reliable, a DM-RS of the power saving signal/channel may be copied and transmitted before the power saving signal/channel.

Figure 6:
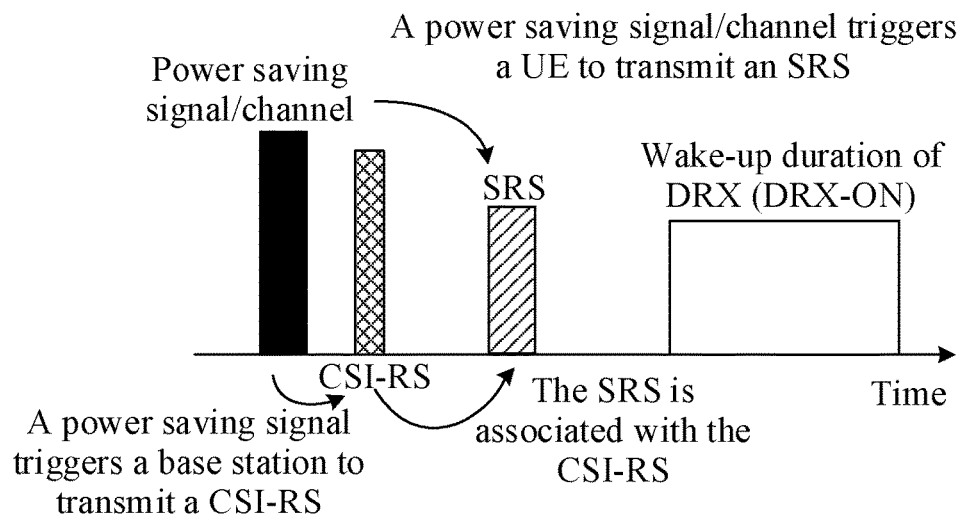
FIG. 6 is a schematic diagram illustrating that a power saving signal/channel triggers a base station to transmit a channel-state information reference signal (CSI-RS), a power saving signal/channel triggers a UE to transmit a sounding reference signal and the sounding reference signal is associated with the channel-state information reference signal according to an embodiment.

In a first exemplary implementation, FIG. 6 is a schematic diagram illustrating that a power saving signal/channel triggers a base station to transmit a channel-state information reference signal, a power saving signal/channel triggers a UE to transmit a sounding reference signal and the sounding reference signal is associated with the channel-state information reference signal according to an embodiment.

First, a base station configures some configuration parameters for the UE. These configuration parameters include a PS-RNTI, CSI-RS resources, a time offset of a transmission time of the CSI-RS relative to that of the power saving signal/channel, a parameter used for a sequence initialization value of the above CSI-RS, SRS resources, CSI-RS resources associated with the SRS, and an initialization value of an SRS sequence.

The PS-RNTI: the UE needs to check the RNTI at DRX-OFF. For example, the UE checks the RNTI during a period (e.g. the first 5 to 10 slots) before DRX-ON. The check content includes a power saving signal/channel, a PDCCH, DCI, a CSI-RS, a TRS, a DM-RS, a SSS, a PSS, a SSB and a PT-RS. In one embodiment, the base station needs to check the RNTI before DRX-ON of the UE and at DRX-ON time (or DRX active time of the UE). The check content includes an SRS (e.g. an SRS triggered by the power saving signal/channel), a physical random access channel (PRACH; e.g. the PRACH triggered by the power saving signal/channel), a PUCCH (e.g. a PUCCH for reporting CSI triggered by the power saving signal/channel), and a PUSCH (e.g. a PUSCH for reporting CSI triggered by the power saving signal/channel).

The CSI-RS resources: these resources may be one or more CSI-RS resources triggered by the power saving signal/channel. These resources are used for the base station to transmit the CSI-RS. These resources may be on different BWPs in different serving cells.

The time offset of transmission time of the CSI-RS relative to that of the power saving signal/channel: if the time offset is a negative number (unit may be slot or absolute time, such as milliseconds), it indicates that the CSI-RS is transmitted earlier than the power saving signal/channel; if the time offset is zero, it indicates that the CSI-RS and the power saving signal/channel are transmitted in a same slot; and if the time offset is a positive number, it indicates that the CSI-RS is transmitted later than the power saving signal/channel.

The parameter used for a sequence initialization value of the above CSI-RS is $n_{ID}$, and a value range of $n_{ID}$ is 0-1023. In sequence generation, the sequence is initialized with the PS-RNTI, and then used for generating a reference signal (e.g. a CSI-RS). For example, the CSI-RS may be scrambled using the PS-RNTI, i.e. the PS-RNTI is used for initializing a sequence (e.g. $n_{ID}=n_{PS\text{-}RNTI}$ or take 1024 modulo for the PS-RNTI to obtain an initialization value $n_{ID}=n_{PS\text{-}RNTI}$ mod 1024, i.e. the initialization value is low 10 bits of a binary value of the PS-RNTI). The base station may configure one specific value to initialize a sequence of the CSI-RS (e.g. $n_{ID}=0$). In one embodiment, the parameter $n_{ID}$ may also be applied to the TRS. In one embodiment, the user equipment initializes a reception sequence of the CSI-RS according to the PS-RNTI, and the user equipment initializes a reception sequence of the TRS according to the PS-RNTI. In one embodiment, the CSI-RS uses the PS-RNTI as part of an initialization seed. For example, the initialization seed $c_{init}$ is:

$$c_{init}=(2^{10}(N_{symb}^{slot}n_{s,f}^{\mu}+l+1)(2n_{ID}+1)+n_{ID})\bmod 2^{31}.$$

Here, $N_{symb}^{slot}$ is the number of symbols in one slot, $n_{s,f}^{\mu}$ is a slot identity of a current radio frame when a subcarrier interval is configured as $\mu$, and l is a symbol index, $n_{ID}=n_{PS\text{-}RNTI}$ mod 1024.

In one embodiment, the initialization seed $c_{init}$ may also be: $c_{init}=(2^{10}(N_{symb}^{slot}n_{s,f}^{\mu}+l+1)(2n_{ID}+1)+n_{ID}+n_{PS\text{-}RNTI})$ mod $2^{31}$.

Here, $n_{ID}$ is a parameter (e.g. $n_{ID}=0$) configured by a higher layer.

The SRS resources: these resources may be one or more resources triggered by the power saving signal/channel. These resources are used for the UE to transmit the SRS. These resources may be on different BWPs in different serving cells. In one embodiment, these SRS resources may be aperiodic. The transmission time of these SRSs has a time offset (slotOffset) relative to that of the power saving signal/channel. In one embodiment, a range of the time offset is 0 to 100 slots. In one embodiment, if a transmission moment of the SRS is not within a range of the DRX-ON or active time of the UE, the UE needs to transmit the SRS at a first slot of the DRX-ON. In one embodiment, the power saving signal/channel may indicate one time offset. In one embodiment, the power saving signal/channel may indicate a list (including multiple time offsets, and the UE may select a minimum and available time offset to transmit the SRS) of time offsets. In one embodiment, these SRS resources may be periodic or semi-persistent. In one embodiment, these SRS resources are transmitted by using 2 antenna ports. In one embodiment, the UE may transmit the SRS in turn on different BWPs. In one embodiment, the UE may transmit the SRS triggered by the power saving signal/channel in turn on different BWPs. In one embodiment, the UE may transmit the SRS triggered by the power saving signal/channel in turn on different BWPs of different serving cells.

The CSI-RS resources associated with the SRS described above: these CSI-RS resources may be the CSI-RS resources (i.e., the CSI-RS resources already listed above) triggered by the power saving signal/channel described above or other configured CSI-RS resources.

The initialization value of the SRS sequence is $c_{Init}$ and a value range of $c_{Init}$ is 0-1023. For example, the SRS may be scrambled using the PS-RNTI, i.e. the PS-RNTI is used for initializing a sequence (e.g. $c_{Init}=n_{PS\text{-}RNTI}$ or take 1024 modulus for the PS-RNTI to obtain an initialization value $c_{Init}=n_{PS\text{-}RNTI}$ mod 1024, that is, the initialization value is low 10 bits of a binary value of the PS-RNTI). The base station may configure a specific value to initialize a sequence of the SRS, for example, $c_{Init}=1023$, and the $c_{Init}$ is used for initializing a pseudo-random sequence c(i); and the pseudo-random sequence c(i) is used for generating a parameter $f_{gh}(\ )$ or v in the following group hopping function:

$$f_{gh}(n_{s,f}^{\mu}, l') = \left(\sum_{m=0}^{7} c(8(n_{s,f}^{\mu}N_{symb}^{slot} + l_0 + l') + m) \cdot 2^m\right)\bmod 30$$

$$v = 0; \text{ or}$$

$$f_{gh}(n_{s,f}^{\mu}, l') = 0$$

$$v = \begin{cases} c(n_{s,f}^{\mu}N_{symb}^{slot} + l_0 + l') & M_{sc,b}^{SRS} \geq 6N_{sc}^{RB} \\ 0 & \text{otherwise} \end{cases}.$$

Here, $n_{s,f}^{\mu}$ is a slot identity of the current radio frame when a subcarrier interval is configured as $\mu$, c(i) is a pseudo-random sequence, $N_{symb}^{slot}$ is a number of symbols in one slot, $I_0$ is a time domain starting position, l' is a symbol index of the SRS, mod is a modulo operation, v is a parameter for generating a sequence, $M_{sc,b}^{SRS}$ is a length of an SRS sequence, and $N_{sc}^{RB}$ is the number of subcarriers on one resource block (RB).

In one embodiment, when the base station receives the SRSs, the base station initializes a reception sequence (e.g. $c_{Init}=n_{PS\text{-}RNTI}$ mod 1024) of an SRS according to a PS-RNTI. In one embodiment, the user equipment initializes a sequence of an SRS according to a PS-RNTI. In one embodiment, the SRS uses the PS-RNTI as part of an initialization seed. For example, the initialization seed u (i.e. a sequence group identity) is:

$$u=(f_{gh}(n_{s,f}^{\mu},l')+n_{ID}^{SRS})\bmod 30.$$

Here, $f_{gh}$ is a group hopping function, $n_{s,f}^{\mu}$ is a slot identity of a current radio frame when a subcarrier interval is configured as $\mu$, and l' is a symbol index of the SRS, $n_{ID}^{SRS}=n_{PS\text{-}RNTI}$ mod 1024.

The use of the SRS is configured as "Power Saving", or the use of the SRS may be configured as "beamManagement".

Secondly, the base station transmits the power saving signal/channel. In one embodiment, the power saving signal/channel is a PDCCH. In one embodiment, the PS-RNTI may be used for scrambling a CRC bit of the power saving signal/channel; the PS-RNTI is used for scrambling a load (or a bit before coding) of the power saving signal/channel; and the PS-RNTI is used for scrambling a coded bit of the power saving signal/channel. The power saving signal/ channel may be directed to only one UE or to a group of UEs. If the power saving signal/channel is directed to only one UE, the power saving signal/channel is scrambled using a Cell-RNTI (C-RNTI) of the UE, or is scrambled using the PS-RNTI, or is scrambled using both the PS-RNTI and the C-RNTI. For example, when scrambling is performed, the last 16 bits of a 24-bit CRC are scrambled using the C-RNTI (for example, the last 16 bits of the 24-bit CRC are modulo-2 added with the binary bits of the C-RNTI, and then the last 16 bits of the 24-bit CRC are replaced with the result of modulo-2 addition; and in one embodiment, the first 16 bits of the 24-bit CRC are modulo-2 added with the binary bits of the C-RNTI, and then the first 16 bits of the 24-bit CRC are replaced with the result of the modulo-2 addition), and the first 24−16=8 bits of the 24-bit CRC are scrambled using the last 8 bits of the PS-RNTI or the first 8 bits of the PS-RNTI; or the last 16 bits of the 24-bit CRC are scrambled using the PS-RNTI, and the first 24−16=8 bits of the 24-bit CRC are scrambled using the last 8 bits of C-RNTI or the first 8 bits of the C-RNTI; or the PS-RNTI and the C-RNTI are modulo-2 added and then scrambled using the last 16 bits of the 24-bit CRC using the modulo 2-added value.

In one embodiment, the load (or a bit before encoding) a(i) of the power saving signal/channel being scrambled using the PS-RNTI includes the following operation:

$$\tilde{a}(i)=(a(i)+c(i))\bmod 2$$

Here, $\tilde{a}(i)$ is a scrambled bit, $c(i)$ is a scrambling sequence, and mod 2 (i.e. modulo-2 addition) is a modulo of 2 over the sum of $\tilde{a}(i)$ and $c(i)$. The scrambling sequence is initialized by using the following initialization seed $c_{init}$:

$$c_{init}=n_{PS\text{-}RNTI};\text{ or}$$

$$c_{init}=n_{PS\text{-}RNTI}\bmod 2^{10}.$$

Here, $n_{PS\text{-}RNTI}$ is a value of the PS-RNTI. In one embodiment, $c_{init}$ is a physical cell identifier (PCI) (i.e. $c_{init}=N_{ID}^{cell}$).

In one embodiment, an encoded bit b(i) of the power saving signal/channel being scrambled using the PS-RNTI includes the following operation:

$$\tilde{b}(i)=(b(i)+c(i))\bmod 2$$

Here, $\tilde{b}(i)$ is a scrambled bit, $c(i)$ is a scrambling sequence, and mod 2 (i.e. modulo-2 addition) is a modulo of 2 over the sum of $\tilde{b}(i)$ and. The scrambling sequence is initialized by using the following initialization seed $c_{init}$: $c_{init}=(n_{RNTI}\cdot 2^{16}+n_{ID})\bmod 2^{31}$.

Here, $n_{RNTI}$ is a value ($n_{RNTI}=n_{PS\text{-}RNTI}$) of the PS-RNTI, and $n_{ID}$ is a parameter configured by a higher layer. In one embodiment, a value of $n_{RNTI}$ is 0 (i.e. $n_{RNTI}=0$). In one embodiment, $n_{ID}$ is a PCI (i.e. $N_{ID}^{cell}$). In one embodiment, $n_{RNTI}$ is a value ($n_{RNTI}=n_{PS\text{-}RNTI}$) of the PS-RNTI, and $n_{ID}$ is a value ($n_{RNTI}=n_{C\text{-}RNTI}$) of the C-RNTI. In one embodiment, $n_{RNTI}$ is a value ($n_{RNTI}=n_{C\text{-}RNTI}$) of the C-RNTI, and $n_{ID}$ is a value ($n_{RNTI}=n_{PS\text{-}RNTI}$) of the PS-RNTI.

In one embodiment, when the base station calculates CRC of the power saving signal/channel, L "0"s need to be added before original information to be calculated. In one embodiment, when the UE calculates CRC of the power saving signal/channel, L "0"s need to be added before original information to be calculated. L is a positive integer, such as L=24. In one embodiment, when the base station or the UE calculates CRC of the power saving signal/channel, a CRC register is initialized to full "0".

If the power saving signal/channel is directed to a group of UEs, the power saving signal/channel is scrambled using the PS-RNTI. For example, when scrambling is performed, the last 16 bits of the 24-bit CRC are scrambled using the PS-RNTI, or the first 16 bits of the 24-bit CRC are scrambled using the PS-RNTI. Similar to the above method, in one embodiment, the user equipment descrambles the power saving signal/channel according to the PS-RNTI. In one embodiment, the user equipment descrambles CRC of the power saving signal/channel according to the PS-RNTI.

In one embodiment, the PS-RNTI described above may be pre-configured by the base station (e.g. configured by radio resource control (RRC) signaling) or calculated (the base station and the UE use the same calculation method). For example, PS-RNTI=Slot+80*CORESET, where Slot is a slot identity where the power saving signal/channel is located, and CORESET is a control-resource set identity where the power saving signal/channel is located. In one embodiment, a value of the CORESET is a search space identity. In one embodiment, PS-RNTI=Slot+160*CORESET. In one embodiment, PS-RNTI=Slot+80*CORESET+800*CCE, where a CCE is a minimum control channel element (CCE) identity used by the power saving signal/channel. In one embodiment, PS-RNTI=Slot+160*CORESET+1600*CCE. In one embodiment, PS-RNTI=Slot+80*CORESET+320*BWP, where BWP is a BWP identity where the power saving signal/channel is located. In one embodiment, PS-RNTI=Slot+80*CORESET+320*BWP+1280*Carrier, where Carrier is a carrier identity or a serving cell identity where the power saving signal/channel is located.

In one embodiment, when the UE receives the power saving signal/channel, it may be assumed that the power saving signal/channel and a SSB are of quasi-co-location (QCL). In one embodiment, when the UE receives the power saving signal/channel, it may be assumed that a DM-RS of the power saving signal/channel and a SSB are of quasi-co-location. In one embodiment, when the UE receives the power saving signal/channel, it may be assumed that an antenna port of a DM-RS of the power saving signal/channel and a SSB are of quasi-co-location. In one embodiment, when the UE receives the power saving signal/channel, it may be assumed that a DM-RS of the power saving signal/channel and a CSI-RS are of quasi-co-location. In one embodiment, when the UE receives the power saving signal/channel, it may be assumed that an antenna port of a DM-RS of the power saving signal/channel and a CSI-RS are of quasi-co-location. In one embodiment, when the UE receives the power saving signal/channel, it may be assumed that a DM-RS of the power saving signal/channel and a TRS are of quasi-co-location. In one embodiment, when the UE receives the power saving signal/channel, it may be assumed that an antenna port of a DM-RS of the power saving signal/channel and a TRS are of quasi-co-location. In one embodiment, when the UE receives the power saving signal/channel, it may be assumed that a CORESET of the power saving signal/channel and the scheduled CORESET recently are of quasi-co-location. In one embodiment, when the UE receives the power saving signal/channel, it may be assumed that a CORESET of the power saving signal/channel and the scheduled CORESET having the minimum ID recently are of quasi-co-location. In one embodiment, when the UE receives the power saving signal/channel, a SSB may be used as reference of a spatial receive (Rx) parameter of the power saving signal/channel. In one embodiment, when the UE receives the power saving signal/channel, a SSB may be used as reference of a spatial Rx parameter of a DM-RS of the power saving signal/channel. In one embodiment, when the UE receives the power saving signal/channel, a CSI-RS or a TRS may be used as reference of a spatial Rx parameter of the power saving signal/channel. In one embodiment, when the UE receives the power saving signal/channel, a CSI-RS or a TRS may be used as reference of a spatial Rx parameter of a DM-RS of the power saving signal/channel. In one embodiment, when the UE receives the power saving signal/channel, a CORESET scheduled recently may be used as reference of a spatial Rx parameter of the power saving signal/channel. In one embodiment, when the UE receives the power saving signal/channel, a CORESET scheduled recently may be used as reference of a spatial Rx parameter of a CORESET of the power saving signal/channel. In one embodiment, when the UE receives the power saving signal/channel, a CORESET having the minimum ID scheduled recently may be used as reference of a spatial Rx parameter of a CORESET of the power saving signal/channel. In one embodiment, the power saving signal/channel is configured as a fourth type (QCL-TypeD) of QCL. In one embodiment, a CORESET of the power saving signal/channel is configured as a QCL-TypeD. In one embodiment, a DM-RS of the power saving signal/channel is configured as a QCL-TypeD. In one embodiment, a DM-RS port of the power saving signal/channel is configured as a QCL-TypeD. In one embodiment, the power saving signal/channel is configured as a QCL-TypeD having a same characteristic of a QCL-TypeD of the CSI-RS. In one embodiment, a CORESET of the power saving signal/channel is configured as a QCL-TypeD having a same characteristic of a QCL-TypeD of the CSI-RS. In one embodiment, a DM-RS of the power saving signal/channel is configured as a QCL-TypeD having a same characteristic of a QCL-TypeD of the CSI-RS. In one embodiment, a DM-RS port of the power saving signal/channel is configured as a QCL-TypeD having a same characteristic of a QCL-TypeD of the CSI-RS. In one embodiment, the power saving signal/channel is configured as a QCL-TypeD having a same characteristic of a QCL-TypeD of the SSB. In one embodiment, a CORESET of the power saving signal/channel is configured as a QCL-TypeD having a same characteristic of a QCL-TypeD of the SSB. In one embodiment, a DM-RS of the power saving signal/channel is configured as a QCL-TypeD having a same characteristic of a QCL-TypeD of the SSB. In one embodiment, a DM-RS port of the power saving signal/channel is configured as a QCL-TypeD having a same characteristic of a QCL-TypeD of the SSB. In one embodiment, in the configurations described above, if the QCL-TypeD may be configured, the the QCL-TypeD is configured as the QCL-TypeD.

Thirdly, the base station transmits the CSI-RS or the TRS. The base station may transmit one or more CSI-RSs or the TRSs. Such signals may be triggered by the power saving signal/channel, or independent of the power saving signal/channel. If a CSI-RS signal transmitted by the base station is triggered by the power saving signal/channel, the power saving signal/channel has 0 bit or 1 bit or 2 bits or 3 bits indicating what resource is used to transmit the CSI-RS (for UEs that do not support power saving technology, this may be 0 bit; or the UE will ignore these bits). In one embodiment, when the UE receives the CSI-RS or TRS, it may be assumed that the CSI-RS or TRS and a SSB are of quasi-co-location. In one embodiment, when the UE receives the CSI-RS or TRS, it may be assumed that the CSI-RS or TRS and the power saving signal/channel are of quasi-co-location. In one embodiment, when the UE receives the CSI-RS or TRS, it may be assumed that the CSI-RS or TRS and a DM-RS of the power saving signal/channel are of quasi-co-location. In one embodiment, when the UE receives the CSI-RS or TRS, it may be assumed that the CSI-RS or TRS and an antenna port of a DM-RS of the power saving signal/channel are of quasi-co-location. In an embodiment, the CSI-RS is configured as a QCL-TypeD. In one embodiment, the TRS is configured as a QCL-TypeD. In one embodiment, the CSI-RS is configured as a QCL-TypeD having a same characteristic of a QCL-TypeD of the power saving signal/channel. In one embodiment, the CSI-RS is configured as a QCL-TypeD having a same characteristic of a QCL-TypeD of a CORESET of the power saving signal/channel. In one embodiment, the CSI-RS is configured as a QCL-TypeD having a same characteristic of a QCL-TypeD of a DM-RS of the power saving signal/channel. In one embodiment, the CSI-RS is configured as a QCL-TypeD having a same characteristic of a QCL-TypeD of a DM-RS port of the power saving signal/channel. In one embodiment, when the UE receives the CSI-RS or TRS, the SSB may be used as reference of a spatial RX parameter of the CSI-RS or TRS. In one embodiment, when the UE receives the CSI-RS or TRS, the power saving signal/channel may be used as reference of a spatial RX parameter of the CSI-RS or TRS. In one embodiment, when the UE receives the CSI-RS or TRS, a DM-RS of the power saving signal/channel may be used as reference of a spatial RX parameter of the CSI-RS or TRS. In one embodiment, when the UE receives the CSI-RS or TRS, an antenna port of a DM-RS of the power saving signal/channel may be used as reference of a spatial RX parameter of the CSI-RS or TRS. If the base station transmits multiple times such power saving signals/channel or multiple such power saving signals/channels (e.g. repeatedly transmitting N=4 times; or transmitting the same content by using multiple beams), the base station needs to transmit multiple CSI-RSs/TRSs (for example, each CSI-RS/TRS corresponds to one power saving signal/channel) based on a triggering condition. In one embodiment, the UE only needs to report CSI (including a timing relationship) according to the last power saving signal/channel. In one embodiment, the UE only needs to report CSI (including a timing relationship) according to the first power saving signal/channel. In one embodiment, the UE only needs to report CSI (including a timing relationship) according to the power saving signal/channel which is first successfully decoded. In one embodiment, the UE only needs to transmit an SRS (including a timing relationship) according to the last power saving signal/channel. In one embodiment, the UE only needs to report CSI (including a timing relationship) according to the power saving signal/channel on the best beam. In one embodiment, the base station may transmit power saving signals/channels on a plurality of CORESETs (for example, a respective power saving signal/channel is transmitted on each CORESET; as another example, three CORESETs are selected, and a respective power saving signal/channel is transmitted on each CORESET). In one embodiment, the UE reports CSI (including a reported timing relationship) according to a CORESET having the best reception quality (e.g. the best beam; or the highest RSRP). In one embodiment, a time offset (relative to the power saving signal/channel) of CSI reported by the UE is max (X, Y), where X is a time offset configured by the base station, Y is a time difference of the power saving signal/channel relative to DRX-ON, and max( ) is a larger one of X and Y. In one embodiment, a time offset (relative to the power saving signal/channel) of CSI reported by the UE is min (X, Y), where X is a time offset configured by the base station, Y is a time difference of the power saving signal/channel relative to DRX-ON, and min( ) is a smaller one of X and Y. In one embodiment, the UE only needs to transmit an SRS (including the timing relationship) according to the power saving signal/channel on the best beam. In one embodiment, a set of CSI-RS resource groups may include multiple CSI-RS resource sets. In one embodiment, a set of CSI-RS resource groups may include CSI-RS resource sets of multiple carriers. In one embodiment, a CSI triggering state may be associated with one or more (up to three) CSI resource configurations, and one CSI resource configuration may include one or more CSI-RS resource sets. CSI triggering conditions are shown in Tables 1 to 3 below.

TABLE 1

| Triggering value of 1-bit CSI-RS of saving signal/channel | Meaning |
| --- | --- |
| 0 | No CSI-RS triggering |
| 1 | The CSI-RS is transmitted on a set of CSI-RS resources or a first set of resources or a first set of CSI-RS resource sets or a first set of CSI-RS resource groups configured by the base station; or the CSI-RS is transmitted on a CSI-RS resource configuration associated with a first CSI triggering state; or the CSI-RS is transmitted on a CSI-RS resource associated with a first TCI state; or the CSI-RS is transmitted on a CSI-RS resource group associated with a first TCI state; or the CSI-RS is transmitted on a CSI resource group associated with a first TCI state; or the CSI-RS is transmitted on a CSI resource configuration associated with a first TCI state. |

TABLE 2

| Triggering value of 2-bit CSI-RS of power saving signal/channel | Meaning |
| --- | --- |
| 00 | No CSI-RS triggering |
| 01 | The CSI-RS is transmitted on a first set of resources or a first set of CSI-RS resource sets or a first set of CSI-RS resource groups configured by the base station; or the CSI-RS is transmitted on a CSI resource configuration associated with a first CSI triggering state. |
| 10 | The CSI-RS is transmitted on a second set of resources or a second set of CSI-RS resource sets or a second set of CSI-RS resource groups configured by the base station; or the CSI-RS is transmitted on a CSI resource configuration associated with a second CSI triggering state. |
| 11 | The CSI-RS is transmitted on a third set of resources or a third set of CSI-RS resource sets or a third set of CSI-RS resource groups configured by the base station; or the CSI-RS is transmitted on a CSI resource configuration associated with a third CSI triggering state. |

TABLE 3

| Triggering value of 3-bit CSI-RS of power saving signal/channel | Meaning |
| --- | --- |
| 000 | No CSI-RS triggering and the UE has no corresponding SRS to transmit |
| 001 | The CSI-RS is transmitted on a first set of resources configured by the base station and the UE has no corresponding SRS to transmit. |
| 010 | The CSI-RS is transmitted on a second set of resources configured by the base station and the UE has no corresponding SRS to transmit. |
| 011 | The CSI-RS is transmitted on a third set of resources configured by the base station and the UE has no corresponding SRS to transmit. |
| 100 | No CSI-RS triggering but the UE transmits the SRS on a first set of resources. |
| 101 | The CSI-RS is transmitted on a first set of resources configured by the base station and the UE needs to transmit the SRS on an SRS resource associated with the CSI-RS. |
| 110 | The CSI-RS is transmitted on a second set of resources configured by the base station and the UE needs to transmit the SRS on an SRS resource associated with the CSI-RS. |
| 111 | The CSI-RS is transmitted on a third set of resources configured by the base station and the UE needs to transmit the SRS on an SRS resource associated with the CSI-RS. |

In one embodiment, a transmission operation of the CSI-RS triggered by the power saving signal/channel is the same as a transmission operation of the CSI-RS triggered by a scheduling DCI (or a scheduling PDCCH; e.g. DCI Format 0_1) (where the scheduling PDCCH is transmitted/received at the DRX active time of the UE). In one embodiment, a transmission operation (for example, perform transmission at outside of the DRX active time of the UE) of the CSI-RS triggered by the power saving signal/channel is the same as a transmission operation of the CSI-RS triggered by a scheduling DCI (for example, a CSI-RS triggered by the scheduling PDCCH is transmitted at the DRX active time of the UE). In one embodiment, a reception operation of the CSI-RS triggered by the power saving signal/channel is the same as a reception operation of the CSI-RS triggered by the scheduling DCI. In one embodiment, a reception operation (for example, perform receiving at outside of the DRX active time of the UE, and perform receiving at DRX-OFF) of the CSI-RS triggered by the power saving signal/channel is the same as a reception operation of the CSI-RS triggered by the scheduling DCI. In one embodiment, a CSI report operation triggered by the power saving signal/channel is the same as a CSI report operation triggered by the scheduling DCI. In one embodiment, a CSI report operation (for example, perform reporting at outside of the DRX active time of the UE, and perform reporting at DRX-OFF) triggered by the power saving signal/channel is the same as a CSI report operation triggered by a scheduling DCI (where a CSI report triggered by the scheduling PDCCH is transmitted at the DRX active time of the UE). In one embodiment, if the UE is configured with DRX, the UE should report the most recent CSI measurement result occurring outside of the DRX active time. In one embodiment, if the UE is configured with DRX, the UE should report the most recent CSI measurement result triggered by the power saving signal/channel outside of the DRX active time. In one embodiment, if the UE is configured with DRX, the UE should report the most recent CSI measurement result triggered by the power saving signal/channel. In one embodiment, a transmission operation of the TRS triggered by the power saving signal/channel is the same as a transmission operation of the TRS triggered by the scheduling DCI. In one embodiment, a reception operation of the TRS triggered by the power saving signal/channel is the same as a reception operation of the TRS triggered by the scheduling DCI.

Then, the base station triggers the UE to transmit an SRS. The UE may transmit one or more SRSs. The SRSs may be triggered by the power saving signal/channel or the DCI. If the SRS signals transmitted by the UE are triggered by the power saving signal/channel, the power saving signal/channel has 1 bit or 2 bits indicating what resource is used to transmit the SRS. In one embodiment, if the UE receives two or more power saving signals/channels having inconsistent contents, for example, one power saving signal/channel requires the UE to transmit an SRS and the other power saving signal/channel does not require the UE to transmit an SRS, and then the UE will not transmit the SRS. In one embodiment, if the UE receives two or more power saving signals/channels having inconsistent contents, the UE need to transmit the SRS. In one embodiment, if the UE receives two or more power saving signals/channels having inconsistent contents, the UE performs according to a power saving signal/channel having the minimum CCE identity. In one embodiment, if the UE receives two or more power saving signals/channels having inconsistent contents, the UE performs according to a power saving signal/channel having the maximum CCE aggregation degree (if the aggregation degree is the same, the UE performs according to the minimum power saving signal/channel having the minimum CCE identity). See Tables 4 and 5 below.

TABLE 4

| Triggering value of 1-bit SRS of power saving signal/channel | Meaning |
| --- | --- |
| 0 | No SRS triggering |
| 1 | The UE transmits the SRS on a set of SRS resources or a first set of SRS resources or a first set of SRS resource sets or a first set of SRS resource groups configured by the base station. |

TABLE 5

| Triggering value of 2-bit SRS of power saving signal/channel | Meaning |
| --- | --- |
| 00 | No SRS triggering |
| 01 | The UE transmits the SRS on a first set of SRS resources or a first set of SRS resource sets or a first set of SRS resource groups configured by the base station. |
| 10 | The UE transmits the SRS on a second set of SRS resourcesor a second set of SRS resource sets or a second set of SRS resource groups configured by the base station. |
| 11 | The UE transmits the SRS on a third set of SRS resources or a third set of SRS resource sets or a third set of SRS resource groups configured by the base station. |

In one embodiment, a transmission operation of the SRS triggered by the power saving signal/channel is the same as a transmission operation of the SRS triggered by a scheduling DCI (or a scheduling PDCCH; e.g. DCI Format 0_1) (where the SRS triggered by the scheduling DCI is transmitted at the DRX active time of the UE). In one embodiment, a transmission operation (such as the SRS is transmitted at outside of the DRX active time of the UE; at DRX-OFF) of the SRS triggered by the power saving signal/channel is the same as a transmission operation of the SRS triggered by the scheduling DCI. In one embodiment, a transmission operation of the SRS triggered by the power saving signal/channel is the same as a transmission operation of the SRS triggered by a group common DCI Format 2_3 (where the SRS triggered by the group common DCI Format 2_3 is transmitted at the DRX active time of the UE).

After the above operation is performed, the UE may measure a channel condition of the downlink, obtain the best beam of the downlink through measurement, and transmit the SRS on a resource corresponding to the best beam. After receiving the SRS, the base station knows the best beam of the downlink, and also knows a channel condition and the beam condition of the uplink, so as to infer the channel condition of the downlink. After the base station knows the channel conditions, the transmission efficiency between the base station and the UE can be improved, thereby completing the data transmission more quickly and reducing the traffic delay and the power consumption of the UE.

In one embodiment, when a reference signal received power of the CSI-RS (CSI-RSRP) received by the UE is lower than a certain value (e.g. −120 dBm), the UE may not need to monitor the above power saving signal/channel (at this time, the UE performs according to normal DRX). In one embodiment, when a reference signal received power of the SSB (SSB-RSRP) received by the UE is lower than a certain value (e.g. −130 dBm), the UE may not need to monitor the power saving signal/channel. In one embodiment, when a reference signal received power of an SSS of the SSB (SSB-RSRP) received by the UE is lower than a certain value (e.g. −135 dBm), the UE may not monitor to the power saving signal/channel. When the UE does not need to monitor the above power saving signal/channel, a part of electric energy can be saved, false detection/missed detection of the UE can be prevented, and a misoperation of the UE can be prevented.

Figure 7:
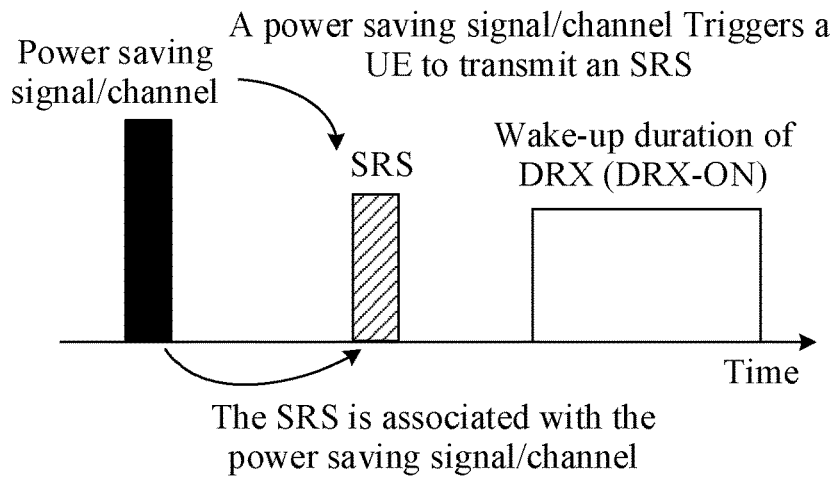
FIG. 7 is a schematic diagram illustrating that a power saving signal/channel triggers a base station to transmit a channel-state information reference signal and a sounding reference signal is associated with the power saving signal/channel according to an embodiment.

In a second exemplary implementation, FIG. 7 is a schematic diagram illustrating that a power saving signal/channel triggers a base station to transmit a channel-state information reference signal and a sounding reference signal is associated with the power saving signal/channel according to an embodiment.

First, a base station configures some configuration parameters for a UE. These configuration parameters include a PS-RNTI used for saving power, a resource of a DM-RS used for decoding the power saving signal/channel, a TCI of the DM-RS, a QCL configuration of the DM-RS, SRS resources, an initialization value of an SRS sequence and a timing relationship of the SRS relative to the power saving signal/channel.

The PS-RNTI used for saving power: the UE needs to check the RNTI at DRX-OFF. For example, the UE checks the RNTI during a period (e.g. the first 0 to 20 slots) before DRX-ON. The check content includes the power saving signal/channel, a PDCCH, DCI, a CSI-RS, a TRS, a DM-RS, an SSS, a PSS, an SSB and a PT-RS.

The resource of the DM-RS used for decoding the power saving signal/channel may be such as a DM-RS ID. The base station may configure one or more these IDs. For example, these IDs are expressed by integers corresponding to 16 bits (i.e., a range of the IDs from 0 to 65535), such as ID=0, or ID=1. These IDs are used as initialization values during generating a DM-RS sequence. In one embodiment, the user equipment initializes a DM-RS reception sequence according to a PS-RNTI ($n_{PS-RNTI}$). In one embodiment, the DM-RS uses the PS-RNTI as part of an initialization seed $c_{init}$, as follows:

$$c_{init}=(2^{17}(N_{symb}^{slot}n_{s,f}^{\mu}+l+1)(2N_{ID}+1)+2N_{ID})\bmod 2^{31}.$$

Here, $N_{symb}^{slot}$ is the number of symbols in one slot, $n_{s,f}^{\mu}$ is a slot identity of a current radio frame when a subcarrier interval is configured as μ, l is a symbol index, $N_{ID}=n_{PS-RNTI}$, and mod is a modulo operation. In one embodiment, a value of $N_{ID}$ is C-RNTI ($n_{C-RNTI}$) of the UE, and in one embodiment, in active time of the UE, a value of $N_{ID}$ is the C-RNTI of the UE. In one embodiment, $N_{ID}=(n_{PS-RNTI}+n_{C-RNTI})\bmod 2^{16}$. In one embodiment, in DRX active time of the UE, $N_{ID}=(n_{PS-RNTI}+n_{C-RNTI})\bmod 2^{16}$. In one embodiment, in outside of DRX active time or DRX OFF of the UE, $N_{ID}=n_{PS-RNTI}$.

In one embodiment, the DM-RS uses the PS-RNTI as part of an initialization seed $c_{init}$, as follows:

$$c_{init}=(2^{17}(N_{symb}^{slot}n_{s,f}^{\mu}+l+1)(2N_{ID}+1)+2N_{ID}+n_{PS-RNT})\bmod 2^{31}.$$

Here, $N_{ID}$ is ID a parameter (e.g. the value of $N_{ID}$ is 0) configured by a higher layer.

The TCI of the DM-RS described above, for example, may be configured to be the same as the TCI of the SSB. For another example, the TCI of the DM-RS is configured to be the same as the TCI of the DM-RS in the SSB. For another example, the TCI of the DM-RS is configured to be the same as the TCI of the CSI-RS.

The QCL configuration of the DM-RS: for example, the DM-RS may be configured to be the same as the QCL of the SSB. For another example, a DM-RS port may be configured to be the same as the QCL of the SSB. For another example, the DM-RS is configured to be the same as the QCL of the CSI-RS. For another example, a DM-RS port is configured to be the same as the QCL of the CSI-RS.

The SRS resources: these resources may be one or more resources triggered by the power saving signal/channel. These resources are used for the UE to transmit the SRS. These resources may be on different BWPs in different serving cells. Such resources may be associated with the power saving signal/channel, or the DM-RS of the power saving signal/channel. In one embodiment, these SRS resources may be associated with the SSB. In one embodiment, these SRS resources may be associated with the CSI-RS.

The initialization value of the SRS sequence: for example, the SRS may be scrambled using the PS-RNTI, that is, the PS-RNTI is used for initializing a sequence. The base station may also configure one specific value to initialize a sequence of the SRS.

The use of the SRS is configured as "Power Saving", or the use of the SRS may be configured as "beamManagement".

The timing relationship of the SRS relative to the power saving signal/channel: for example, after a slot N of the power saving signal/channel adding a fixed constant K slots is received, the UE transmits the SRS on a slot N+K. The timing relationship may also be given directly in the power saving signal/channel. For example, 1-bit "0" denotes that the SRS is transmitted after 2 slots, and 1-bit "1" denotes that the SRS is transmitted after 4 slots.

Secondly, the base station transmits the power saving signal/channel. The power saving signal/channel needs to be scrambled using the C-RNTI or the PS-RNTI of the UE. For example, when scrambling is performed, the PS-RNTI may be used for generating a scrambling code sequence (e.g. a pseudo-random sequence), and then the scrambling code sequence is used for scrambling the bits before coding the power saving signal/channel. Alternatively, this scrambling code sequence is used for scrambling the bits after coding the power saving signal/channel. In addition, the PS-RNTI may be used for scrambling at DRX-OFF (or at times outside of DRX active time), and the C-RNTI is used for scrambling at other times (e.g. DRX active time).

Again, the power saving signal/channel triggers the UE to transmit the SRS. The UE may transmit one or more SRSs. The power saving signal/channel has 1 bit or 2 bits indicating what resource is used to transmit the SRS. See Tables 6 and 7 below.

TABLE 6

| Triggering value of 1-bit SRS of power saving signal/channel | Meaning |
| --- | --- |
| 0 | No SRS triggering |
| 1 | The UE transmits the SRS on a set of SRS resources or a first set of resources configured by the base station. |

TABLE 7

| Triggering value of 2-bit SRS of power saving signal/channel | Meaning |
| --- | --- |
| 00 | No SRS triggering |
| 01 | The UE transmits the SRS on a first set of resources configured by the base station. |
| 10 | The UE transmits the SRS on a second set of resources configured by the base station. |
| 11 | The UE transmits the SRS on a third set of resources configured by the base station. |

After the above operation is performed, the UE may measure a channel condition of the downlink (through the DM-RS), obtain the best beam of the downlink through measurement, and transmit the SRS on a resource corresponding to the best Beam. After receiving the SRS, the base station knows the best beam of the downlink, and also knows a channel condition and the beam condition of the uplink, so as to infer the channel condition of the downlink. After the base station knows the channel conditions, the transmission efficiency between the base station and the UE can be improved, thereby completing the data transmission more quickly and reducing the traffic delay and the power consumption of the UE.

Figure 8:
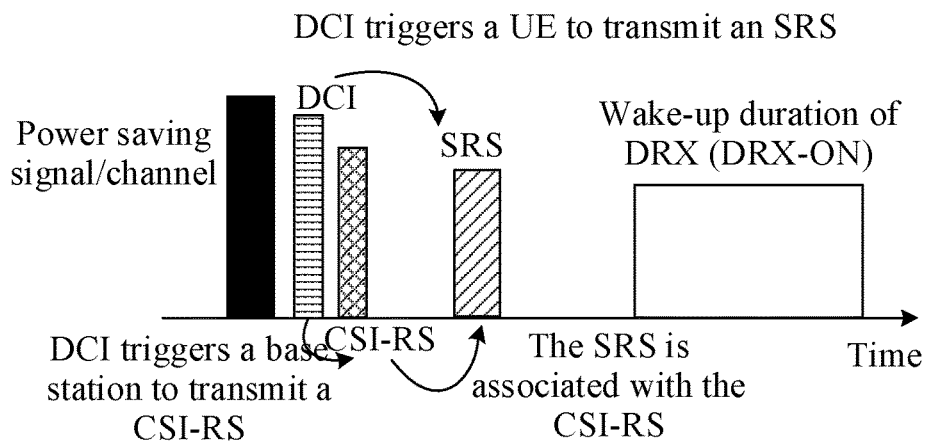
FIG. 8 is a schematic diagram illustrating that downlink control information triggers a base station to transmit a channel-state information reference signal, a downlink control information triggers a UE to transmit a sounding reference signal and the sounding reference signal is associated with the channel-state information reference signal according to an embodiment.

In a third exemplary implementation, FIG. 8 is a schematic diagram illustrating that downlink control information triggers a base station to transmit a channel-state information reference signal, a downlink control information triggers a UE to transmit a sounding reference signal and the sounding reference signal is associated with the channel-state information reference signal according to an embodiment.

First, a base station configures some configuration parameters for a UE. These configuration parameters include a PS-RNTI used for saving power, CSI-RS resources, a channel state information interference measurement (CSI-IM) resource, a scrambling manner of a PDCCH/DCI, an initialization value of a CSI-RS sequence, SRS resources, CSI-RS resources associated with the SRS, an initialization value of an SRS sequence, and resources for reporting CSI.

The PS-RNTI used for saving power: the UE needs to check the RNTI at DRX-OFF. For example, the UE checks the RNTI during a period (e.g. the first 2 to 10 slots) before DRX-ON. The check content includes the power saving signal/channel, a PDCCH, DCI, a CSI-RS, a TRS, a DM-RS, an SSS, a PSS, an SSB and a PT-RS.

The CSI-RS resources: these resources may be one or more CSI-RS resources triggered by the PDCCH/DCI. These resources are used for the base station to transmit the CSI-RS. These resources may be on different BWPs in different serving cells. In one embodiment, these CSI-RS resources include a CSI-RS resource used for mobility measurement (CSI-RS-Resource-Mobility). In one embodiment, the CSI-RS resource used for mobility measurement is triggered by the power saving signal/channel. In one embodiment, the CSI-RS resource used for mobility measurement occurs outside of the DRX active time. In one embodiment, if the UE is configured with DRX, the UE should measure the CSI-RS resource used for mobility measurement occurring outside the DRX active time of the UE. In one embodiment, if the UE is configured with DRX, the UE should measure the CSI-RS resource used for mobility measurement triggered by the power saving signal/channel and occurring outside the DRX active time of the UE.

The CSI-IM resource such as a nonzero power CSI-RS (NZP-CSI-RS) resource or a zero power CSI-RS (ZP-CSI-RS) resource: if the UE is configured with DRX, the UE should measure the CSI-IM resource for interfering measurement triggered by the power saving signal/channel and occurring outside the DRX active time of the UE. In one embodiment, if the UE measures at least one CSI-RS transmission opportunity triggered by the power saving signal/channel outside of DRX active time, the UE should report a CSI measurement report.

The scrambling manner of the above PDCCH/DCI: for example, the PDCCH/DCI may be scrambled using the PS-RNTI. For example, a CRC of the PDCCH/DCI is scrambled using the PS-RNTI.

The initialization value of the CSI-RS sequence: for example, the CSI-RS may be scrambled using the PS-RNTI, that is, the PS-RNTI is used for initializing a sequence. The base station may also configure one specific value to initialize a sequence of the CSI-RS.

The SRS resources: these resources may be one or more resources triggered by the power saving signal/channel. These resources are used for the UE to transmit the SRS. These resources may be on different BWPs in different serving cells. In one embodiment, the SRS resources may be SRS resources associated with the CSI-RS. In one embodiment, the SRS resources may be SRS resources associated with the SSB.

The CSI-RS resources associated with the SRS: these CSI-RS resources may be the CSI-RS resources (e.g. the CSI-RS resources already listed above) triggered by the PDCCH/DCI described above or other configured CSI-RS resources.

The initialization value of the SRS sequence: for example, the SRS may be scrambled using the PS-RNTI, that is, the PS-RNTI is used for initializing the sequence. The base station may configure one specific value to initialize a sequence of the SRS.

The use of the SRS is configured as "Power Saving", or the use of the SRS may be configured as "beamManagement", "codebook", "nonCodebook" or "antennaSwitching".

The resources for reporting CSI includes a resource for reporting the CSI by the PUCCH, a resource for reporting the CSI by the PUSCH (for example, configuring one or two or four or eight resources). In an embodiment, these resources are only configured on a default BWP or an initial BWP. In one embodiment, these resources are configured on each BWP.

Secondly, the base station transmits the power saving signal/channel.

Thirdly, the base station transmits the PDCCH/DCI. The PDCCH/DCI needs to be scrambled using the C-RNTI or the PS-RNTI of the UE. For example, when scrambling is performed, the PS-RNTI may be used for generating a scrambling code sequence (e.g. a pseudo-random sequence), and then the scrambling code sequence is used for scrambling the bits before coding the power saving signal/channel; or this scrambling code sequence is used for scrambling the bits after coding the power saving signal/channel. In addition, the PS-RNTI may be used for scrambling at DRX-OFF, and the C-RNTI is used for scrambling at other times. In addition, the PDCCH may also be scrambled using modulo-2 addition of CRC and PS-RNTI of the PDCCH.

Following, the base station transmits the CSI-RS or the TRS. The base station may transmit one or more CSI-RSs or the TRSs. Such signals may be triggered by the PDCCH/DCI, or configured additionally. If the CSI-RS signal transmitted by the base station is triggered by the PDCCH/DCI, the PDCCH/DCI has 0 bit or 1 bit or 2 bits or 3 bits indicating what resource is used to transmit the CSI-RS (for UEs that do not support a power saving technology, there may be 0 bit; in one embodiment, 0 bit denotes that there is no domain). In one embodiment, If there is no uplink shared channel (UL-SCH) (i.e. there is no uplink data to be transmitted), at this time, a 2-bit redundancy version may also be used for indicating what resource is used to transmit the CSI-RS (i.e., in one embodiment, the redundancy version bit has different meanings under DRX-OFF, DRX-ON or DRX active time). In one embodiment, the base station transmits the CSI-RS (or the TRS) on a $Z^{th}$ slot after the PDCCH or the power saving signal/channel is transmitted, where Z is an integer. In one embodiment, Z is the smallest integer such that the $Z^{th}$ slot falls in the DRX-ON of the UE. In one embodiment, Z is the smallest integer such that the $Z^{th}$ slot falls in the DRX active time of the UE. See Tables 8 to 10 below.

TABLE 8

| Triggering value of 1-bit CSI-RS of PDCCH/DCI | Meaning |
| --- | --- |
| 0 | No CSI-RS triggering |
| 1 | A set of CSI-RS resources or a first set of resources configured by the base station. |

TABLE 9

| Triggering value of 2-bit CSI-RS (or a value of the redundancy version) of PDCCH/DCI | Meaning |
|---|---|
| 00 | No CSI-RS triggering |
| 01 | The CSI-RS is transmitted on a first set of resources configured by the base station. |
| 10 | The CSI-RS is transmitted on a second set of resources configured by the base station. |
| 11 | The CSI-RS is transmitted on a third set of resources configured by the base station. |

TABLE 10

| Triggering value of 3-bit CSI-RS of PDCCH/DCI | Meaning |
|---|---|
| 000 | No CSI-RS triggering and the UE has no corresponding SRS to transmit. |
| 001 | The CSI-RS is transmitted on a first set of resources configured by the base station and the UE has no corresponding SRS to transmit. |
| 010 | The CSI-RS is transmitted on a second set of resources configured by the base station and the UE has no corresponding SRS to transmit. |
| 011 | The CSI-RS is transmitted on a third set of resources configured by the base station and the UE has no corresponding SRS to transmit. |
| 100 | No CSI-RS triggering but the UE needs to transmit the SRS on a first set of resources. |
| 101 | The CSI-RS is transmitted on a first set of resources configured by the base station and the UE needs to transmit the SRS on an SRS resource associated with the CSI-RS. |
| 110 | The CSI-RS is transmitted on a second set of resources configured by the base station and the UE needs to transmit the SRS on an SRS resource associated with the CSI-RS. |
| 111 | The CSI-RS is transmitted on a third set of resources configured by the base station and the UE needs to transmit the SRS on an SRS resource associated with the CSI-RS. |

When the base station allocates a frequency resource of the PUSCH for reporting the CSI to the UE, the base station may use $\lceil \log_2(N_{RB}^{UL,BWP}(N_{RB}^{UL,BWP}+1)/2) \rceil$ bits to indicate the allocated resource (represented by an RIV).

If then otherwise $(L_{RBs}-1) \leq \lfloor N_{BWP}^{size}/2 \rfloor$, then $RIV = N_{BWP}^{size}(L_{RBs}-1) + RB_{start}$; otherwise $RIV = N_{BWP}^{size}(N_{BWP}^{size}-L_{RBs}+1) + (N_{BWP}^{size}-1-RB_{start})$, where $1 \leq L_{RBs} \leq N_{BWP}^{size} - RB_{start}$.

Here, $\lceil \cdot \rceil$ denotes rounding up, $\lfloor \cdot \rfloor$ denotes rounding down, log 2 ( ) denotes a logarithm based on 2, $N_{RB}^{UL,BWP}$ denotes a size of the BWP of the UL in units of a RB, $L_{RBs}$ denotes the number (i.e. length) of RBs allocated to the UE for reporting the CSI, $N_{BWP}^{size} = N_{RB}^{UL,BWP}$ and $RB_{start}$ denotes a starting RB identity of the RB allocated to the UE for reporting the CSI. For example, assuming that a uplink BWP bandwidth is 100 RBs, three consecutive RBs are allocated, and the starting RB identity is 9, then RIV=100* (3-1)+9=209. $\lceil \log_2(100*(100+1)/2) \rceil = 13$ bits are denoted that RIV=209 is 0000011010001.

In one embodiment, to reduce the number of bits required to express the RIV, the allocated resource unit may be modified to 2 RBs (or 3 RBs, or 4 RBs). At this time, $N_{RB}^{UL,BWP}$, $N_{BWP}^{size}$ and $L_{RBs}$ are all in units of 2 RBs (or 3 RBs, or 4 RBs), and start is also starting from each 2 RBs (or each 3 RBs, or each 4 RBs).

In one embodiment, PUSCH resources used for reporting a CSI report triggered by the power saving signals/channel do not exceed a certain number, such as no more than ½ or ⅓ or ¼ or ⅛ or 1/16 or 1/32 of the BWP bandwidth.

In one embodiment, the base station may indicate a resource configured for the PUSCH with 1 bit or 2 bits or 3 bits. For example, 1-bit "0" denotes that the UE should use the first set of PUSCH resources to report the CSI, and 1-bit "1" denotes that the UE should use the second set of PUSCH resources to report the CSI. As another example, 2-bit "00" denotes that the UE should use the first set of PUSCH resources to report the CSI, and 2-bit "01" denotes that the UE should use the second set of PUSCH resources to report the CSI, 2-bit "10" denotes that the UE should use the third set of PUSCH resources to report the CSI, and 2-bit "11" denotes that the UE should use the fourth set of PUSCH resources to report the CSI. As another example, 3-bit "000" denotes that the UE should use the first set of PUSCH resources to report the CSI, and 3-bit "001" denotes that the UE should use the second set of PUSCH resources to report the CSI, 3-bit "010" denotes that the UE should use the third set of PUSCH resources to report the CSI, 3-bit "011" denotes that the UE should use the fourth set of PUSCH resources to report the CSI, 3-bit "100" denotes that the UE should use the fifth set of PUSCH resources to report the CSI, and 3-bit "101" denotes that the UE should use the sixth set of PUSCH resources to report the CSI, 3-bit "110" denotes that the UE should use the seventh set of PUSCH resources to report the CSI, and 3-bit "111" denotes that the UE should use the eighth set of PUSCH resources to report the CSI. In one embodiment, it can also use a similar method to indicate which resource is used for the PUCCH to report the CSI. In one embodiment, if the UE receives two or more power saving signals/channels having inconsistent contents, for example, one power saving signal/channel requires the UE to report the CSI and the other power saving signal/channel does not require the UE to report the CSI, and then the UE will not report the CSI. In one embodiment, if the UE receives two or more power saving signals/channels having inconsistent contents, the UE need to report the CSI. In one embodiment, the base station receives the CSI report carried on the PUCCH. In one embodiment, the base station receives the CSI report carried on the PUSCH. In one embodiment, the base station receives the CSI report triggered by the power saving signal/channel and carried on the PUCCH. In one embodiment, the base station receives the CSI report triggered by the power saving signal/channel and carried on the PUSCH.

In one embodiment, the PUCCH resource for reporting the CSI (PUCCH-CSI-Resource) configured by the base station to the UE includes a PUCCH resource list (pucch-CSI-ResourceList), a slot configuration of the report (report-SlotConfig), one or more PUCCH resource sets (PUCCH-ResourceSet), each PUCCH resource set having a resource set identity (PUCCH-ResourceSetId), each PUCCH resource set including one or more PUCCH resources (PUCCH-Resource), each PUCCH resource having a resource identity (PUCCH-ResourceId), and a starting physical resource block (PRB) (starting PRB) identity and a PUCCH format. In one embodiment, the PUCCH format includes a PUCCH format2 (PUCCH-format2), a PUCCH format3 (PUCCH-format3) and a PUCCH format4 (PUCCH-format4). In one embodiment, these PUCCH formats include the number of PRBs (nrofPRBs). In one embodiment, PUCCH resources (i.e. nrofPRBs) used for reporting a CSI report triggered by the power saving signals/channel do not exceed a certain number, such as no more than ½ or ⅓ or ¼ or ⅛ or 1/16 or 1/32 of the BWP bandwidth. In one embodiment, these PUCCH formats are scrambled using the PS-RNTI, as follows:

$$c_{init} = n_{PS\text{-}RNTI} \cdot 2^{15} + n_{ID}.$$

Here, $c_{init}$ is used for initializing and generating an initialization value of a scrambling sequence, $n_{PS\text{-}RNTI}$ is a value (decimalism) of the PS-RNTI, $n_{ID}$ is a parameter configured by a higher layer and a value range is 0 to 1023, and $n_{ID}$ may also be a cell identifier (PCI).

In one embodiment, the above PUSCH resources are defined on a certain BWP. For example, a report uses the first set of PUSCH resources with BWP ID=0. As another example, a report uses the second set of PUSCH resources with BWP ID=1.

In one embodiment, the PUSCH resources may be associated with a CCE where the power saving signal/channel is located. Assuming that the minimum CCE identity used for transmitting the power saving signal/channel is K=3 and the number of the configured PUSCH resources is N=4 (i.e., a total of 4 sets of resources), then the PUSCH resource identity used at this time is mod (k, N)=mod (3, 4)=3, and reporting the CSI will use the PUSCH resource with identity 3 (i.e., the fourth set of PUSCH resources).

In one embodiment, if the base station indicates (e.g. by a 2-bit BWP identity in the power saving signal/channel; by the PDCCH; or by the scheduling DCI) that there is a BWP handover (i.e. the UE is about to receive or transmit data on a BWP different from the current BWP), then the base station will transmit a CSI-RS on a target BWP, the UE will receive and measure the CSI-RS on the target BWP, and the UE will transmit a CSI report on the first set of PUSCH resources of the target BWP. In one embodiment, the UE will transmit a CSI report on the first set of PUCCH resources of the target BWP. In one embodiment, the UE will report the CSI on a first slot after the BWP handover is completed. In one embodiment, the UE will report the CSI on a second slot after the BWP handover is completed. In one embodiment, the UE will report the CSI on a third slot after the BWP handover is completed. In one embodiment, the UE will report the CSI on a fourth slot after the BWP handover is completed. In one embodiment, the UE will report the CSI on an $X^{th}$ slot after the BWP handover is completed, where X is a positive integer. In one embodiment, X is the smallest integer such that the $X^{th}$ slot falls in the DRX-ON of the UE.

Then, the base station triggers the UE to transmit an SRS. The UE may transmit one or more SRSs. The SRS may be triggered by the PDCCH/DCI. If the SRSs transmitted by the UE are triggered by the PDCCH/DCI, the PDCCH/DCI has 1 bit or 2 bits indicating what resource is used to transmit the SRS. See Tables 11 and 12 below.

TABLE 11

| Triggering value of 1-bit SRS of power saving signal/channel | Meaning |
| --- | --- |
| 0 | No SRS triggering |
| 1 | The UE transmits an SRS on a set of SRS resources or a first set of SRS resources configured by the base station. |

TABLE 12

| Triggering value of 2-bit SRS of power saving signal/channel | Meaning |
| --- | --- |
| 00 | No SRS triggering |
| 01 | The UE transmits an SRS on a first set of resources configured by the base station. |
| 10 | The UE transmits an SRS on a second set of resources configured by the base station. |
| 11 | The UE transmits an SRS on a third set of resources configured by the base station. |

After the above operation is performed, the UE may measure and report a channel condition (CSI) of the downlink, obtain the best beam of the downlink through measurement, and transmit the SRS on a resource corresponding to the best beam. After receiving the SRS, the base station knows the best beam of the downlink, and also knows a channel condition and the beam condition of the uplink, so as to infer the channel condition of the downlink. After the base station knows the channel conditions, the transmission efficiency between the base station and the UE can be improved, thereby completing the data transmission more quickly and reducing the traffic delay and the power consumption of the UE.

Figure 9:
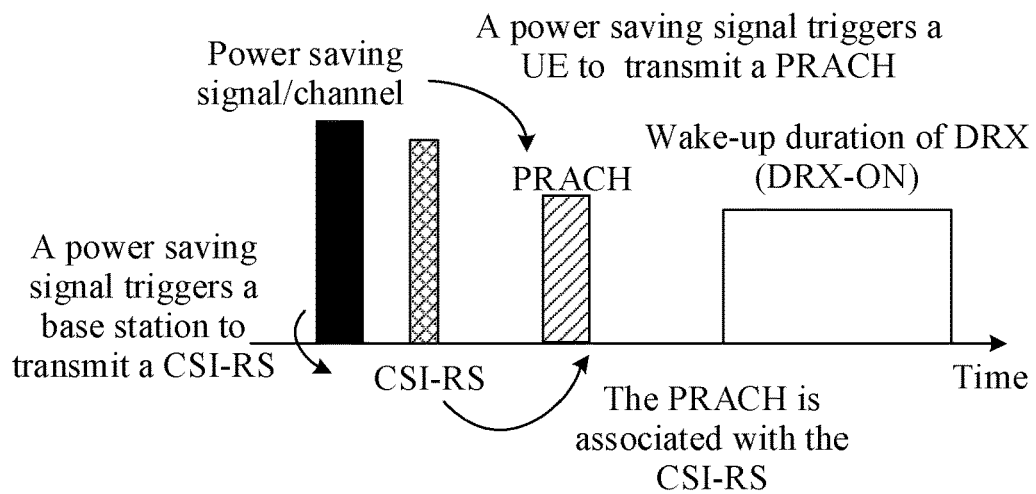
FIG. 9 is a schematic diagram illustrating that a power saving signal/channel triggers a base station to transmit a channel-state information reference signal, a power saving signal/channel triggers a UE to transmit a random access channel and the random access channel is associated with the channel-state information reference signal according to an embodiment.

In a fourth exemplary implementation, FIG. 9 is a schematic diagram illustrating that a power saving signal/channel triggers a base station to transmit a channel-state information reference signal, a power saving signal/channel triggers a UE to transmit a random access channel and the random access channel is associated with the channel-state information reference signal according to an embodiment.

First, a base station configures some configuration parameters for the UE. These configuration parameters include a PS-RNTI used for saving power, CSI-RS resources, an SSB resource, an initialization value of a CSI-RS sequence, physical random access channel (PRACH) resources, CSI-RS resources associated with the PRACH, an SSB resource associated with the PRACH, and an initialization value of a PRACH sequence.

The PS-RNTI used for saving power: the UE needs to check the RNTI at DRX-OFF. For example, the UE checks the RNTI during a period (e.g. the first 5 to 10 slots) before DRX-ON. The check content includes the power saving signal/channel, a PDCCH, DCI, a CSI-RS, a TRS, a DM-RS, an SSS, a PSS, an SSB and a PT-RS.

The CSI-RS resources: these resources may be one or more CSI-RS resources triggered by the power saving signal/channel. These resources are used for the base station to transmit the CSI-RS. These resources may be on different BWPs in different serving cells.

The initialization value of the CSI-RS sequence: for example, the CSI-RS may be scrambled using the PS-RNTI, that is, the PS-RNTI is used for initializing a sequence. The base station may also configure one specific value to initialize a sequence of the CSI-RS.

The PEACH resources: these resources may be one or more resources triggered by the power saving signal/channel. These resources are used for the UE to transmit the PRACH. These resources may be on different BWPs in different serving cells. The PRACH resource includes a preamble ID (such as a dedicated preamble identity), a frequency resource (such as transmitting on which physical resource blocks on which BWPs), a time offset of the PRACH relative to the power saving signal/channel, a cycle shift used by the PRACH (i.e. a preamble) and a PRACH format. In one embodiment, the PRACH resources are PRACH resources associated with the CSI-RS. In one embodiment, the PRACH resources are PRACH resources associated with the SSB. In one embodiment, the PRACH resources are indicated by the power saving signal/channel. In one embodiment, the PRACH resources are in one-to-one correspondence with the power saving signals/channels.

The CSI-RS resources associated with the PRACH: these CSI-RS resources may be the CSI-RS resources (e.g. the CSI-RS resources already listed above) triggered by the power saving signal/channel described above or other configured CSI-RS resources.

The initialization value of the PRACH sequence: for example, the SRS may be scrambled using the PS-RNTI, that is, the PS-RNTI is used for initializing the sequence. The base station may configure one specific value to initialize a sequence of the PRACH.

Secondly, the base station transmits the power saving signal/channel. In one embodiment, the power saving signal/channel may trigger the UE to acquire system information (such as the eighth system information block (SIB8)). In one embodiment, the aggregation degree of the power saving signal/channel is 1, 2, 4, 8, 16 and 32. In one embodiment, when the aggregation degree of the power saving signal/channel is 16 CCEs, the power saving signal/channel has a candidate position, and this position has 16 consecutive CCEs. In one embodiment, when the aggregation degree of the power saving signal/channel is 16 CCEs, the power saving signal/channel has two candidate positions, and each position of the two candidate positions has 16 consecutive CCEs. In one embodiment, when the aggregation degree of the power saving signal/channel is 32 CCEs, the power saving signal/channel has one candidate position, and this position has 32 consecutive CCEs. High aggregation degree is beneficial to the successful transmission of the power saving signals/channels, thus reducing the UE leaking detection.

Thirdly, the UE receives the power saving signal/channel. When the UE receives the power saving signal/channel, the UE may assume that the power saving signal/channel and an SSB are of QCL. In one embodiment, when the UE receives the power saving signal/channel, the UE may assume that a DM-RS of the power saving signal/channel and an SSB are of QCL. In one embodiment, when the UE receives the power saving signal/channel, the UE may assume that a DM-RS of the power saving signal/channel and an SSB have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and a CSI-RS are of QCL. In one embodiment, when the UE receives the power saving signal/channel, the UE may assume that a DM-RS of the power saving signal/channel and a CSI-RS are of QCL. In one embodiment, when the UE receives the power saving signal/channel, the UE may assume that a DM-RS of the power saving signal/channel and a CSI-RS have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and a CSI-RS used for being associated with random access are of QCL.

In one embodiment, when the UE receives the power saving signal/channel, the UE may assume that a DM-RS of the power saving signal/channel and a CSI-RS used for being associated with random access are of QCL. In one embodiment, when the UE receives the power saving signal/channel, the UE may assume that a DM-RS of the power saving signal/channel and a CSI-RS used for being associated with random access have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and an SSB used for being associated with random access are of QCL. In one embodiment, when the UE receives the power saving signal/channel, the UE may assume that a DM-RS of the power saving signal/channel and an SSB used for being associated with random access are of QCL. In one embodiment, when the UE receives the power saving signal/channel, the UE may assume that a DM-RS of the power saving signal/channel and an SSB used for being associated with random access have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and a CSI-RS associated with a beam management are of QCL. In one embodiment, when the UE receives the power saving signal/channel, the UE may assume that a DM-RS of the power saving signal/channel and a CSI-RS used for being associated with a beam management are of QCL. In one embodiment, when the UE receives the power saving signal/channel, the UE may assume that a DM-RS of the power saving signal/channel and a CSI-RS used for being associated with a beam management have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and an SSB used for being associated with a beam management are of QCL. In one embodiment, when the UE receives the power saving signal/channel, the UE may assume that a DM-RS of the power saving signal/channel and an SSB used for being associated with a beam management are of QCL. In one embodiment, when the UE receives the power saving signal/channel, the UE may assume that a DM-RS of the power saving signal/channel and an SSB used for being associated with a beam management have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and a CSI-RS used for being associated with a channel state measurement (including a codebook, a nonCodebook and an antennaSwitching) are of QCL. In one embodiment, when the UE receives the power saving signal/channel, the UE may assume that a DM-RS of the power saving signal/channel and a CSI-RS associated with a channel state measurement are of QCL. In one embodiment, when the UE receives the power saving signal/channel, the UE may assume that a DM-RS of the power saving signal/channel and a CSI-RS used for being associated with a channel state measurement have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and an SSB used for being associated with a channel state measurement are of QCL. In one embodiment, when the UE receives the power saving signal/channel, the UE may assume that a DM-RS of the power saving signal/channel and an SSB used for being associated with a channel state measurement are of QCL. In one embodiment, when the UE receives the power saving signal/channel, the UE may assume that a DM-RS of the power saving signal/channel and an SSB used for being associated with a channel state measurement have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and a CSI-RS used for being associated with a beam management are of QCL. In one embodiment, when the UE receives the power saving signal/channel, the UE may assume that a DM-RS port of the power saving signal/channel and a CSI-RS used for being associated with a beam management are of QCL. In one embodiment, when the UE receives the power saving signal/channel, the UE may assume that a DM-RS port of the power saving signal/channel and a CSI-RS used for being associated with a beam management have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and an SSB used for being associated with a beam management are of QCL. In one embodiment, when the UE receives the power saving signal/channel, the UE may assume that a DM-RS port of the power saving signal/channel and an SSB used for being associated with a beam management are of QCL. In one embodiment, when the UE receives the power saving signal/channel, the UE may assume that a DM-RS port of the power saving signal/channel and an SSB used for being associated with a beam management have a same QCL characteristic. In one embodiment, when the UE receives the power saving signal/channel, the UE may assume that a DM-RS port of the power saving signal/channel and an SSB received recently have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and a CSI-RS used for being associated with a channel state measurement (including a codebook, a nonCodebook and an antennaSwitching) are of QCL. In one embodiment, when the UE receives the power saving signal/channel, the UE may assume that a DM-RS port of the power saving signal/channel and a CSI-RS used for being associated with a channel state measurement are of QCL. In one embodiment, when the UE receives the power saving signal/channel, the UE may assume that a DM-RS port of the power saving signal/channel and a CSI-RS used for being associated with a channel state measurement have a same QCL characteristic. In one embodiment, if the characteristic may be used, the same QCL characteristic includes a Doppler shift, a Doppler spread, an average delay, a delay spread, and a spatial receive parameter. In one embodiment, when the UE receives the power saving signal/channel, the UE may assume that the power saving signal/channel and a CSI-RS received recently and used for being associated with a channel state measurement are of QCL. In one embodiment, when the UE receives the power saving signal/channel, the UE may assume that a DM-RS port of the power saving signal/channel and a CSI-RS received recently and used for being associated with a channel state measurement are of QCL. In one embodiment, when the UE receives the power saving signal/channel, the UE may assume that a DM-RS port of the power saving signal/channel and a CSI-RS received recently and used for being associated with a channel state measurement have a same QCL characteristic. In one embodiment, if the characteristic may be used, the same QCL characteristic includes a Doppler shift, a Doppler spread, an average delay, a delay spread, and a spatial receive parameter.

Following, the base station transmits the CSI-RS or the TRS. The base station may transmit one or more CSI-RSs or the TRSs. Such signals may be triggered by the power saving signal/channel, or independent of the power saving signal/channel. If a CSI-RS signal transmitted by the base station is triggered by the power saving signal/channel, the power saving signal/channel has 0 bit or 1 bit or 2 bits or 3 bits indicating what resource is used to transmit the CSI-RS (for UEs that do not support power saving technology, this may be 0 bit). See Tables 13 to 15 below.

TABLE 13

| Triggering value of 1-bit CSI-RS of power saving signal/channel | Meaning |
| --- | --- |
| 0 | No CSI-RS triggering |
| 1 | A set of CSI-RS resources or a first set of resources configured by the base station. |

TABLE 14

| Triggering value of 2-bit CSI-RS of power saving signal/channel | Meaning |
| --- | --- |
| 00 | No CSI-RS triggering |
| 01 | A CSI-RS is transmitted on a first set of resources configured by the base station. |
| 10 | A CSI-RS is transmitted on a second set of resources configured by the base station. |
| 11 | A CSI-RS is transmitted on a third set of resources configured by the base station. |

TABLE 15

| Triggering value of 3-bit CSI-RS of power saving signal/channel | Meaning |
|---|---|
| 000 | No CSI-RS triggering and the UE has no corresponding PRACH to transmit. |
| 001 | A CSI-RS is transmitted on a first set of resources configured by the base station and the UE has no corresponding PRACH to transmit. |
| 010 | A CSI-RS is transmitted on a second set of resources configured by the base station and the UE has no corresponding PRACH to transmit. |
| 011 | A CSI-RS is transmitted on a third set of resources configured by the base station and the UE has no corresponding PRACH to transmit. |
| 100 | No CSI-RS triggering but the UE needs to transmit the PRACH on a first set of resources. |
| 101 | A CSI-RS is transmitted on a first set of resources configured by the base station and the UE needs to transmit the PRACH on a PRACH resource associated with the CSI-RS. |
| 110 | A CSI-RS is transmitted on a second set of resources configured by the base station and the UE needs to transmit the PRACH on a PRACH resource associated with the CSI-RS. |
| 111 | A CSI-RS is transmitted on a third set of resources configured by the base station and the UE needs to transmit the PRACH on a PRACH resource associated with the CSI-RS. |

Then, the base station triggers the UE to transmit a PRACH. The UE may transmit one or more PRACHs. The PRACHs may be triggered by the power saving signal/channel, the DCI or a PDCCH order. If the PRACH signal transmitted by the UE is triggered by the power saving signal/channel, the power saving signal/channel has 1 bit or 2 bits indicating what resource is used to transmit the PRACH. The power saving signal/channel may indicate configuration information of the PRACH. In one embodiment, if the UE receives the power saving signal/channel in an $n^{th}$ slot, the UE transmits the PRACH using the configured PRACH resource in the $(n+4)^{th}$ slot. In one embodiment, if the UE receives the power saving signal/channel in an $n^{th}$ slot, the UE transmits the PRACH using the configured PRACH resource in the $(n+K)^{th}$ slot, where K is the smallest integer such that the $(n+k)^{th}$ slot falls in the DRX-ON of the UE. See Tables 16 and 17 below.

TABLE 16

| Triggering value of 1-bit PRACH of power saving signal/channel | Meaning |
|---|---|
| 0 | No PRACH triggering |
| 1 | The UE transmits a PRACH on a set of PRACH resources or a first set of resources configured by the base station. |

TABLE 17

| Triggering value of 2-bit PRACH of power saving signal/channel | Meaning |
|---|---|
| 00 | No PRACH triggering |
| 01 | The UE transmits a PRACH on a first set of resources configured by the base station. |
| 10 | The UE transmits a PRACH on a second set of resources configured by the base station. |
| 11 | The UE transmits a PRACH on a third set of resources configured by the base station. |

After the above operation is performed, the UE may measure a channel condition of the downlink, obtain the best beam of the downlink through measurement, and transmit the PRACH on a resource corresponding to the best beam. After receiving the PRACH, the base station knows the best beam of the downlink, also knows a timing offset of an uplink timing relative to a downlink timing (so that a timing advance (TA) may be calculated, thus knowing an uplink synchronization condition), and also knows a channel condition and a beam condition of the uplink, thereby inferring the channel condition of the downlink. After the base station knows the channel conditions, the transmission efficiency between the base station and the UE may be improved, thereby completing the data transmission more quickly and reducing the traffic delay and the power consumption of the UE.

Figure 10:
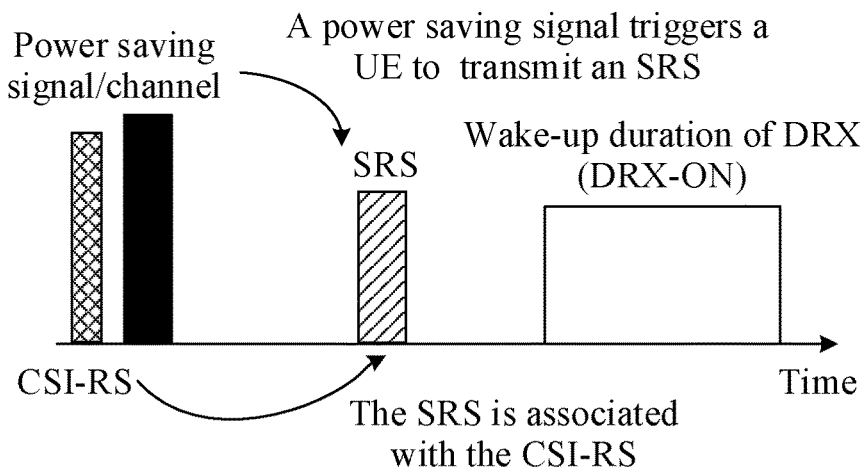
FIG. 10 is a schematic diagram illustrating that a power saving signal/channel triggers a UE to transmit a sounding reference signal and the sounding reference signal is associated with a channel-state information reference signal according to an embodiment.

In a fifth exemplary implementation, FIG. 10 is a schematic diagram illustrating that a power saving signal/channel triggers a UE to transmit a sounding reference signal and the sounding reference signal is associated with a channel-state information reference signal according to an embodiment.

First, a base station configures some configuration parameters for the UE. These configuration parameters include a PS-RNTI used for saving power, CSI-RS resources, an initialization value of a CSI-RS sequence, SRS resources, CSI-RS resources associated with the SRS, and an initialization value of an SRS sequence.

The PS-RNTI used for saving power: the UE needs to check the RNTI in DRX-OFF. For example, the UE checks the RNTI during a period (e.g. the first 5 to 10 slots) before DRX-ON. The check content includes the power saving signal/channel, a PDCCH, DCI, a CSI-RS, a TRS, a DM-RS, an SSS, a PSS, an SSB and a PT-RS.

The CSI-RS resources: these resources are used for the base station to transmit the CSI-RS.

These resources include a time offset of the CSI-RS transmitted earlier than the power saving signal/channel (for example, transmitted on one slot before the power saving signal/channel; as another example, transmitted on two slots before the power saving signal/channel; as another example, transmitted on a same slot as the power saving signal/channel). These resources may be on different BWPs in different serving cells.

The initialization value of the CSI-RS sequence: for example, the CSI-RS may be scrambled using the PS-RNTI, that is, the PS-RNTI is used for initializing a sequence. The base station may configure one specific value to initialize a sequence of the CSI-RS.

The SRS resources: these resources may be one or more resources triggered by the power saving signal/channel. These resources are used for the UE to transmit the SRS. These resources may be on different BWPs in different serving cells.

The CSI-RS resources associated with the SRS: these CSI-RS resources may be the CSI-RS resources (e.g. the CSI-RS resources already listed above) triggered by the power saving signal/channel described above or other configured CSI-RS resources.

The initialization value of the SRS sequence: for example, the SRS may be scrambled using the PS-RNTI, that is, the PS-RNTI is used for initializing the sequence. The base station may configure one specific value to initialize a sequence of the SRS.

The use of the SRS is configured as "Power Saving", or the use of the SRS may be configured as "beamManagement".

Secondly, the base station transmits the CSI-RS or the TRS. The base station may transmit one or more CSI-RSs or the TRSs. These signals may be independent of the power saving signal/channel.

Thirdly, the base station transmits the power saving signal/channel.

Then, the base station triggers the UE to transmit an SRS. The UE may transmit one or more SRSs. The SRSs may be triggered by the power saving signal/channel or the DCI. If the SRS signal transmitted by the UE is triggered by the power saving signal/channel, the power saving signal/channel has 1 bit or 2 bits indicating what resource is used to transmit the SRS. See Tables 18 and 19 below.

TABLE 18

| Triggering value of 1-bit SRS of power saving signal/channel | Meaning |
| --- | --- |
| 0 | No SRS triggering |
| 1 | The UE transmits an SRS on a set of SRS resources or a first set of resources configured by the base station. |

TABLE 19

| Triggering value of 2-bit SRS of power saving signal/channel | Meaning |
| --- | --- |
| 00 | No SRS triggering |
| 01 | The UE transmits an SRS on a first set of resources configured by the base station. |
| 10 | The UE transmits an SRS on a second set of resources configured by the base station. |
| 11 | The UE transmits an SRS on a third set of resources configured by the base station. |

After the above operation is performed, the UE may measure a channel condition of the downlink, obtain the downlink best beam through measurement, and transmit the SRS on a resource corresponding to the best beam. After receiving the SRS, the base station knows the best beam of the downlink, and also knows a channel condition and the beam condition of the uplink, so as to infer the channel condition of the downlink. After the base station knows the channel conditions, the transmission efficiency between the base station and the UE can be improved, thereby completing the data transmission more quickly and reducing the traffic delay and the power consumption of the UE.

Figure 11:
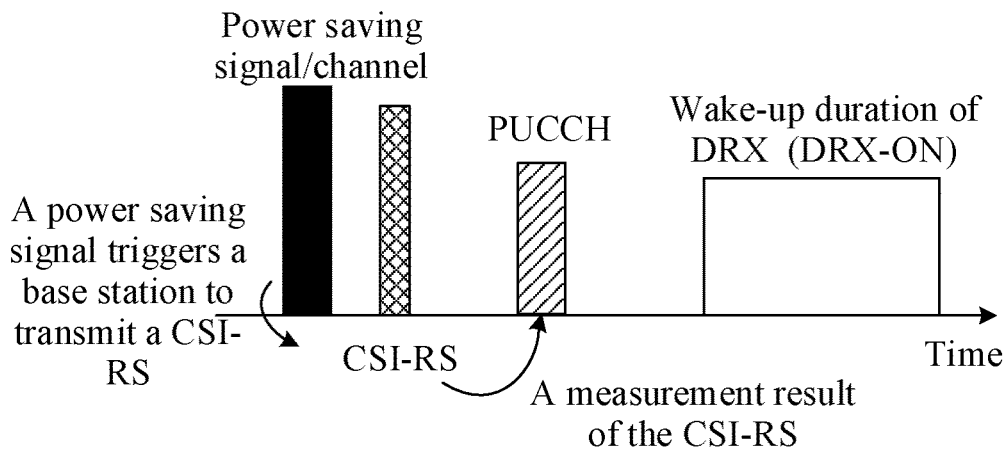
FIG. 11 is a schematic diagram illustrating that a power saving signal/channel triggers a base station to transmit a channel-state information reference signal and a UE, according to a measurement result of the CSI-RS, transmits a physical uplink control channel according to an embodiment.

In a sixth exemplary implementation, FIG. 11 is a schematic diagram illustrating that a power saving signal/channel triggers a base station to transmit a channel-state information reference signal and a UE, according to a measurement result of the CSI-RS, transmits a physical uplink control channel according to an embodiment.

First, a base station configures some configuration parameters for the UE. These configuration parameters include a PS-RNTI used for saving power, CSI-RS resources, a time offset of transmission time of the CSI-RS relative to that of the power saving signal/channel, an initialization value of a CSI-RS sequence, PUCCH resources, an initialization value of a DM-RS sequence of the PUCCH, a scrambling manner of the PUCCH, PUSCH resources, a scrambling manner of the PUSCH, and an initialization value of a DM-RS sequence of the PUSCH.

The PS-RNTI used for saving power: the UE needs to check the RNTI in DRX-OFF. For example, the UE checks the RNTI during a period (e.g. the first 5 to 10 slots) before DRX-ON. The check content includes the power saving signal/channel, a PDCCH, DCI, a CSI-RS, a TRS, a DM-RS, an SSS, a PSS, an SSB and a PT-RS.

The CSI-RS resources: these resources may be one or more CSI-RS resources triggered by the power saving signal/channel. These resources are used for the base station to transmit the CSI-RS. These resources may be on different BWPs in different serving cells. In one embodiment, the CSI-RS resource includes a resource identity (nzp-CSI-RS-ResourceId).

The time offset of transmission time of the CSI-RS relative to that of the power saving signal/channel: if the time offset is a negative number (unit may be slot or absolute time, such as milliseconds), it indicates that the CSI-RS is transmitted earlier than the power saving signal/channel; if the time offset is zero, it indicates that the CSI-RS and the power saving signal/channel are transmitted on a same slot; and if the time offset is a positive number, it indicates that the CSI-RS is transmitted later than the power saving signal/channel.

The initialization value of the CSI-RS sequence: for example, the CSI-RS may be scrambled using the PS-RNTI, that is, the PS-RNTI is used for initializing a sequence. The base station may configure one specific value to initialize a sequence of the CSI-RS. In one embodiment, if the PS-RNTI is for a group of UEs, then the CSI-RS resource and TRS resource should also be for a group of UEs, and an initialization value should also be for a group of UEs.

The PUCCH resources: these resources may be one or more sets of resources triggered by the power saving signal/channel. These resources are used for the PUCCH carrying aperiodic channel state information (A-CSI) transmitted by the UE. The resource carrying the A-CSI may be the same as the resource carrying periodic channel state information (P-CSI), and the resource carrying the A-CSI may be different from the resource carrying the P-CSI. The PUCCH resource may be indicated by the power saving signal/channel (e.g. 1-bit "0" denotes that the first set of resources is used, and 1-bit "1" denotes that the second set of resources is used. When the power saving signal/channel is scrambled using the C-RNTI, the first set of resources is used; as another example, when the power saving signal/channel is scrambled using the PS-RNTI, it indicates that the second set of resources is used). These resources may be on different BWPs in different serving cells. In one embodiment, the first set of PUCCH resources refers to resources having the smallest identity (smallest pucch-ResourceId). In one embodiment, the first set of PUCCH resources refers to resources with pucch-ResourceId=0. In one embodiment, the first set of PUCCH resources refers to resources with pucch-ResourceId=1. The identity of the second set of PUCCH resources is obtained by adding 2 to the identity of the previous set In one embodiment, the first set of PUCCH resources refers to resources of resource sets with PUCCH-ResourceSetId=0 and pucch-ResourceId=0.

The initialization value of the DM-RS sequence of the PUCCH: for example, the DM-RS may be scrambled using the PS-RNTI, that is, the PS-RNTI is used for initializing a sequence. The base station may configure one specific value to initialize a sequence of the DM-RS.

The scrambling manner of the PUCCH: for example, the bits before encoding PUCCH are scrambled using the PS-RNTI (for example, the PS-RNTI is used for generating a pseudo-random sequence, and then the pseudo-random sequence is modulo 2-added with the bits before encoding); as another example, the bits after encoding the PUCCH are scrambled using the PS-RNTI; as another example, the CRC of the PUCCH is scrambled using the PS-RNTI (for example, a modulo-2 addition is performed on the last 6 bits of the PS-RNTI and the CRC of 6 bits of the PUCCH; as another example, a modulo-2 addition is performed on the last 11 bits of the PS-RNTI and the CRC of 11 bits of the PUCCH; as another example, when the reported CSI has segments, a modulo-2 addition is performed on the last 11 bits of the PS-RNTI and the CRC of 11 bits of a first segment of the PUCCH, and a modulo-2 addition is performed on the first 11 bits of the PS-RNTI and the CRC of 11 bits of a second segment of the PUCCH; as another example, when the reported CSI has segments, a modulo-2 addition is performed on the last 11 bits of the PS-RNTI and the CRC of 11 bits of a first segment of the PUCCH, and a modulo-2 addition is performed on the 11 bits obtained by 6 to 16 bits of the PS-RNTI counted from back to front and the CRC of 11 bits of a second segment of the PUCCH; as another example, when the reported CSI has segments, a modulo-2 addition is performed on the last 11 bits of the PS-RNTI and the CRC of two segments of the PUCCH).

The PUSCH resources: these resources may be one or more resources triggered by the power saving signal/channel. These resources are used for the PUSCH carrying A-CSI transmitted by the UE. In one embodiment, the base station may configure one or more sets of PUSCH resources. In one embodiment, an identifying method of the identity of the PUSCH resource may be similar to the identifying method of the identity of the PUCCH resource described above.

The scrambling manner of the PUSCH: for example, the bits before encoding the PUSCH are scrambled using the PS-RNTI (for example, the PS-RNTI is used for generating a pseudo-random sequence, and then the pseudo-random sequence is modulo 2 added with the bits before the encoding). In one embodiment, the bits after encoding the PUSCH are scrambled using the PS-RNTI. In one embodiment, the CRC of the PUSCH is scrambled using the PS-RNTI. In one embodiment, the last 16 bits of the 24-bit CRC of the PUSCH are scrambled using the PS-RNTI. In one embodiment, the 16-bit CRC of the PUSCH is scrambled using the 16-bit PS-RNTI.

The initialization value of the DM-RS sequence of the PUSCH: for example, the DM-RS may be scrambled using the PS-RNTI, that is, the PS-RNTI is used for initializing a sequence. The base station may configure one specific value to initialize a sequence of the DM-RS.

A special BWP is configured for transmitting the power saving signal/channel. At this time, the CSI-RS or the TRS may be transmitted on this special BWP, which helps the decoding of the power saving signal/channel, and the UE performs AGC, synchronization, a CSI measurement, a CSI report, etc. In one embodiment, resources (e.g. a CORESET, a search space, a search space set) for transmitting the power saving signal/channel are configured on each BWP, but the base station only transmits the power saving signal/channel on the currently active BWP, and the UE only receives the power saving signal/channel on the currently active BWP. In one embodiment, resources (e.g. a CORESET, a search space, a search space set) for transmitting the power saving signal/channel are configured on only on a default BWP, the base station only transmits the power saving signal/channel on the default BWP, and the UE only receives the power saving signal/channel on the default BWP. In one embodiment, resources (e.g. a CORESET, a search space, a search space set) for transmitting the power saving signal/channel are configured on only on an initial BWP, the base station only transmits the power saving signal/channel on the initial BWP, and the UE only receives the power saving signal/channel on the initial BWP.

Secondly, the base station transmits the power saving signal/channel.

Thirdly, the base station transmits the CSI-RS. The base station may transmit one or more CSI-RSs. Such signals may be triggered by the power saving signal/channel, or independent of the power saving signal/channel. If a CSI-RS signal transmitted by the base station is triggered by the power saving signal/channel, the power saving signal/channel has 0 bit or 1 bit or 2 bits or 3 bits indicating what resource is used for transmitting the CSI-RS (for UEs that do not support power saving technology, this may be 0 bit). See Tables 20 and 21 below.

TABLE 20

| Triggering value of 1-bit CSI-RS of power saving signal/channel (CSI Request) | Meaning |
|---|---|
| 0 | No CSI-RS triggering |
| 1 | A set of CSI-RS resources or a first set of resources configured by the base station. |

TABLE 21

| Triggering value of 2-bit CSI-RS of power saving signal/channel (CSI Request) | Meaning |
|---|---|
| 00 | No CSI-RS triggering |
| 01 | A CSI-RS is transmitted on a first set of resources configured by the base station. |
| 10 | A CSI-RS is transmitted on a second set of resources configured by the base station. |
| 11 | A CSI-RS is transmitted on a third set of resources configured by the base station. |

In one embodiment, if the power saving signal/channel is directed to a single UE (i.e. UE-Specific), there are CSI-RS trigger (CSI Request) bits of 0 to 6 bits; and in an embodiment, there are CSI-RS trigger (CSI Request) bits of 0 to 3 bits. In one embodiment, if the power saving signal/channel is directed to a group of UEs (i.e. Group-Common), there are CSI-RS trigger (CSI Request) bits of 0 to 3 bits, and in an embodiment, there are CSI-RS trigger (CSI Request) bits of 0 to 2 bits. In one embodiment, the number of bits is configured by a higher layer.

In one embodiment, if the power saving signal/channel is transmitted during DRX-OFF or outside of DRX active time, there are CSI-RS trigger (CSI Request) bits of 0 to 3 bits, and in an embodiment, there are CSI-RS trigger (CSI Request) bits of 0 to 2 bits. In one embodiment, if the power saving signal/channel is transmitted at active time, there are CSI-RS trigger (CSI Request) bits of 0 to 6 bits, and in an embodiment, there are CSI-RS trigger (CSI Request) bits of 0 to 3 bits. In one embodiment, the number of bits is configured by a higher layer (such as RRC).

In one embodiment, if the power saving signal/channel is to express an operation such as "Go-To-Sleep (GTS)", then 2-bit CSI-RS trigger (CSI Request) is reserved; or a CSI-RS trigger (CSI Request) bit is used as other purposes, or fixed to "0" or "00".

In one embodiment, if the base station transmits the power saving signal/channel, the base station also needs to transmit the CSI-RS or the TRS. For example, the base station transmits power saving signal/channel and the CSI-RS at a same slot; as another example, after the base station transmits the power saving signal/channel at an $N^{th}$ slot, the base station transmits the CSI-RS at an $(N+K)^{th}$ slot; as another example, the base station transmits CSI-RS at an $(N-L)^{th}$ slot before transmitting the power saving signal/channel at the $N^{th}$ slot, where N, K and L are all integers. In one embodiment, if the $(N+K)^{th}$ slot is not within DRX-ON of the UE, the base station delays performing transmission until within the DRX-ON of the UE (e.g. on a first slot of the DRX-ON). In one embodiment, if the $(N+K)^{th}$ slot is not within the active time of the UE, the base station delays performing transmission until within the active time of the UE (e.g. on a first slot of the active time).

In one embodiment, if the power saving signal/channel to be transmitted by the base station indicates a BWP handover, the base station also needs to transmit the CSI-RS or the TRS. In one embodiment, if the power saving signal/channel to be transmitted by the base station indicates a BWP handover, the base station also needs to transmit the CSI-RS or the TRS on a target BWP, and the UE needs to receive the CSI-RS or the TRS on the target BWP.

In one embodiment, if the UE successfully receives the power saving signal/channel, the UE also needs to receive the CSI-RS or the TRS. In one embodiment, if the UE successfully decodes the power saving signal/channel, the UE also needs to report the CSI. In one embodiment, after the UE successfully decodes the power saving signal, the CSI is reported by using the PUSCH. In one embodiment, after the UE successfully decodes the power saving signal, aperiodic CSI is reported by using the PUSCH. In one embodiment, after the UE successfully decodes the power saving signal, the CSI is reported by using the PUCCH. In one embodiment, after the UE successfully decodes the power saving signal, aperiodic CSI is reported by using the PUCCH. In one embodiment, after the UE successfully decodes the power saving signal, periodic CSI is reported by using the PUCCH. In one embodiment, if the UE successfully decodes the power saving signal/channel, the UE also needs to transmit the SRS. For example, assuming that the UE successfully decodes the power saving signal/channel at the $N^{th}$ slot, the UE needs to receive the CSI-RS at the $(N+K)^{th}$ slot. As another example, assuming that the UE successfully decodes the power saving signal/channel at the $N^{th}$ slot, the UE needs to report the CSI at the $(N+M)^{th}$ slot. As another example, assuming that the UE successfully decodes the power saving signal/channel at the $N^{th}$ slot, the UE needs to transmit the SRS at an $(N+P)^{th}$ slot, where N, K, M and P are all integers. In one embodiment, if the $(N+K)^{th}$ slot is not within DRX-ON (or active time) of the UE, the UE receives the CSI-RS or the TRS within DRX-ON (or active time) of the UE (e.g. on a first slot of DRX-ON). In one embodiment, if the $(N+M)^{th}$ slot is not within DRX-ON (or active time) of the UE, the UE reports the CSI within DRX-ON (or active time) of the UE (e.g. on a $Q^{th}$ slot of DRX-ON, where Q is an integer, such as Q=4). In one embodiment, if the $(N+P)^{th}$ slot is not within DRX-ON (or active time) of the UE, the UE transmits the SRS within DRX-ON (or active time) of the UE (e.g. on an $R^{th}$ slot of DRX-ON, where R is an integer, such as R=2). In one embodiment, the SRS triggered by the power saving signal/channel is transmitted after the CSI-RS triggered by the power saving signal/channel, and there is a time offset between the SRS triggered by the power saving signal/channel and the CSI-RS triggered by the power saving signal/channel (e.g. an offset X=2 slots). In one embodiment, the SRS triggered by the power saving signal/channel is transmitted before the CSI-RS triggered by the power saving signal/channel, and there is a time offset between the SRS triggered by the power saving signal/channel and the CSI-RS triggered by the power saving signal/channel (e.g. an offset X=3 slots).

In one embodiment, when the UE uses the PUSCH to report the aperiodic CSI, a to-be-transmitted bit ($b^{(q)}(i)$) in the PUSCH is scrambled according to the PS-RNTI, as follows:

$$\tilde{b}^{(q)}(i) = (b^{(q)}(i) + c^{(q)}(i)) \bmod 2.$$

Here, $\tilde{b}^{(q)}(i)$ is a scrambled bit, $c^{(q)}(i)$ is a scrambling sequence, and mod 2 is a modulo of 2 over the sum of $\tilde{b}^{(q)}(i)$ and $c^{(q)}(i)$ (i.e. modulo-2 addition). The scrambling sequence is initialized with the following initialization seed $c_{init}$:

$$c_{init} = n_{RNTI} \cdot 2^{15} + n_{ID}.$$

Here, $n_{RNTI}$ is a value of the PS-RNTI, and $n_{ID}$ is a parameter configured by a higher layer. In one embodiment, $n_{RNTI}$ is a value of the C-RNTI or a value of a modulation coding scheme C-RNTI (MCS-C-RNTI) or the configured scheduling RNTI (CS-RNTI), and $n_{ID}$ is a value of the PS-RNTI (or $n_{ID} = n_{PS-RNTI} \bmod 2^{10}$).

In one embodiment, when the UE uses the PUSCH to report the aperiodic CSI, and the PS-RNTI is used as a part of an initialization seed $c_{init}$ of a DM-RS sequence in the PUSCH, as follows:

$$c_{init} = (2^{17}(N_{symb}^{slot} n_{s,f}^{\mu} + l + 1)(2N_{ID}^{nSCID} + 1) + 2N_{ID}^{nSCID} + n_{SCID}) \bmod 2^{31}.$$

Here, $N_{symb}^{slot}$ is the number of symbols in one slot, $n_{s,f}^{\mu}$ is a slot identity of a current radio frame when a subcarrier interval is configured as $\mu$, l is a symbol index $n_{SCID} = \{0,1\}$ is a parameter configured by the higher layer, and $N_{ID}^{nSCID} = n_{PS-RNTI}$ (i.e. $N_{ID}^{0} = n_{PS-RNTI}$ and $N_{ID}^{1} = n_{PS-RNTI}$). In one embodiment, $N_{ID}^{0} = n_{PS-RNTI}$ and $N_{ID}^{1} = n_{C-RNTI}$. In one embodiment, when the PDCCH/DCI transmitted by triggering the PUSCH (e.g. reporting the CSI) is scrambled using the C-RNTI or MCS-C-RNTI or CS-RNTI or PS-RNTI, $N_{ID}^{0} = n_{PS-RNTI}$.

In one embodiment, when the UE uses the PUCCH to report the aperiodic CSI (or to feed back an acknowledge (ACK) message), a to-be-transmitted bit ($b(i)$) in the PUCCH is scrambled according to the PS-RNTI, as follows:

$$\tilde{b}(i) = (b(i) + c(i)) \bmod 2.$$

Here, $\tilde{b}(i)$ is a scrambled bit, $c(i)$ is a scrambling sequence, and mod 2 is a modulo of 2 over the sum of $\tilde{b}(i)$ and $c(i)$ (i.e. modulo-2 addition). The scrambling sequence is initialized with the following initialization seed $c_{init}$:

$$c_{init} = n_{RNTI} \cdot 2^{15} + n_{ID}.$$

Here, $n_{RNTI}$ is a value of the PS-RNTI, and $n_{ID}$ is a parameter configured by a higher layer. In one embodiment, $n_{RNTI}$ is a value of the C-RNTI, and $n_{ID}$ is a value of the PS-RNTI (or $n_{ID}=n_{PS-RNTI}$ mod $2^{10}$).

In one embodiment, when the UE uses the PUCCH to report the aperiodic CSI (or to feed back an ACK), and the PS-RNTI is used as a part of an initialization seed $c_{init}$ of a DM-RS sequence in the PUCCH, as follows:

$$c_{init}=(2^{17}(N_{symb}{}^{slot}n_{s,f}{}^{\mu}+l+1)(2N_{ID}{}^{0}+1)+2N_{ID}{}^{0}) \bmod 2^{31}.$$

Here, $N_{symb}{}^{slot}$ is the number of symbols in one slot, $n_{s,f}{}^{\mu}$ is a slot identity of a current radio frame when a subcarrier interval is configured as $\mu$, and $l$ is a symbol index, $N_{ID}{}^{0}=n_{PS-RNTI}$.

In one embodiment, the PS-RNTI is used as part of an initialization seed $c_{init}$ of a DM-RS sequence in the PUCCH, as follows:

$$c_{init}=\lfloor n_{ID}/30 \rfloor; \text{ or}$$

$$c_{init}=2^5 \lfloor n_{ID}/30 \rfloor + (n_{ID} \bmod 30).$$

Here, $\lfloor \cdot \rfloor$ is a round-down operation, $n_{ID}$ is a value of the PS-RNTI or $n_{ID}=n_{PS-RNTI}$ mod $2^{10}$.

In one embodiment, the PS-RNTI is used as part of a generation parameter $f_{ss}$ of a DM-RS sequence in the PUCCH, as follows:

$$f_{ss}=n_{ID} \bmod 30.$$

Here, $n_{ID}$ is a value of the PS-RNTI or $n_{ID}=n_{PS-RNTI}$ mod $2^{10}$.

In one embodiment, if the higher layer (referring to RRC) configures $n_{ID}$, then $f_{ss}=(n_{ID}+n_{PS-RNTI}) \bmod 30$, or simply, a value of $n_{ID}+n_{PS-RNTI}$ is used for replacing a value of $n_{ID}$.

In one embodiment, if the power saving signal/channel decoded by the UE indicates a BWP handover, the UE also needs to receive the CSI-RS or the TRS. In one embodiment, if the power saving signal/channel decoded by the UE indicates the BWP handover, the UE also needs to report the CSI. In one embodiment, if the power saving signal/channel decoded by the UE indicates the BWP handover, the UE also needs to transmit the SRS.

In one embodiment, the first set of CSI-RS resources (NZP-CSI-RS-ResourceId=0 or NZP-CSI-RS-ResourceId=1) corresponds to a first downlink beam. In one embodiment, the first set of CSI-RS resources (NZP-CSI-RS-ResourceId=0 or NZP-CSI-RS-ResourceId=1) of the first set of CSI-RS resource sets (resourceSet=0 or resourceSet=1) correspond to a first downlink beam. The identity of a second set of PUCCH resources (NZP-CSI-RS-ResourceId) is obtained by adding 1 to the identity of the previous set of CSI-RS resources. A first uplink beam is determined by SRS resources corresponding to the first set of CSI-RS resource sets. In one embodiment, the first set of CSI-RS resource sets (resourceSet=0 or resourceSet=1) corresponds to a first downlink beam set, and one beam set may include one or more beams. In one embodiment, one downlink beam set corresponds to one uplink beam set. In one embodiment, the CSI-RS resources triggered by the power saving signal/channel are transmitted using a single antenna port (e.g. a port with identity 0 or 3000). In one embodiment, the CSI-RS resources triggered by the power saving signal/channel are transmitted using two antenna ports (e.g. two ports with identities 0 and 1, or 3000 and 3001). In one embodiment, the CSI-RS resources triggered by the power saving signal/channel are transmitted using four antenna ports (e.g. four ports with identities 0, 1, 2 and 3, or 3000, 3001, 3002 and 3003). In one embodiment, the CSI-RS resources triggered by the power saving signal/channel are transmitted using eight antenna ports (e.g. eight ports with identities are 0, 1, 2, 7, or 3000, 3001, 3007)).

Then, the base station triggers the UE to transmit the PUSCH or the PUCCH (to report the CSI). In one embodiment, after the UE successfully decodes the power saving signal/channel, the UE needs to measure the CSI-RS on the resources configured by the base station and report the CSI on the configured PUCCH resources. In one embodiment, after the UE successfully decodes the power saving signal/channel, the UE needs to measure the CSI-RS on the resources configured by the base station and report the CSI on the configured PUSCH resources. In one embodiment, after the UE successfully decodes the power saving signal/channel, the UE needs to measure the CSI-RS on the resources configured by the base station and report the CSI on the configured PUSCH resources or the configured PUCCH resources. In one embodiment, the UE should give preference to the PUCCH resources for reporting. After the above operation is performed, the UE may measure a channel condition of the downlink. After receiving the PUSCH or the PUCCH, the base station knows the channel condition of the downlink, or may infer a channel condition of the uplink (through the DM-RS). After the base station knows the channel conditions, the transmission efficiency between the base station and the UE can be improved, thereby completing the data transmission more quickly and reducing the traffic delay and the power consumption of the UE.

Figure 12:
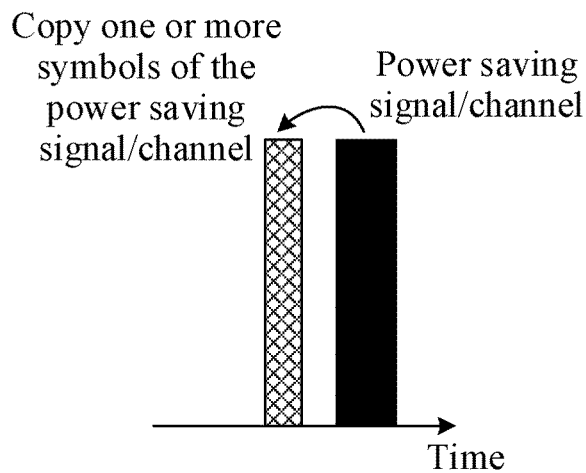
FIG. 12 is a schematic diagram of copying one or more symbols of a power saving signal/channel to enhance decoding performance of the power saving signal/channel according to an embodiment.

In a seventh exemplary implementation, FIG. 12 is a schematic diagram of copying one or more symbols of a power saving signal/channel to enhance decoding performance of the power saving signal/channel according to an embodiment.

Before transmitting the power saving signal/channel, the base station copies one or more symbols of a power saving signal/channel to be transmitted and transmits the one or more symbols before the power saving signal/channel. For example, assuming that the power saving signal/channel is composed of one OFDM symbol in time, the one OFDM symbol may be copied and transmitted on a symbol before the power saving signal/channel. In one embodiment, the one OFDM symbol may be copied and transmitted on a symbol before the power saving signal/channel and two symbols before the power saving signal/channel (i.e., two symbols are transmitted). In one embodiment, the one OFDM symbol may be copied and transmitted on a symbol before the power saving signal/channel, two symbols before the power saving signal/channel and three symbols before the power saving signal/channel (i.e., three symbols are transmitted).

In one embodiment, the one OFDM symbol may be copied and transmitted on a second symbol before the power saving signal/channel (i.e., there is one symbol used for separating, and one symbol is transmitted in total).

In one embodiment, the one OFDM symbol may be copied and transmitted on a third symbol before the power saving signal/channel (i.e., there are two symbols used for separating, and one symbol is transmitted in total).

In one embodiment, the one OFDM symbol may be copied and transmitted on a slot before the power saving signal/channel (i.e., there is one slot used for separating, i.e., there are fourteen symbols used for separating, and one symbol is transmitted in total).

In one embodiment, the one OFDM symbol may be copied and transmitted on two slots before the power saving signal/channel (i.e., there are two slots used for separating, i.e., there are twenty-eight symbols used for separating, and one symbol is transmitted in total).

Assuming that the power saving signal/channel is composed of two OFDM symbols in time, a second symbol may be copied and transmitted on a symbol before the power saving signal/channel. In one embodiment, the two symbols may be copied and transmitted before power saving signal/channel.

Assuming that the power saving signal/channel is composed of three OFDM symbols in time, a third symbol may be copied and transmitted on a symbol before the power saving signal/channel. In one embodiment, the three symbols may be copied and transmitted before power saving signal/channel.

In one embodiment, when the copy is performed, an order of the resource elements (REs) of the power saving signal/channel may be reversed to distinguish a real power saving (PS) signal from a copy symbol. For example, assuming that the power saving signal/channel is composed of one OFDM symbol in time and M sub-carriers in frequency (numbered 0, 1, 2, 3, M−2, M−1), the copied RE may be placed in a reverse order (e.g. placed in an order of M−1, M−2, M−3, 2, 1, 0).

In one embodiment, when the copy is performed, the power saving signal/channel may be offset by a fixed phase. For example, $\exp(-j\theta)$ is multiplied with the data on each RE, where exp ( ) is an exponent based on a natural logarithm, J is an imaginary unit, and $\theta$ is a phase.

After the above technology is used, the UE can combine the power saving signal/channel with the copy content received before, thereby improving the decoding performance of the power saving signal/channel and saving power for the UE.

Figure 13:
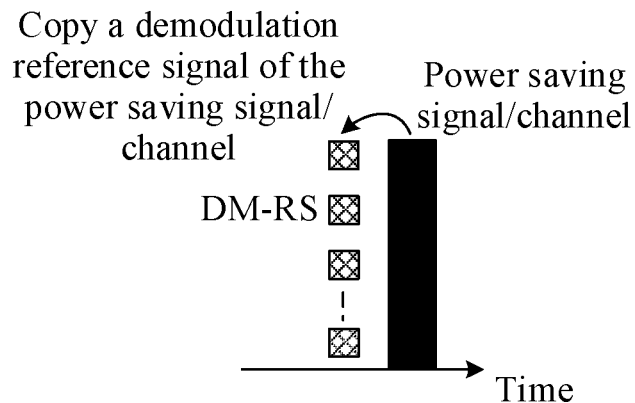
FIG. 13 is a schematic diagram of copying a demodulation reference signal of a power saving signal/channel to enhance decoding performance of the power saving signal/channel according to an embodiment.

In an eighth exemplary implementation, FIG. 13 is a schematic diagram of copying a demodulation reference signal of a power saving signal/channel to enhance decoding performance of the power saving signal/channel according to an embodiment.

Before transmitting the power saving signal/channel, the base station copies a DM-RS of a power saving signal/channel to be transmitted and transmits the DM-RS before the power saving signal/channel. For example, assuming that the power saving signal/channel is composed of one OFDM symbol in time, a DM-RS in the one OFDM symbol may be copied and transmitted on a symbol before the power saving signal/channel. In one embodiment, the one OFDM symbol may be copied and transmitted on one symbol before the power saving signal/channel and two symbols before the power saving signal/channel (i.e., the DM-RS of two symbols are transmitted). In one embodiment, the one OFDM symbol may be copied and transmitted on a symbol before the power saving signal/channel, two symbols before the power saving signal/channel and three symbols before the power saving signal/channel (i.e., the DM-RS of three symbols are transmitted).

In one embodiment, a DM-RS of the one OFDM symbol may be copied and transmitted on a second symbol before the power saving signal/channel (i.e., there is one symbol used for separating, and a DM-RS of one symbol is transmitted in total).

In one embodiment, a DM-RS of the one OFDM symbol may be copied and transmitted on a third symbol before the power saving signal/channel (i.e., there are two symbol used for separating, and a DM-RS of one symbol is transmitted in total).

In one embodiment, a DM-RS of the one OFDM symbol may be copied and transmitted on a slot before the power saving signal/channel (i.e., there is one slot used for separating, i.e., there are fourteen symbols used for separating, and a DM-RS of one symbol is transmitted in total).

In one embodiment, a DM-RS of the one OFDM symbol may be copied and transmitted on two slots before the power saving signal/channel (i.e., there are two slots used for separating, i.e., there are twenty-eight symbols used for separating, and a DM-RS of one symbol is transmitted in total).

Assuming that the power saving signal/channel is composed of two OFDM symbols in time, DM-RSs in the two OFDM symbols may be copied and transmitted on two symbols before the power saving signal/channel according to an original order.

Assuming that the power saving signal/channel is composed of two OFDM symbols in time, all DM-RSs in the two OFDM symbols may be copied and transmitted on one symbol before the power saving signal/channel according to an order of time first and frequency later (the density of DM-RS is generally ¼ or ⅓, so all DM-RSs can be placed).

Assuming that the power saving signal/channel is composed of two OFDM symbols in time, all DM-RSs in the two OFDM symbols may be copied and transmitted on a first symbol of one slot before the power saving signal/channel according to an order of time first and frequency later.

Assuming that the power saving signal/channel is composed of three OFDM symbols in time, DM-RSs in the three OFDM symbols may be copied and transmitted on three symbols before the power saving signal/channel according to an original order.

Assuming that the power saving signal/channel is composed of three OFDM symbols in time, all DM-RSs in the three OFDM symbols may be copied and transmitted on one symbol before the power saving signal/channel according to an order of time first and frequency later.

In one embodiment, when the DM-RS is copied, an original initialization seed $c_{init}$ is maintained to unchanged. In one embodiment, when the DM-RS is copied, an initialization seed $c_{init}$ is re-generated by using a position where the DM-RS symbol is actually placed.

After the above technology is used, the UE can combine the DM-RS of the power saving signal/channel with the copied DM-RS content received before, thereby improving the demodulation/decoding performance of the power saving signal/channel and saving power for the UE.

In a ninth exemplary implementation, first, a base station configures some configuration parameters for the UE. These configuration parameters include: a resource of a reference signal (e.g. a CSI-RS, a TRS) transmitted before transmitting the power saving signal/channel; a resource (such as CORESET, search space, search space set) used by the power saving signal/channel; a resource of a reference signal (e.g. a CSI-RS, a TRS; the TRS may be obtained by performing a certain configuration for the CSI-RS) transmitted after transmitting the power saving signal/channel; a resource on which the UE transmits a reference signal (e.g. an SRS); and a resource (e.g. a PUCCH resource of CSI reported by the UE, a PUSCH resource of CSI reported by the UE) on which the UE transmits an uplink channel (e.g. a PRACH, a PUCCH, a PUSCH).

Secondly, the base station transmits a reference signal before transmitting the power saving signal/channel.

Then, the base station transmits the power saving signal/channel. Some bit domains of the power saving signal/channel trigger the base station and/or the UE to perform a certain operation. See Tables 22 to 24 below.

TABLE 22

| 1 bit in the power saving signal/channel | Meaning |
|---|---|
| 0 | No operation. |
| 1 | The base station transmits a TRS before transmitting the power saving signal/channel; and the base station will soon transmit a CSI-RS after transmitting the power saving signal/channel; and the UE needs to transmit an SRS (in one embodiment, the SRS needs to correspond to the above CSI-RS). |

TABLE 23

| 2 bits in the power saving signal/channel | Meaning |
|---|---|
| 00 | No operation. |
| 01 | The base station transmits a TRS before transmitting the power saving signal/channel. |
| 10 | The base station transmits a TRS before transmitting the power saving signal/channel; and the base station will soon transmit a CSI-RS after transmitting the power saving signal/channel. |
| 11 | The base station transmits a TRS before transmitting the power saving signal/channel; and the base station will soon transmit a CSI-RS after transmitting the power saving signal/channel; and the UE needs to transmit an SRS (in one embodiment, the SRS needs to correspond to the above CSI-RS). |

TABLE 24

| 3 bits in the power saving signal/channel | Meaning |
|---|---|
| 000 | No operation. |
| 001 | The base station transmits a TRS before transmitting the power saving signal/channel. |
| 010 | The base station transmits a TRS before transmitting the power saving signal/channel; and the base station will soon transmit a CSI-RS after transmitting the power saving signal/channel. |
| 011 | The base station transmits a TRS before transmitting the power saving signal/channel; and the base station will soon transmit a CSI-RS after transmitting the power saving signal/channel; and the UE needs to transmit an SRS (in one embodiment, the SRS needs to correspond to the above CSI-RS). |
| 100 | The base station will soon transmit a TRS after transmitting the power saving signal/channel. |
| 101 | The base station will soon transmit a CSI-RS after transmitting the power saving signal/channel; and the UE needs to report CSI. |
| 110 | The base station will soon transmit a CSI-RS after transmitting the power saving signal/channel; and the UE needs to transmit an SRS (in one embodiment, the SRS needs to correspond to the above CSI-RS); and the UE needs to report CSI. |
| 111 | The base station transmits a TRS before transmitting the power saving signal/channel; and the base station will soon transmit a CSI-RS after transmitting the power saving signal/channel; and the UE needs to transmit an SRS (in one embodiment, the SRS needs to correspond to the above CSI-RS); and the UE needs to report CSI. |

In one embodiment, the base station directly performs operations according to "1" of the 1 bit or "11" of the 2 bits or "111" of the 3 bits in the above tables. In one embodiment, the power saving signal/channel does not have a corresponding bit, but the UE performs operations according to "1" of the 1 bit or "11" of the 2 bits or "111" of the 3 bits in the above tables after successfully receiving the power saving signal/channel.

In one embodiment, if the power saving signal/channel is intended to express "Go-To-Sleep (GTS)", then both the base station and the UE directly perform operations according to "0" of the 1 bit or "00" of the 2 bits or "000" of the 3 bits in the above tables. That is, there is no operation. In one embodiment, when a triggering bit domain of the power saving signal/channel is all "0", it indicates that the UE has no operation. In one embodiment, when a triggering bit domain of the power saving signal/channel is all "0", it indicates that there is no a CSI triggering. In one embodiment, when a triggering bit domain of the power saving signal/channel is all "0", it indicates that there is no a CSI-RS triggering (thereby, there is no a CSI report). In one embodiment, when a triggering bit domain of the power saving signal/channel is all "0", it indicates that there is no triggering a CSI report. In one embodiment, when a triggering bit domain of the power saving signal/channel is all "0", it indicates that there is no an SRS triggering.

After the above operation is performed, the UE may measure a channel condition of the downlink. After receiving the PUSCH or the PUCCH (where the CSI report is carried on the PUCCH or the PUSCH), the base station knows the channel condition of the downlink, or may infer a channel condition of the uplink. After the base station knows the channel conditions, the transmission efficiency between the base station and the UE can be improved, thereby completing the data transmission more quickly and reducing the traffic delay and the power consumption of the UE.

In a tenth exemplary implementation, first, a base station configures some configuration parameters for the UE. These configuration parameters include: a resource on which the UE transmits a reference signal (e.g. an SRS); and a resource on which the UE transmits the acknowledgement correct reception (ACK) for the power saving signal/channel carried on the PUCCH (e.g. format 0 or format 1 used for the PUCCH; a time offset of the PUCCH relative to the power saving signal/channel; a time offset of the PUCCH relative to the above SRS; a frequency resource used for PUCCH).

Secondly, the base station transmits the power saving signal/channel.

Then, the UE receives the power saving signal/channel.

Then, the UE transmits the SRS if the power saving signal/channel is successfully decoded. If the power saving signal/channel is directed to a group of UEs (i.e., a group common, e.g. when the power saving signal/channel is scrambled using the PS-RNTI), the UE transmits the SRS on a first set of SRS resources. If the power saving signal/channel is directed to a single UE (i.e., the UE is dedicated, e.g. when the power saving signal/channel is scrambled using C-RNTI or CS-RNTI or MCS-RNTI), the UE transmits the SRS on a second set of SRS resources.

Finally, the UE transmits the ACK through the PUCCH if the power saving signal/channel is successfully decoded. If the power saving signal/channel is directed to a group of UEs (i.e., a group common), the UEs transmit the PUCCH (carrying the ACK) on a first set of PUCCH resources. If the power saving signal/channel is directed to a single UE (i.e., the UE is dedicated), the UE transmits the PUCCH on a second set of PUCCH resources.

In one embodiment, if the UE needs to transmit the ACK (carried on the PUCCH) for the power saving signal/channel, then the UE needs a first one slot of the PUCCH to transmit the SRS. In one embodiment, if the UE needs to transmit the ACK (carried on the PUCCH) for the power saving signal/channel, then the UE needs first two slots of the PUCCH to transmit the SRS (transmit once). In one embodiment, if the UE needs to transmit the ACK (carried on the PUCCH) for the power saving signal/channel, then the UE needs both the first one slot and the first two slots of the PUCCH to transmit the SRS (transmit twice). In one embodiment, if the UE needs to transmit the ACK (carried on the PUCCH) for the power saving signal/channel, then the UE needs a first one symbol of the PUCCH to transmit the SRS. In one embodiment, if the UE needs to transmit the ACK for the power saving signal/channel, then the UE needs the first one symbol and the first two symbols of the PUCCH to transmit the SRS (transmit twice in total). In one embodiment, if the UE needs to transmit the ACK for the power saving signal/channel, then the UE needs the first one to the first three symbols of the PUCCH to transmit the SRS (transmit three times in total). In one embodiment, if the UE needs to transmit the ACK for the power saving signal/channel, then the UE needs the first one to the first four symbols of the PUCCH to transmit the SRS (transmit four times in total).

After the above operation is performed, the UE may measure a channel condition of the downlink. After receiving the SRS, the base station knows the channel condition of the uplink, so that the base station can better decode the PUCCH. After the base station knows the correct decoding of the power saving signal/channel and the channel condition, the transmission efficiency between the base station and the UE can be improved, thereby completing the data transmission more quickly and reducing the traffic delay and the power consumption of the UE.

In an eleventh exemplary implementation, first, a base station configures some configuration parameters for a UE. These configuration parameters include: cycle (T) and an offset (O) of the base station transmitting power saving signal/channel, a duration (D) of the base station transmitting the power saving signal/channel, a resource on which the base station transmits a reference signal (e.g. a CSI-RS), time (B) of the reference signal (e.g. a CSI-RS) transmitted earlier than the power saving signal/channel, time (A) of the reference signal (e.g. a CSI-RS) transmitted later than the power saving signal/channel, a resource on which the UE transmits a reference signal (e.g. an SRS), a time difference (S) of the SRS relative to the power saving signal/channel, a PUCCH resource on which the UE reports CSI, a PUSCH resource on which the UE reports CSI, a maximum number of multi-input multi-output layers (maxMIMO-Layers) for a carrier (or a serving cell), a maximum number of multi-input multi-output layers for one BWP (maxMIMO-Layers-BWP), and a timer of a maximum number of multi-input multi-output layers for one BWP (maxMIMO-Layers-BWP-Timer).

In one embodiment, the base station may separately configure a cycle and an offset of a wake-up signal (WUS) in the power saving signal/channel and a cycle and an offset of a go-to-sleep (GTS) in the power saving signal/channel. The units of the cycle and the offset may be slot, radio frame, millisecond, second. For example, T=100 slots, O=5 slots (where the offset is the time difference relative to the first slot of the radio frame whose system frame identity is SFN=0).

For example, the duration (D) of the base station transmitting the power saving signal/channel may be D=2 slots which are continuously transmitted.

For example, time (B) of the reference signal transmitted earlier than the power saving signal/channel may be B=2 slots.

For example, the time (A) of the reference signal transmitted later than the power saving signal/channel may be A=1 slot.

For example, the time difference (S) of the SRS relative to the power saving signal/channel may be S=3 slots.

For the maximum number of multi-input multi-output layers (maxMIMO-Layers) for a carrier (or a serving cell), this parameter may be applied to a BWP belonging to this carrier. This parameter is a positive integer. In one embodiment, a value range of this parameter is 1 to 8. In one embodiment, this parameter may be for a downlink direction (e.g. for a PDSCH). In one embodiment, this parameter may be for an uplink direction (e.g. for a PUSCH).

For the maximum number of multi-input multi-output layers for one BWP (maxMIMO-Layers-BWP), this parameter is a positive integer. In one embodiment, a value range of this parameter is 1 to 8. In an embodiment, the appearance of this parameter is optional (that is, the base station may not configure this parameter). If this parameter does not appear, the UE should replace a value of the maxMIMO-Layers-BWP with the maxMIMO-Layers for the carrier. In one embodiment, if this parameter does not appear, the value of the maxMIMO-Layers-BWP is 2.

For the timer of a maximum number of multi-input multi-output layers for one BWP (maxMIMO-Layers-BWP-Timer), in one embodiment, the timer is started when a BWP becomes active (i.e., the BWP becomes the active BWP). When the timer times out, the maxMIMO-Layers-BWP should take a value of the maxMIMO-Layers. In one embodiment, when the timer times out, the maxMIMO-Layers-BWP should take a value of min(maxMIMO-Layers, maxMIMO-Layers-BWP), where min( ) is the smaller one of maxMIMO-Layers and maxMIMO-Layers-BWP. In one embodiment, when the timer times out, the maxMIMO-Layers-BWP should take a value of min(2, maxMIMO-Layers-BWP).

Secondly, the base station transmits the CSI-RS. For example, the base station transmits the CSI-RS 2 slots (B=2 slots) earlier than the power saving signal/channel.

Thirdly, the base station transmits the power saving signal/channel. Assuming that a subcarrier interval used by the base station is 15 kHz, a length of one slot is 1 ms, and a length of one radio frame is F=10 ms. Assuming that the cycle T=100 slots=100 ms, the offset O=5 slots=5 ms, and continuous transmission D=2 slots, the base station transmits the power saving signal/channel every T/F=100/10=10 radio frames, continuously transmits for D=2 slots each time, and transmits at moments when slots are O and O+1 each time. i.e., transmits on slots 5 and 6 of each radio frame.

The base station transmits the power saving signal/channel when the following condition is met:

$$O = \mathrm{mod}(SFN*F + SLOT, T).$$

Here, O is a transmission time offset of the power saving signal/channel, mod( ) is a modulo operation, SFN is the system frame number (which is 0, . . . , 1023), F is a length of a radio frame, SLOT is a current slot identity (which is 0, . . . , 9), and T is a transmission cycle of the power saving signal/channel.

In one embodiment, when the UE meets the above conditions, the UE may receive the power saving signal/channel.

In one embodiment, the power saving signal/channel has a wake-up function (WUS, which informs the UE that it needs to receive the PDCCH) and a go-to-sleep function (GTS, which informs the UE that it does not need to receive the PDCCH).

Then, the base station transmits the CSI-RS for a second time. For example, the base station transmits the CSI-RS later 1 slot (A=1 slot) than the power saving signal/channel.

Finally, the UE transmits an SRS corresponding to the CSI-RS transmitted by the base station for the second time, and reports the CSI.

In one embodiment, if the base station configures a plurality of carriers (i.e., a plurality of serving cells) to the UE, the base station may perform the same operation on each carrier, and the UE may also perform the same operation on each carrier. These operations may be performed simultaneously or independently on the carriers. In one embodiment, other operations (e.g. transmission/reception of the CSI-RS, transmission of the SRS) may be performed synchronously on the carriers except that there is the power saving signal/channel (while there is no power saving signal/channel on a secondary carrier) on a primary carrier (primary cell (PCell)). That is, the power saving signal/channel on the primary carrier (PCell) will trigger the UE to report the CSI of each carrier (or serving cell). In one embodiment, other operations (e.g. transmission/reception of the CSI-RS, transmission of the SRS) may be performed synchronously on the carriers except that there is the power saving signal/channel (while there is no power saving signal/channel on a secondary cell group (SCG)) on a master cell group (MCG). In one embodiment, other operations (e.g. transmission/reception of the CSI-RS, transmission of the SRS) may be performed synchronously on the cells except that there is the power saving signal/channel (while there is no power saving signal/channel on other cells) on a special cell (SpCell)). In one embodiment, other operations (e.g. transmission/reception of the CSI-RS, transmission of the SRS) may be performed synchronously on the cells except that there is the power saving signal/channel (while there is no power saving signal/channel on other cells) on a PUCCH secondary cell group (PUCCH-SCell)). In one embodiment, a respective power saving signal/channel on each carrier (serving cell) may trigger the UE to report CSI of the respective carrier (or serving cell). In one embodiment, the power saving signal/channel on the primary carrier (PCell) may trigger the UE to receive a CSI-RS of each carrier (or serving cell). In one embodiment, a respective power saving signal/channel on each carrier (serving cell) may trigger the UE to receive a CSI-RS of a respective carrier (or serving cell). In one embodiment, the power saving signal/channel on the primary carrier (PCell) may trigger the UE to transmit an SRS on each carrier (or serving cell). In one embodiment, a respective power saving signal/channel on each carrier (serving cell) may trigger the UE to transmit an SRS on a respective carrier (or serving cell). In one embodiment, the power saving signal/channel on the primary carrier (PCell) may trigger the base station to transmit a CSI-RS on each carrier (or serving cell). In one embodiment, a respective power saving signal/channel on each carrier (serving cell) may trigger the base station to transmit a CSI-RS on a respective carrier (or serving cell). In one embodiment, a carrier indication in the power saving signal/channel may indicate which carrier or carriers require the UE to report the CSI. In one embodiment, a carrier indication in the power saving signal/channel may indicate which carrier or carriers require the UE to receive a CSI-RS. In one embodiment, a carrier indication in the power saving signal/channel may indicate which carrier or carriers require the UE to transmit an SRS. In one embodiment, the power saving signal/channel may indicate that the primary carrier and the activated secondary carrier require the UE to report the CSI. In one embodiment, the power saving signal/channel may trigger the primary carrier and the activated secondary carrier to require the UE to transmit the SRS. In one embodiment, the power saving signal/channel may indicate that the primary carrier and the activated secondary carrier require the UE to report the CSI. In one embodiment, the power saving signal/channel will trigger the primary carrier and the activated secondary carrier to require the UE to transmit the SRS. In one embodiment, under a dual connection (DC) configuration, the above operations may be independently performed on the master cell group (MCG) and the secondary cell group (SCG).

In one embodiment, a bit domain in the power saving signal/channel indicates that the UE needs to report a carrier (or serving cell) of the CSI. In one embodiment, a bit domain in the power saving signal/channel indicates that the UE needs to transmit a carrier (or serving cell) of the SRS. See Tables 25 to 28 below.

TABLE 25

| 1-bit bit domain | Operation of UE |
| --- | --- |
| 0 | No operation. That is, the UE does not report CSI in all carriers. |
| 1 | The UE reports CSI in all carriers. Alternatively, the UE reports CSI in all activated carriers. Alternatively, the UE reports CSI in the primary carrier and all activated secondary carriers. |

TABLE 26

| 1-bit bit domain (another one independent domain; different from the above table) | Operation of UE |
| --- | --- |
| 0 | No operation. That is, the UE does not transmit an SRS in all carriers. |
| 1 | The UE transmits an SRS in all carriers. Alternatively, the UE transmits an SRS in all activated carriers. Alternatively, the UE transmits an SRS in the primary carrier and all activated secondary carriers. |

TABLE 27

| 1-bit bit domain | Operation of UE |
| --- | --- |
| 0 | No operation. That is, the UE does not report CSI and transmit an SRS in all carriers. |
| 1 | The UE reports CSI and also transmits an SRS in all carriers.<br>Alternatively, the UE reports CSI and also transmits an SRS in all activated carriers.<br>Alternatively, the UE reports CSI and also transmits an SRS in the primary carrier and all activated secondary carriers. |

TABLE 28

| 2-bit bit domain | Operation of UE |
| --- | --- |
| 00 | No operation. That is, the UE neither reports CSI nor transmits an SRS in all carriers. |
| 01 | The UE reports CSI and transmits an SRS in the primary carrier. |
| 10 | The UE reports CSI and transmits an SRS in all activated secondary carriers. |
| 11 | The UE reports CSI and also transmits an SRS in the primary carrier and all activated secondary carriers. |

In one embodiment, the power saving signal/channel has a reference signal (RS) indication bit with 0 to 10 bits for indicating a combination of the UE reporting the CSI or/and transmitting the SRS. These combinations are indicated by a media access control (MAC) control element (MAC CE). Assuming that the power saving signal/channel has 3-bit RS indication bits, and assuming that there are currently 10 activated carriers (serving cells), operations of these carriers may be indicated by the MAC CE. See Table 29 below.

TABLE 29

| 3-bit bit domain | Operation of UE |
| --- | --- |
| 000 | No operation. That is, the UE neither reports CSI nor transmits an SRS in all carriers. |
| 001-111 | The UE performs a corresponding operation according to a configuration table of the MAC CE. |

In one embodiment, if the base station configures a plurality of BWPs (each carrier may be configured with up to 4 BWPs, but only one BWP (called an active BWP) per carrier is active at a moment to receive or transmit data) to the UE, then the base station and the UE may perform the same above operation on the active BWP of each carrier. In one embodiment, the base station and the UE may perform the same above operations on the active BWP on the activated carrier. These operations may be performed synchronously (i.e. simultaneously) on the active BWP of each carrier or independently (i.e. not simultaneously, but asynchronously). In one embodiment, other operations (e.g. transmission/reception of the CSI-RS, transmission of the SRS) may be performed synchronously on the active BWP of the carriers except that there is the power saving signal/channel (while there is no power saving signal/channel on a secondary carrier) on an active BWP of a primary carrier. If a certain carrier has a BWP handover (e.g. the BWP handover or a downlink BWP handover performed by the UE triggered by the power saving signal/channel, or triggered by scheduling DCI, or triggered by downlink scheduling DCI, or triggered by the PDCCH, or triggered by scheduling downlink PDCCH), the base station and the UE need to perform the above operations (e.g. transmission/reception of the CSI-RS, transmission of the SRS) at a target BWP.

In one embodiment, after receiving the power saving signal/channel, the UE needs to report the CSI on each BWP. In one embodiment, after receiving the power saving signal/channel, the UE needs to report the CSI on each BWP of each carrier. In one embodiment, after receiving the power saving signal/channel, the UE needs to report the CSI on each BWP of each activated carrier. In one embodiment, after receiving the power saving signal/channel, the UE needs to report the CSI on an active BWP of each activated carrier. In one embodiment, after the power receiving saving signal/channel, the UE needs to report the CSI on a primary carrier and an active BWP of each activated secondary carrier. In one embodiment, after receiving the power saving signal/channel, the UE needs to transmit the SRS on each BWP. In one embodiment, after receiving the power saving signal/channel, the UE needs to transmit the SRS on each BWP of each carrier. In one embodiment, after receiving the power saving signal/channel, the UE needs to transmit the SRS on each BWP of each activated carrier. In one embodiment, after the receiving power saving signal/channel, the UE needs to transmit the SRS on an active BWP of each activated carrier. In one embodiment, after receiving the power saving signal/channel, the UE needs to transmit the SRS on a primary carrier and an active BWP of each activated secondary carrier. In one embodiment, after receiving the power saving signal/channel, the UE needs to report the CSI and transmit the SRS on each BWP. In one embodiment, after receiving the power saving signal/channel, the UE needs to report the CSI and transmit the SRS on each BWP of each carrier. In one embodiment, after receiving the power saving signal/channel, the UE needs to report the CSI and transmit the SRS on each BWP of each activated carrier. In one embodiment, after receiving the power saving signal/channel, the UE needs to report the CSI and transmit the SRS on an active BWP of each activated carrier. In one embodiment, after receiving the power saving signal/channel, the UE needs to report the CSI and transmit the SRS on a primary carrier and an active BWP of each activated secondary carrier.

In one embodiment, a bit domain in the power saving signal/channel indicates that the UE needs to report a BWP of the CSI. In one embodiment, a bit domain in the power saving signal/channel indicates that the UE needs to transmit a BWP of the SRS. See Tables 30 to 33 below.

TABLE 30

| 1-bit bit domain | Operation of UE |
| --- | --- |
| 0 | No operation. That is, the UE does not report CSI on all BWPs of all carriers. |
| 1 | The UE reports CSI on all BWPs of all carriers.<br>Alternatively, the UE reports CSI on all BWPs of all activated carriers.<br>Alternatively, the UE reports CSI on all BWPs of the primary carrier and all BWPs of all activated secondary carriers.<br>Alternatively, the UE reports CSI on all downlink BWPs of all carriers.<br>Alternatively, the UE reports CSI on all downlink BWPs of all activated carriers.<br>Alternatively, the UE reports CSI on all BWPs of the primary carrier and all downlink BWPs of all activated secondary carriers. |

TABLE 30-continued

| 1-bit bit domain | Operation of UE |
|---|---|
| | Alternatively, the UE reports CSI on all active BWPs of all carriers.
Alternatively, the UE reports CSI on all active BWPs of all activated carriers.
Alternatively, the UE reports CSI on an active BWP of the primary carrier and all active BWPs of all activated secondary carriers.
Alternatively, the UE reports CSI on all target BWPs having the BWP handover of all carriers.
Alternatively, the UE reports CSI on all target BWPs having the BWP handover of all activated carriers.
Alternatively, the UE reports CSI on a target BWP having the BWP handover of the primary carrier and all target BWPs having the BWP handover of all activated secondary carriers.
Alternatively, the UE reports CSI on all target downlink BWPs having the BWP handover of all carriers.
Alternatively, the UE reports CSI on all target downlink BWPs having the BWP handover of all activated carriers.
Alternatively, the UE reports CSI on a target downlink BWP having the BWP handover of the primary carrier and all target downlink BWPs having the BWP handover of all activated secondary carriers. |

TABLE 31

| 1-bit bit domain | Operation of UE |
|---|---|
| 0 | No operation. That is, the UE does not transmit an SRS on all BWPs of all carriers. |
| 1 | The UE transmits an SRS on all BWPs of all carriers.
Alternatively, the UE transmits an SRS on all BWPs of all activated carriers.
Alternatively, the UE transmits an SRS on all BWPs of the primary carrier and all BWPs of all activated secondary carriers.
Alternatively, the UE transmits an SRS on all uplink BWPs of all carriers.
Alternatively, the UE transmits an SRS on all uplink BWPs of all activated carriers.
Alternatively, the UE transmits an SRS on all uplink BWPs of the primary carrier and all uplink BWPs of all activated secondary carriers.
Alternatively, the UE transmits an SRS on all active BWPs of all carriers.
Alternatively, the UE transmits an SRS on all active BWPs of all activated carriers.
Alternatively, the UE transmits an SRS on an active BWP of the primary carrier and all active BWPs of all activated secondary carriers.
Alternatively, the UE transmits an SRS on all target BWPs having the BWP handover of all carriers.
Alternatively, the UE transmits an SRS on all target BWPs having the BWP handover of all activated carriers.
Alternatively, the UE transmits an SRS on a target BWP having the BWP handover of the primary carrier and all target BWPs having the BWP handover of all activated secondary carriers.
Alternatively, the UE transmits an SRS on all target uplink BWPs having the BWP handover of all carriers.
Alternatively, the UE transmits an SRS on all target uplink BWPs having the BWP handover of all activated carriers.
Alternatively, the UE transmits an SRS on a target uplink BWP having the BWP handover of the primary carrier and all target uplink BWPs having the BWP handover of all activated secondary carriers. |

TABLE 32

| 1-bit bit domain | Operation of UE |
|---|---|
| 0 | No operation. That is, the UE does not report CSI and transmit an SRS on all BWPs of all carriers. |
| 1 | The UE reports CSI and also transmits an SRS on all BWPs of all carriers.
Alternatively, the UE reports CSI and also transmits an SRS on all BWPs of all activated carriers.
Alternatively, the UE reports CSI and also transmits an SRS on all BWPs of the primary carrier and all BWPs of all activated secondary carriers.
Alternatively, the UE reports CSI and also transmits an SRS on an active BWP of the primary carrier and all active BWPs of all activated secondary carriers.
Alternatively, the UE reports CSI on a downlink active BWP of the primary carrier and all downlink active BWPs of all activated secondary carriers, and transmits an SRS on an uplink active BWP of the primary carrier and all uplink active BWPs of all activated secondary carriers.
Alternatively, the UE reports CSI on a target downlink BWP having the BWP handover of the primary carrier and all target downlink BWPs having the BWP handover of all activated secondary carriers, and transmits an SRS on a target uplink BWP having the BWP handover of the primary carrier and all target uplink BWPs having the BWP handover of all activated secondary carriers. |

TABLE 33

| 2-bit bit domain | Operation of UE |
|---|---|
| 00 | No operation. That is, the UE neither reports CSI nor transmits an SRS on all BWPs of all carriers. |
| 01 | The UE reports CSI and also transmit an SRS on all BWPs of the primary carrier. |
| 10 | The UE reports CSI and also transmits an SRS on all BWPs of all activated secondary carriers. |
| 11 | The UE reports CSI and transmits an SRS on all BWPs of the primary carrier and all BWPs of all activated secondary carriers. |

In one embodiment, the power saving signal/channel has an RS indication bit with 0 to 10 bits for indicating a combination of the UE reporting CSI of the BWP or/and transmitting the SRS on the BWP. These combinations are indicated by a media access control (MAC) control element (MAC CE). Assuming that the power saving signal/channel has 4-bit RS indication bit, and assuming that there are currently 16 activated carriers (serving cells) and 64 BWPs are configured on the 16 active carriers, operations on the BWPs of these carriers may be indicated by the MAC CE. See Table 34 below.

TABLE 34

| 3-bit bit domain | Operation of UE |
|---|---|
| 0000 | No operation. That is, the UE neither reports CSI nor transmits an SRS on all BWPs of all carriers. |
| 0001-1111 | The UE performs a corresponding operation according to a configuration table of a MAC CE. |

In one embodiment, if a certain carrier (or BWP) defines a dormant behavior or a dormant state, the base station and the UE need to perform the above operations (e.g. transmission/reception of the CSI-RS, transmission of the SRS) on the certain carrier (or BWP). In one embodiment, if a certain secondary carrier (or BWP) defines a dormant behavior or a dormant state, the base station needs to perform the above transmission operation of the CSI-RS on a dormant carrier (or BWP) before and after transmitting the power saving signal/channel on the primary carrier (or especial carrier, or special carrier). In one embodiment, if a certain secondary carrier (or BWP) defines a dormant behavior or a dormant state, the UE needs to perform the above reception operation of the CSI-RS, the above transmission operation of the SRS and the above report operation of the CSI on a dormant carrier (or dormant BWP) before and after receiving the power saving signal/channel on the primary carrier (or special carrier).

In one embodiment, if a certain secondary carrier defines a dormant behavior or a dormant state, a bit domain in the power saving signal/channel indicates that the UE needs to report a carrier (or serving cell) of the CSI. In one embodiment, a bit domain in the power saving signal/channel indicates that the UE needs to transmit a carrier (or serving cell) of the SRS. See Tables 35 to 38 below.

TABLE 35

| 1-bit bit domain | Operation of UE |
|---|---|
| 0 | No operation. That is, the UE does not report CSI on all carriers. |
| 1 | The UE reports CSI on all carriers. Alternatively, the UE reports CSI on all activated carriers. Alternatively, the UE reports CSI on all activated dormant carriers. Alternatively, the UE reports CSI on all activated carriers defining the dormant behavior. Alternatively, the UE reports CSI on the primary carrier and all activated secondary carriers. Alternatively, the UE reports CSI on the primary carrier and all activated dormant secondary carriers. Alternatively, the UE reports CSI on the primary carrier and all activated secondary carriers defining the dormant behavior. |

TABLE 36

| 1-bit bit domain | Operation of UE |
|---|---|
| 0 | No operation. That is, the UE does not transmit an SRS on all carriers. |
| 1 | The UE transmits an SRS on all carriers. Alternatively, the UE transmits an SRS on all activated carriers. Alternatively, the UE transmits an SRS on all activated dormant carriers. Alternatively, the UE transmits an SRS on all activated carriers defining the dormant behavior. Alternatively, the UE transmits an SRS on the primary carrier and all activated secondary carriers. Alternatively, the UE transmits an SRS on the primary carrier and all activated dormant secondary carriers. Alternatively, the UE transmits an SRS on the primary carrier and all activated secondary carriers defining the dormant behavior. |

TABLE 37

| 1-bit bit domain | Operation of UE |
|---|---|
| 0 | No operation. That is, the UE neither report CSI nor transmit an SRS on all carriers. |
| 1 | The UE reports CSI and also transmits an SRS on all carriers. Alternatively, the UE reports CSI and also transmits an SRS on all activated carriers. |

TABLE 37-continued

| 1-bit bit domain | Operation of UE |
|---|---|
| | Alternatively, the UE reports CSI and also transmits an SRS on all activated dormant carriers. Alternatively, the UE reports CSI and also transmits an SRS on all activated carriers defining the dormant behavior. Alternatively, the UE reports CSI and also transmits an SRS on the primary carrier and all activated secondary carriers. Alternatively, the UE reports CSI and also transmits an SRS on the primary carrier and all activated dormant secondary carriers. Alternatively, the UE reports CSI and also transmits an SRS on the primary carrier and all activated secondary carriers defining the dormant behavior. |

TABLE 38

| 2-bit bit domain | Operation of UE |
|---|---|
| 00 | No operation. That is, the UE neither reports CSI nor transmits an SRS on all carriers. |
| 01 | The UE reports CSI and also transmits an SRS on the primary carrier. |
| 10 | The UE reports CSI and also transmits an SRS on all activated secondary carriers. Alternatively, the UE reports CSI and also transmits an SRS on all activated dormant secondary carriers. Alternatively, the UE reports CSI and also transmits an SRS on all activated secondary carriers defining the dormant behavior. |
| 11 | The UE reports CSI and also transmits an SRS on the primary carrier and all activated dormant secondary carriers. Alternatively, the UE reports CSI and also transmits an SRS on the primary carrier and all activated secondary carriers defining the dormant behavior. |

In one embodiment, a bit domain in the power saving signal/channel indicates that the UE needs to report a BWP (including a dormant BWP and a BWP defining a dormant behavior) of the CSI. In one embodiment, a bit domain in the power saving signal/channel indicates that the UE needs to transmit a BWP (including a dormant BWP and a BWP defining a dormant behavior) of the SRS. See Tables 39 to 42 below.

TABLE 39

| 1-bit bit domain | Operation of UE |
|---|---|
| 0 | No operation. That is, the UE does not report CSI on all BWPs of all carriers. |
| 1 | The UE reports CSI on all dormant BWPs of all carriers. Alternatively, the UE reports CSI on all BWPs defining the dormant behavior of all carriers. Alternatively, the UE reports CSI on all dormant BWPs of all activated carriers. Alternatively, the UE reports CSI on all BWPs defining the dormant behavior of all activated carriers. Alternatively, the UE reports CSI on all BWPs of the primary carrier and all BWPs defining the dormant behavior of all activated secondary carriers. Alternatively, the UE reports CSI on all downlink BWPs defining the dormant behavior of all carriers. Alternatively, the UE reports CSI on all downlink BWPs defining the dormant behavior of all activated carriers. Alternatively, the UE reports CSI on all downlink BWPs defining the dormant behavior of the primary carrier and all downlink BWPs defining the dormant behavior of all activated secondary carriers. |

TABLE 39-continued

| 1-bit bit domain | Operation of UE |
|---|---|
| | Alternatively, the UE reports CSI on all target BWPs having the BWP handover and defining the dormant behavior of all carriers.
Alternatively, the UE reports CSI on all target BWPs having the BWP handover and defining the dormant behavior of all activated carriers.
Alternatively, the UE reports CSI on a target BWP having the BWP handover and defining the dormant behavior of the primary carrier and all target BWPs having the BWP handover and defining the dormant behavior of all activated secondary carriers.
Alternatively, the UE reports CSI on all target downlink BWPs having the BWP handover and defining the dormant behavior of all carriers.
Alternatively, the UE reports CSI on all target downlink BWPs having the BWP handover and defining the dormant behavior of all activated carriers.
Alternatively, the UE reports CSI on a target downlink BWP having the BWP handover and defining the dormant behavior of the primary carrier and all target downlink BWPs having the BWP handover and defining the dormant behavior of all activated secondary carriers. |

TABLE 40

| 1-bit bit domain | Operation of UE |
|---|---|
| 0 | No operation. That is, the UE does not transmit an SRS on all BWPs of all carriers. |
| 1 | The UE transmits an SRS on all dormant BWPs of all carriers.
Alternatively, the UE transmits an SRS on all BWPs defining the dormant behavior of all carriers.
Alternatively, the UE transmits an SRS on all dormant BWPs of all activated carriers.
Alternatively, the UE transmits an SRS on all BWPs defining the dormant behavior of all activated carriers.
Alternatively, the UE transmits an SRS on all BWPs defining the dormant behavior of the primary carrier and all BWPs defining the dormant behavior of all activated secondary carriers.
Alternatively, the UE transmits an SRS on all uplink BWPs defining the dormant behavior of all carriers.
Alternatively, the UE transmits an SRS on all uplink BWPs defining the dormant behavior of all activated carriers.
Alternatively, the UE transmits an SRS on all uplink BWPs defining the dormant behavior of the primary carrier and all uplink BWPs defining the dormant behavior of all activated secondary carriers.
Alternatively, the UE transmits an SRS on all target BWPs having the BWP handover and defining the dormant behavior of all carriers.
Alternatively, the UE transmits an SRS on all target BWPs having the BWP handover and defining the dormant behavior of all activated carriers.
Alternatively, the UE transmits an SRS on a target BWP having the BWP handover and defining the dormant behavior of the primary carrier and all target BWPs having the BWP handover and defining the dormant behavior of all activated secondary carriers.
Alternatively, the UE transmits an SRS on all target uplink BWPs having the BWP handover of all carriers.
Alternatively, the UE transmits an SRS on all target uplink BWPs having the BWP handover and defining the dormant behavior of all activated carriers.
Alternatively, the UE transmits an SRS on a target uplink BWP having the BWP handover and defining the dormant behavior of the primary carrier and all target uplink BWPs having the BWP handover and defining the dormant behavior of all activated secondary carriers. |

TABLE 41

| 1-bit bit domain | Operation of UE |
|---|---|
| 0 | No operation. That is, the UE neither reports CSI nor transmits an SRS on all BWPs of all carriers. |
| 1 | The UE reports CSI and also transmits an SRS on all BWPs defining the dormant behavior of all carriers.
Alternatively, the UE reports CSI and also transmits an SRS on all BWPs defining the dormant behavior of all activated carriers.
Alternatively, the UE reports CSI and also transmits an SRS on all BWPs defining the dormant behavior of the primary carrier and all BWPs defining the dormant behavior of all activated secondary carriers.
Alternatively, the UE reports CSI on a target downlink BWP having the BWP handover and defining the dormant behavior of the primary carrier and all target downlink BWPs having the BWP handover and defining the dormant behavior of all activated secondary carriers, and transmits an SRS on a target uplink BWP having the BWP handover and defining the dormant behavior of the primary carrier and all target uplink BWPs having the BWP handover and defining the dormant behavior of all activated secondary carriers. |

TABLE 42

| 2-bit bit domain | Operation of UE |
|---|---|
| 00 | No operation. That is, the UE neither reports CSI nor transmits an SRS on all BWPs of all carriers. |
| 01 | The UE reports CSI and also transmits an SRS on all BWPs defining the dormant behavior of the primary carrier. |
| 10 | The UE reports CSI and also transmits an SRS on all BWPs defining the dormant behavior of all activated secondary carriers. |
| 11 | The UE reports CSI and also transmits an SRS on all BWPs defining the dormant behavior of the primary carrier and all BWPs defining the dormant behavior of all activated secondary carriers. |

In one embodiment, when the UE reports the CSI report triggered by the power saving signal/channel, the maximum code rate indication is 0 (maxCodeRate=0), and the corresponding code rate is 0.08. In one embodiment, a PUCCH resource identity (or a PUCCH channel index, or a resource set) used by the UE in a case of reporting the CSI may be implicitly indicated by the power saving signal/channel. For example, the PUCCH resource identity used by the UE in a case of reporting the CSI report triggered by the power saving signal/channel (or the UE transmits acknowledgement information about successfully decoding the power saving signal/channel for the power saving signal/channel) is $(\lfloor 2 \cdot n_{CCE,0}/N_{CCE} \rfloor + n_{PS-RNTI}) \bmod N^{PUCCH}$.

Here, $\lfloor \cdot \rfloor$ is a round-down operation, $n_{CCE,0}$ is a first CCE identity of the power saving signal/channel, $N_{CCE}$ is the number of CCEs of a CORESET of the power saving signal/channel, $n_{PS-RNTI}$ is a value (which is 0, . . . , 0.65535) of a power saving RNTI, mod( ) is a modulo operation, and $N^{PUCCH}$ is the number of PUCCH resources.

In one embodiment, when the UE reports the CSI report triggered by the power saving signal/channel, the PUCCH resource identity used is $n_{PS-RNTI} \bmod N^{PUCCH}$.

In one embodiment, when the UE reports the CSI report triggered by the power saving signal/channel, a PUSCH resource identity used is $n_{PS-RNTI} \bmod N^{PUSCH}$, where $N^{PUSCH}$ is the number of configured PUSCH resources.

In one embodiment, if a higher layer (referring to RRC) configures a mask of the CSI reported (CSI-Mask), the UE needs to report the CSI report triggered by the power saving signal/channel. In one embodiment, if a higher layer configures the CSI-Mask and a value of the CSI-Mask is True, the UE needs to report the CSI report triggered by the power saving signal/channel. In one embodiment, if a higher layer configures the CSI-Mask and a value of the CSI-Mask is False, the UE needs to report the CSI report triggered by the power saving signal/channel. In one embodiment, if a higher layer configures the CSI-Mask and a value of the CSI-Mask is True, the UE needs to report the CSI report triggered by the power saving signal/channel and carried on the PUCCH. In one embodiment, if a higher layer configures the CSI-Mask and a value of the CSI-Mask is False, the UE needs to report the CSI report triggered by the power saving signal/channel and carried on the PUCCH. In one embodiment, if a higher layer configures the CSI-Mask and a value of the CSI-Mask is True, the UE needs to report the CSI report triggered by the power saving signal/channel and carried on the PUSCH. In one embodiment, if a higher layer configures the CSI-Mask and a value of the CSI-Mask is False, the UE needs to report the CSI report triggered by the power saving signal/channel and carried on the PUSCH.

In one embodiment, if a higher layer configures the CSI-Mask, a value of the CSI-Mask is True, and the UE is at DRX active time, the UE needs to report the CSI report triggered by the power saving signal/channel. In one embodiment, if a higher layer configures the CSI-Mask, a value of the CSI-Mask is True, and the UE is at outside of DRX active time, the UE needs to report the CSI report triggered by the power saving signal/channel. In one embodiment, if a higher layer configures the CSI-Mask, a value of the CSI-Mask is False, and the UE is at DRX active time, the UE needs to report the CSI report triggered by the power saving signal/channel. In one embodiment, if a higher layer configures the CSI-Mask, a value of the CSI-Mask is False, and the UE is at outside of DRX active time, the UE needs to report the CSI report triggered by the power saving signal/channel. In one embodiment, if a higher layer configures the CSI-Mask, a value of the CSI-Mask is False, and the UE is at DRX active time, the UE needs to report the CSI report triggered by the power saving signal/channel and carried on the PUSCH. In one embodiment, if a higher layer configures the CSI-Mask, a value of the CSI-Mask is False, and the UE is at outside of DRX active time, the UE needs to report the CSI report triggered by the power saving signal/channel and carried on the PUSCH. In one embodiment, if a higher layer configures the CSI-Mask, a value of the CSI-Mask is False, and the UE is at DRX active time, the UE needs to report the CSI report triggered by the power saving signal/channel and carried on the PUCCH. In one embodiment, if a higher layer configures the CSI-Mask, a value of the CSI-Mask is False, and the UE is at outside of DRX active time, the UE needs to report the CSI report triggered by the power saving signal/channel and carried on the PUCCH.

In one embodiment, if a higher layer configures the CSI-Mask, a value of the CSI-Mask is False, and the UE is at outside of DRX active time, the UE does not report the CSI report triggered by the power saving signal/channel and carried on the PUCCH. In one embodiment, if a higher layer configures the CSI-Mask, a value of the CSI-Mask is False, and the UE is at outside of DRX active time, the UE does not report the CSI report triggered by the power saving signal/channel and carried on the PUSCH. In one embodiment, if a higher layer does not configure the CSI-Mask, and the UE is at outside of DRX active time, the UE does not report the CSI report triggered by the power saving signal/channel and carried on the PUCCH. In one embodiment, if a higher layer does not configure the CSI-Mask, and the UE is at outside of DRX active time, the UE does not report the CSI report triggered by the power saving signal/channel and carried on the PUSCH.

In one embodiment, if a higher layer configures the CSI-Mask and a value of the CSI-Mask is True, the UE needs to report the CSI report triggered by the power saving signal/channel at DRX-ON. In one embodiment, if a higher layer configures the CSI-Mask and a value of the CSI-Mask is True, the UE needs to report the CSI report triggered by the power saving signal/channel at DRX-OFF. In one embodiment, if a higher layer configures the CSI-Mask and a value of the CSI-Mask is True, the UE needs to report the CSI report triggered by the power saving signal/channel at outside of DRX active time. In one embodiment, if a higher layer configures the CSI-Mask and a value of the CSI-Mask is False, the UE needs to report the CSI report triggered by the power saving signal/channel at DRX-ON. In one embodiment, if a higher layer configures the CSI-Mask and a value of the CSI-Mask is False, the UE needs to report the CSI report triggered by the power saving signal/channel at DRX-OFF. In one embodiment, if a higher layer configures the CSI-Mask and a value of the CSI-Mask is False, the UE needs to report the CSI report triggered by the power saving signal/channel at outside of DRX active time.

In one embodiment, if a higher layer configures the CSI-Mask and a value of the CSI-Mask is False, the UE needs to report the CSI report triggered by the power saving signal/channel and carried on the PUCCH at DRX-OFF. In one embodiment, if a higher layer configures the CSI-Mask and a value of the CSI-Mask is False, the UE needs to report the CSI report triggered by the power saving signal/channel and carried on the PUCCH at outside of DRX active time. In one embodiment, if a higher layer configures the CSI-Mask and a value of the CSI-Mask is False, the UE needs to report the CSI report triggered by the power saving signal/channel and carried on the PUSCH at DRX-OFF. In one embodiment, if a higher layer configures the CSI-Mask and a value of the CSI-Mask is False, the UE needs to report the CSI report triggered by the power saving signal/channel and carried on the PUSCH at outside of DRX active time.

In one embodiment, if a higher layer does not configure the CSI-Mask, the UE needs to report the CSI report triggered by the power saving signal/channel and carried on the PUCCH at DRX-OFF. In one embodiment, if a higher layer does not configure the CSI-Mask, the UE needs to report the CSI report triggered by the power saving signal/channel and carried on the PUCCH at outside of DRX active time. In one embodiment, if a higher layer does not configure the CSI-Mask, the UE needs to report the CSI report triggered by the power saving signal/channel and carried on the PUSCH at DRX-OFF. In one embodiment, if a higher layer does not configure the CSI-Mask, the UE needs to report the CSI report triggered by the power saving signal/channel and carried on the PUSCH at outside of DRX active time.

In one embodiment, if a higher layer does not configure the CSI-Mask, the UE does not report the CSI report triggered by the power saving signal/channel and carried on the PUCCH at DRX-OFF. In one embodiment, if a higher layer does not configure the CSI-Mask, the UE does not report the CSI report triggered by the power saving signal/channel and carried on the PUCCH at outside of DRX active time. In one embodiment, if a higher layer does not configure the CSI-Mask, the UE does not report the CSI report triggered by the power saving signal/channel and carried on the PUSCH at DRX-OFF. In one embodiment, if a higher layer does not configure the CSI-Mask, the UE does not report the CSI report triggered by the power saving signal/channel and carried on the PUSCH at outside of DRX active time.

In addition, the UE may report the maximum number of MIMO layers that the UE expects to configure (maxMIMO-Layers-Expect) and whether the maximum number of MIMO layers is configured for a BWP (ApplyperBWP) to the base station, where maxMIMO-Layers-Expect is a positive integer and has a value range of 1 to 8, and ApplyperBWP is a Boolean (BOOL) parameter and has a value of TRUE (that is, configured for a BWP) or FALSE (that is, configured for a carrier). Report manners may be physical layer signaling, MAC CE or RRC signaling. After receiving the parameter, the base station may configure an appropriate parameter for the UE, thereby saving power. In one embodiment, for a frequency range 1 (FR1, low frequency being less than 6 GHz), maxMIMO-Layers-Expect may be 4. In one embodiment, for a frequency range 2 (FR2, high frequency being greater than 6 GHz), maxMIMO-Layers-Expect may be 2. In one embodiment, for FR1, ApplyperBWP may be FALSE (i.e. configured for a carrier; the maximum number of MIMO layers for each BWP is configured according to a carrier). In one embodiment, for FR2, ApplyperBWP may be TRUE.

After the above operations are performed, the base station knows the downlink channel condition and the uplink channel condition (and the condition of the beam), thereby improving the transmission efficiency and saving power.

In a twelfth exemplary implementation, first, a base station configures some configuration parameters for the UE. These configuration parameters include: a resource of the base station transmitting a reference signal (e.g. a CSI-RS), a resource of the base station transmitting a temporary reference signal (e.g. an SSB, a CSI-RS, a TRS), time (B) of the reference signal (e.g. a CSI-RS) transmitted earlier than the power saving signal/channel, time (A) of the reference signal (e.g. a CSI-RS) transmitted later than the power saving signal/channel, a resource of the UE transmitting a reference signal (e.g. an SRS), a time difference (S) of the SRS relative to the power saving signal/channel, a PUCCH resource on which the UE reports CSI, and a PUSCH resource on which the UE reports CSI.

For example, the time (B) of the reference signal transmitted earlier than the power saving signal/channel may be B=2 slots.

For example, the time (A) of the reference signal transmitted later than the power saving signal/channel may be A=1 slot.

For example, the time difference (S) of the SRS relative to the power saving signal/channel may be S=3 slots.

Secondly, the base station transmits the CSI-RS. For example, the base station transmits the CSI-RS slots (B=2 slots) earlier than the power saving signal/channel.

Thirdly, the base station transmits the power saving signal/channel.

Then, the UE receives the power saving signal/channel. In one embodiment, the power saving signal/channel has a wake-up function (WUS) (which informs the UE that it needs to receive the PDCCH) and a go-to-sleep function (GTS) (which informs the UE that it does not need to receive the PDCCH).

Then, the base station transmits the CSI-RS for a second time. For example, the base station transmits the CSI-RS 1 slot (A=1 slot) later than the power saving signal/channel.

Finally, the UE transmits an SRS corresponding to the CSI-RS transmitted by the base station for the second time, and reports the CSI.

In one embodiment, if the base station configures a plurality of carriers (i.e., a plurality of serving cells) to the UE, the base station may perform the same operation on each carrier, and the UE may also perform the same operation on each carrier. These operations may be performed simultaneously or independently on the carriers. In one embodiment, other operations (e.g. transmission/reception of the CSI-RS, transmission of the SRS) may be performed synchronously on the carriers except that there is the power saving signal/channel (while there is no power saving signal/channel on a secondary carrier) on a primary carrier (primary cell (PCell)). That is, the power saving signal/channel on the primary carrier (PCell) may trigger the UE to report the CSI of each carrier (or serving cell). In one embodiment, specific DCI or PDCCH or MAC CE on the primary carrier may trigger the UE to report the CSI of each carrier. In one embodiment, other operations (e.g. transmission/reception of the CSI-RS, transmission of the SRS) may be performed synchronously on the carriers except that there is the power saving signal/channel (while there is no power saving signal/channel on an SCG) on an MCG. In one embodiment, other operations (e.g. transmission/reception of the CSI-RS, transmission of the SRS) may be performed synchronously on the cells except that there is the power saving signal/channel (while there is no power saving signal/channel on other cells) on a special cell (SpCell)). In one embodiment, other operations (e.g. transmission/reception of the CSI-RS, transmission of the SRS) may be performed synchronously on the cells except that there is the power saving signal/channel (while there is no power saving signal/channel on other cells) on a PUCCH secondary cell group (PUCCH-SCell)). In one embodiment, a respective power saving signal/channel on each carrier (serving cell) may trigger the UE to report CSI of a respective carrier (or serving cell). In one embodiment, the power saving signal/channel on the primary carrier (PCell) may trigger the UE to receive a CSI-RS of each carrier (or serving cell). In one embodiment, a respective power saving signal/channel on each carrier (serving cell) may trigger the UE to receive a CSI-RS of a respective carrier (or serving cell). In one embodiment, the power saving signal/channel on the primary carrier (PCell) may trigger the UE to transmit an SRS on each carrier (or serving cell). In one embodiment, a respective power saving signal/channel on each carrier (serving cell) may trigger the UE to transmit an SRS of a respective carrier (or serving cell). In one embodiment, the power saving signal/channel on the primary carrier (PCell) may trigger the base station to transmit a CSI-RS on each carrier (or serving cell). In one embodiment, a respective power saving signal/channel on each carrier (serving cell) may trigger the base station to transmit a CSI-SRS on a respective carrier (or serving cell). In one embodiment, a carrier indication in the power saving signal/channel may indicate which carrier or carriers require the UE to report the CSI. In one embodiment, a carrier indication in the power saving signal/channel may indicate which carrier or carriers require the UE to receive a CSI-RS. In one embodiment, a carrier indication in the power saving signal/channel may indicate which carrier or carriers require the UE to transmit an SRS. In one embodiment, the power saving signal/channel may indicate that the primary carrier and the activated secondary carrier require the UE to report the CSI. In one embodiment, the power saving signal/channel may trigger the primary carrier and the activated secondary carrier to require the UE to transmit an SRS. In one embodiment, the power saving signal/channel may indicate that the primary carrier and the activated secondary carrier require the UE to report the CSI. In one embodiment, the power saving signal/channel may trigger the primary carrier and the activated secondary carrier to require the UE to transmit an SRS. In one embodiment, under a dual connection (DC) configuration, the above operations may be independently performed on MCG and the SCG.

In one embodiment, if the base station configures a plurality of carriers to the UE, the base station may perform the same operation on each deactivated carrier (a deactivated SCell or a released SCell) of the UE, and the UE may also perform the same operation on each deactivated carrier. In one embodiment, if the base station configures a plurality of carriers to the UE, the base station may perform the same operation on each activating carrier of the UE, and the UE may also perform the same operation on each activating carrier. In one embodiment, if the base station configures a plurality of carriers to the UE, the base station may perform the same operation on each carrier of the UE in an activation process, and the UE may also perform the same operation on each carrier in the activation process. In one embodiment, the base station may trigger the base station on a primary carrier to transmit a temporary reference signal (e.g. an SSB, a CSI-RS, a TRS) on the deactivated carrier of the UE. For example, triggering is performed using a PDCCH or DCI or the power saving signal/channel. In one embodiment, the base station may transmit a temporary reference signal on the deactivated carrier of the UE, and the UE may receive the temporary reference signal on the deactivated carrier. In one embodiment, the base station may trigger the UE to receive the temporary reference signal. In one embodiment, the base station may trigger the UE to report the CSI according to the temporary reference signal. In one embodiment, the UE may report the CSI according to a temporary reference signal on the deactivated carrier. In one embodiment, the base station may trigger the UE on the primary carrier to transmit an SRS on the deactivated carrier.

In one embodiment, the base station may trigger the UE to report the CSI according to the temporary reference signal by using specific signaling (e.g. specific DCI or a specific PDCCH or MAC CE or a specific signal). In one embodiment, the specific DCI or the specific PDCCH or MAC CE or the specific signal may be cross-carrier scheduled. In one embodiment, the specific DCI or the specific PDCCH or MAC CE or the specific signal may cross-carrier activate a secondary cell. In one embodiment, the specific DCI or the specific PDCCH or MAC CE or the specific signal may be used by the primary carrier to cross-carrier activate the secondary cell.

A bit domain in the power saving signal/channel indicates that the UE needs to report a carrier (or serving cell; including a deactivated carrier) of the CSI. In one embodiment, a bit domain in the power saving signal/channel indicates that the UE needs to transmit a carrier (or serving cell; including a deactivated carrier) of the SRS. In one embodiment, the specific DCI or the specific PDCCH or MAC CE or the specific signal on the primary carrier indicates that the UE needs to report a carrier (or serving cell; including the deactivated carrier) of the CSI. In one embodiment, the specific DCI or the specific PDCCH or MAC CE or the specific signal on the secondary carrier indicates that the UE needs to report a carrier (or serving cell; including the deactivated carrier) of the CSI. In one embodiment, the specific DCI or the specific PDCCH or MAC CE or the specific signal on the primary carrier indicates that the UE needs to transmit a carrier (or serving cell; including the deactivated carrier) of the SRS. In one embodiment, the specific DCI or the specific PDCCH or MAC CE or the specific signal on the secondary carrier indicates that the UE needs to transmit a carrier (or serving cell; including the deactivated carrier) of the SRS. See Tables 43 to 46 below.

TABLE 43

| 1-bit bit domain | Operation of UE |
| --- | --- |
| 0 | No operation. That is, the UE does not report CSI on all carriers. |
| 1 | The UE reports CSI on all carriers. Alternatively, the UE reports CSI on all activated carriers. Alternatively, the UE reports CSI on the primary carrier and all activated secondary carriers. Alternatively, the UE reports CSI on all deactivated carriers. |

TABLE 44

| 1-bit bit domain (another one independent domain; different from the above table) | Operation of UE |
| --- | --- |
| 0 | No operation. That is, the UE does not transmit an SRS on all carriers. |
| 1 | The UE transmits an SRS on all carriers. Alternatively, the UE transmits an SRS on all activated carriers. Alternatively, the UE transmits an SRS on the primary carrier and all activated secondary carriers. Alternatively, the UE transmits an SRS on all deactivated carriers. |

TABLE 45

| 1-bit bit domain | Operation of UE |
| --- | --- |
| 0 | No operation. That is, the UE does not report CSI and transmit an SRS on all carriers. |
| 1 | The UE reports CSI and also transmits an SRS on all carriers. Alternatively, the UE reports CSI and also transmits an SRS on all activated carriers. Alternatively, the UE reports CSI and also transmits an SRS on the primary carrier and all activated secondary carriers. Alternatively, the UE reports CSI and also transmits an SRS on all deactivated carriers. |

TABLE 46

| 2-bit bit domain | Operation of UE |
| --- | --- |
| 00 | No operation. That is, the UE neither reports CSI nor transmits an SRS on all carriers. |
| 01 | The UE reports CSI and also transmits an SRS on the primary carrier and all activated secondary carriers. |
| 10 | The UE reports CSI and also transmits an SRS on all deactivated secondary carriers. |
| 11 | The UE reports CSI and also transmits an SRS on the primary carrier, all activated secondary carriers and all deactivated secondary carriers. |

In one embodiment, the power saving signal/channel has an RS indication bit with 0 to 10 bits for indicating a combination of the UE reporting the CSI or/and transmitting the SRS. These combinations are indicated by a media access control (MAC) control element (MAC CE). Assuming that the power saving signal/channel has 3-bit RS indication bit, and assuming that there are currently 10 activated carriers (serving cells), operations of these carriers may be indicated by the MAC CE. See Table 47 below.

TABLE 47

| 3-bit bit domain | Operation of UE |
| --- | --- |
| 000 | No operation. That is, the UE neither reports CSI nor transmits an SRS on all carriers. |
| 001 | The UE reports CSI and also transmits an SRS on all deactivated secondary carriers. |
| 010-111 | The UE performs a corresponding operation according to a configuration table of the MAC CE. |

In one embodiment, after receiving the power saving signal/channel, the UE needs to report the CSI on each BWP of each deactivated carrier. In one embodiment, after receiving the power saving signal/channel, the UE needs to report the CSI on each BWP of each deactivated carrier. In one embodiment, after receiving the power saving signal/channel, the UE needs to report the CSI on a default BWP or an initial BWP of each deactivated carrier. In one embodiment, after receiving the power saving signal/channel, the UE needs to transmit the SRS on each BWP of each deactivated carrier. In one embodiment, after receiving the power saving signal/channel, the UE needs to transmit the SRS on a default BWP or an initial BWP of each deactivated carrier. In one embodiment, after receiving the power saving signal/channel, the UE needs to report the CSI and transmit the SRS on each BWP of each deactivated carrier. In one embodiment, after receiving the power saving signal/channel, the UE needs to report the CSI and transmit the SRS on a default BWP or an initial BWP of each deactivated carrier.

In one embodiment, after receiving the power saving signal/channel, the UE needs to report the CSI on each BWP, configured with a temporary reference signal, of each deactivated carrier. In one embodiment, after receiving the specific DCI or the specific PDCCH or MAC CE or the specific signal, the UE needs to report the CSI on each BWP, configured with a temporary reference signal, of each deactivated carrier. In one embodiment, after receiving the power saving signal/channel, the UE needs to report the CSI on each downlink BWP, configured with a temporary reference signal, of each deactivated carrier. In one embodiment, after receiving the specific DCI or the specific PDCCH or MAC CE or the specific signal, the UE needs to report the CSI on each downlink BWP, configured with a temporary reference signal, of each deactivated carrier. In one embodiment, after receiving the power saving signal/channel, the UE needs to transmit the SRS on each uplink BWP corresponding to a respective one downlink BWP, configured with a temporary reference signal, of each deactivated carrier. In one embodiment, after receiving the specific DCI or the specific PDCCH or MAC CE or the specific signal, the UE needs to transmit the SRS on each uplink BWP corresponding to a respective one downlink BWP, configured with a temporary reference signal, of each deactivated carrier.

In one embodiment, a bit domain in the power saving signal/channel indicates that the UE needs to report a BWP of the CSI. In one embodiment, a bit domain in the power saving signal/channel indicates that the UE needs to transmit a BWP of the SRS. In one embodiment, the specific DCI or the specific PDCCH or MAC CE or the specific signal indicates that the UE needs to report a BWP of the CSI. In one embodiment, the specific DCI or the specific PDCCH or MAC CE or the specific signal indicates that the UE needs to transmit a BWP of the SRS. See Tables 48 to 51 below.

TABLE 48

| 1-bit bit domain | Operation of UE |
| --- | --- |
| 0 | No operation. That is, the UE does not report CSI on all BWPs of all carriers. |
| 1 | The UE reports CSI on all BWPs of all carriers. Alternatively, the UE reports CSI on all BWPs of all deactivated carriers. Alternatively, the UE reports CSI on default BWPs or initial BWPs of all deactivated carriers. Alternatively, the UE reports CSI on all downlink BWPs of all deactivated carriers. Alternatively, the UE reports CSI on all downlink default BWPs or all downlink initial BWPs of all deactivated carriers. Alternatively, the UE reports CSI on all downlink BWPs configured with the temporary reference signals of all deactivated carriers. Alternatively, the UE reports CSI on all downlink default BWPs configured with the temporary reference signals or all downlink initial BWPs configured with the temporary reference signals of all deactivated carriers. |

TABLE 49

| 1-bit bit domain | Operation of UE |
| --- | --- |
| 0 | No operation. That is, the UE does not transmit an SRS on all BWPs of all carriers. |
| 1 | The UE transmits an SRS on all BWPs of all carriers. Alternatively, the UE transmits an SRS on all BWPs of all deactivated carriers. Alternatively, the UE transmits an SRS on all BWPs of all deactivated carriers. Alternatively, the UE transmits an SRS on all uplink BWPs of all deactivated carriers. Alternatively, the UE transmits an SRS on all uplink BWPs corresponding to downlink BWPs configured with the temporary reference signals of all deactivated carriers. Alternatively, the UE transmits an SRS on all uplink default BWPs or all uplink initial BWPs of all deactivated carriers. |

TABLE 50

| 1-bit bit domain | Operation of UE |
| --- | --- |
| 0 | No operation. That is, the UE neither report CSI nor transmit an SRS on all BWPs of all carriers. |
| 1 | The UE reports CSI and also transmits an SRS on all BWPs of all carriers. Alternatively, the UE reports CSI and also transmits an SRS on all BWPs of all deactivated carriers. Alternatively, the UE reports CSI and also transmits an SRS on all BWPs configured with the temporary reference signals of all deactivated carriers. |

TABLE 51

| 2-bit bit domain | Operation of UE |
|---|---|
| 00 | No operation. That is, the UE neither reports CSI nor transmits an SRS on all BWPs of all carriers. |
| 01 | The UE should report CSI and transmit an SRS on all BWPs of the primary carrier. |
| 10 | The UE reports CSI and also transmits an SRS on all BWPs of all deactivated secondary carriers. |
| 11 | The UE reports CSI and transmits an SRS on all BWPs of the primary carrier and all BWPs of all deactivated secondary carriers. Alternatively, the UE reports CSI and also transmits an SRS on all BWPs of the primary carrier and all BWPs configured with the temporary reference signals of all deactivated secondary carriers. |

In one embodiment, if a certain carrier (or BWP) is configured with a temporary reference signal, the base station and the UE need to perform the above operations (e.g. transmission/reception of the CSI-RS, transmission of the SRS) on the certain carrier (or BWP).

In one embodiment, if a certain secondary carrier (or BWP) is configured with a temporary reference signal, the base station needs to perform the above transmission operation of the CSI-RS on the carrier (or BWP) configured with the temporary reference signal before and after transmitting the power saving signal/channel on the primary carrier (or special carrier, or special carrier). In one embodiment, if a certain secondary carrier (or BWP) is configured with a temporary reference signal, the UE needs to perform the above reception operation of the CSI-RS, the above transmission operation of the SRS and the above report operation of the CSI on the carrier (or BWP) configured with the temporary reference signal before and after transmitting the power saving signal/channel on the primary carrier (or special carrier).

In one embodiment, if a certain secondary carrier is configured with a temporary reference signal, a bit domain in the power saving signal/channel indicates that the UE needs to report a carrier (or serving cell) of the CSI. In one embodiment, a bit domain in the power saving signal/channel indicates that the UE needs to transmit a carrier (or serving cell) of the SRS. See Tables 52 to 55 below.

TABLE 52

| 1-bit bit domain | Operation of UE |
|---|---|
| 0 | No operation. That is, the UE does not reports CSI on all carriers. |
| 1 | The UE reports CSI on all carriers. Alternatively, the UE reports CSI on all deactivated carriers. Alternatively, the UE reports CSI on all deactivated carriers configured with the temporary reference signals. Alternatively, the UE reports CSI on all deactivated carriers configured with the temporary reference signals. Alternatively, the UE reports CSI on the primary carrier and all deactivated secondary carriers. Alternatively, the UE reports CSI on the primary carrier and all deactivated secondary carriers configured with the temporary reference signals. Alternatively, the UE reports CSI on the primary carrier and all deactivated secondary carriers configured with the temporary reference signals. |

TABLE 53

| 1-bit bit domain | Operation of UE |
|---|---|
| 0 | No operation. That is, the UE does not transmit an SRS on all carriers. |
| 1 | The UE transmits an SRS on all carriers. Alternatively, the UE transmits an SRS on all deactivated carriers. Alternatively, the UE transmits an SRS on all deactivated carriers configured with the temporary reference signals. |

TABLE 54

| 1-bit bit domain | Operation of UE |
|---|---|
| 0 | No operation. That is, the UE does not report CSI and transmit an SRS on all carriers. |
| 1 | The UE reports CSI and also transmits an SRS on all carriers. Alternatively, the UE reports CSI and also transmits an SRS on all deactivated carriers. Alternatively, the UE reports CSI and also transmits an SRS on all deactivated carriers configured with the temporary reference signals. |

TABLE 55

| 2-bit bit domain | Operation of UE |
|---|---|
| 00 | No operation. That is, the UE neither reports CSI nor transmits an SRS on all carriers. |
| 01 | The UE reports CSI and also transmits an SRS on the primary carrier. |
| 10 | The UE reports CSI and also transmits an SRS on all activated secondary carriers. Alternatively, the UE reports CSI and also transmits an SRS on all deactivated dormant secondary carriers. Alternatively, the UE reports CSI and also transmits an SRS on all deactivated secondary carriers configured with the temporary reference signals. |
| 11 | The UE reports CSI and also transmits the SRS on the primary carrier and all deactivated secondary carriers configured with the temporary reference signals. |

In one embodiment, a bit domain in the power saving signal/channel indicates that the UE needs to report a BWP (including the BWP configured with the temporary reference signal) of the CSI. In one embodiment, a bit domain in the power saving signal/channel indicates that the UE needs to transmit a BWP (including an uplink BWP corresponding to a downlink BWP configured with the temporary reference signal) of the SRS. See Tables 56 to 59 below.

TABLE 56

| 1-bit bit domain | Operation of UE |
|---|---|
| 0 | No operation. That is, the UE does not report CSI on all BWPs of all carriers. |
| 1 | The UE reports CSI on all BWPs configured with the temporary reference signals of all carriers. Alternatively, the UE reports CSI on all BWPs configured with the temporary reference signals of all deactivated carriers. |

TABLE 57

| 1-bit bit domain | Operation of UE |
| --- | --- |
| 0 | No operation. That is, the UE does not transmit an SRS on all BWPs of all carriers. |
| 1 | The UE transmits an SRS on all BWPs configured with the temporary reference signals of all carriers. Alternatively, the UE transmits an SRS on all BWPs configured with the temporary reference signals of all deactivated carriers. |

TABLE 58

| 1-bit bit domain | Operation of UE |
| --- | --- |
| 0 | No operation. That is, the UE neither report CSI nor transmit an SRS on all BWPs of all carriers. |
| 1 | The UE reports CSI and also transmits an SRS on all BWPs configured with the temporary reference signals of all carriers. Alternatively, the UE reports CSI and also transmits an SRS on all BWPs configured with the temporary reference signals of all deactivated carriers. |

TABLE 59

| 2-bit bit domain | Operation of UE |
| --- | --- |
| 00 | No operation. That is, the UE neither reports CSI nor transmits an SRS on all BWPs of all carriers. |
| 01 | The UE reports CSI and also transmits an SRS on all BWPs configured with the temporary reference signals of the primary carrier. |
| 10 | The UE reports CSI and also transmits an SRS on all BWPs configured with the temporary reference signals of all deactivated secondary carriers. |
| 11 | The UE reports CSI and also transmits an SRS on all BWPs of the primary carrier and all BWPs configured with the temporary reference signals of all deactivated secondary carriers. |

In one embodiment, when the UE reports the CSI report triggered by the specific DCI or the specific PDCCH or MAC CE or the specific signal, the maximum code rate indication is 0 (maxCodeRate=0), and the corresponding code rate is 0.08. In one embodiment, a PUCCH resource identity (or a PUCCH channel index, or a resource set) used by the UE in a case of reporting the CSI may be implicitly indicated by the specific DCI or the specific PDCCH or MAC CE or the specific signal. For example, the PUCCH resource identity used by the UE in a case of reporting the CSI report triggered by the power saving signal/channel (or the UE transmits acknowledgement information about successfully decoding the power saving signal/channel for the specific DCI or the specific PDCCH or MAC CE or the specific signal) is $(\lfloor 2 \cdot n_{CCE,0}/N_{CCE} \rfloor + n_{PS\text{-}RNTI})$ mod $N^{PUCCH}$.

Here, $\lfloor \cdot \rfloor$ is a round-down operation, $n_{CCE,0}$ is a first CCE identity of the specific DCI or the specific PDCCH or MAC CE or the specific signal, $N_{CCE}$ is the number of CCEs of a CORESET of the specific DCI or the specific PDCCH or MAC CE or the specific signal, $n_{PS\text{-}RNTI}$ is a value (which is 0, 65535) of a power saving RNTI, mod( ) is a modulo operation, and $N^{PUCCH}$ is the number of PUCCH resources.

In one embodiment, when the UE reports the CSI report triggered by the specific DCI or the specific PDCCH or MAC CE or the specific signal, the PUCCH resource identity used by the UE is $n_{C\text{-}RNTI}$ mod $N^{PUCCH}$ or $n_{CA\text{-}RNTI}$ mod $N^{PUCCH}$, where $n_{C\text{-}RNTI}$ is a C-RNTI of the UE, and $n_{CA\text{-}RNTI}$ is a carrier activation-RNTI of the UE.

In one embodiment, when the UE reports the CSI report triggered by the specific DCI or the specific PDCCH or MAC CE or the specific signal, a PUSCH resource identity used is $n_{C\text{-}RNTI}$ mod $N^{PUSCH}$ or $n_{CA\text{-}RNTI}$ mod $N^{PUCCH}$, where $N^{PUSCH}$ is the number of configured PUSCH resources.

In one embodiment, the CSI-RS triggered by the specific DCI or the specific PDCCH or MAC CE or the specific signal uses the C-RNTI or the carrier activation-radio network temporary identifier (CA-RNTI) as part of an initialization seed. In one embodiment, when the temporary reference signal is triggered by the specific DCI or the specific PDCCH or MAC CE or the specific signal, the temporary reference signal uses the C-RNTI or the CA-RNTI as part of the initialization seed. In one embodiment, when the temporary reference signal is triggered by the specific DCI or the specific PDCCH or MAC CE or the specific signal, the specific DCI or the specific PDCCH or MAC CE or the specific signal is scrambled using the C-RNTI or the CA-RNTI. In one embodiment, when the temporary reference signal is triggered by the specific DCI or the specific PDCCH or MAC CE or the specific signal, bits before encoding the specific DCI or the specific PDCCH or MAC CE or the specific signal are scrambled using the C-RNTI or the CA-RNTI. In one embodiment, when the temporary reference signal is triggered by the specific DCI or the specific PDCCH or MAC CE or the specific signal, bits after encoding the specific DCI or the specific PDCCH or MAC CE or the specific signal are scrambled using the C-RNTI or the CA-RNTI. In one embodiment, when the temporary reference signal is triggered by the specific DCI or the specific PDCCH or MAC CE or the specific signal, a CRC bit of the specific DCI or the specific PDCCH or MAC CE or the specific signal is scrambled using the C-RNTI or the CA-RNTI. In one embodiment, when the SRS triggered by the specific DCI or the specific PDCCH or MAC CE or the specific signal uses the C-RNTI or the CA-RNTI as part of the initialization seed.

In one embodiment, if a higher layer (referring to RRC) configures a mask of the CSI report (CSI-Mask), the UE needs to report the CSI report triggered by the specific DCI or the specific PDCCH or MAC CE or the specific signal. In one embodiment, if a higher layer configures the CSI-Mask and a value of the CSI-Mask is True, the UE needs to report the CSI report triggered by the specific DCI or the specific PDCCH or MAC CE or the specific signal. In one embodiment, if a higher layer configures the CSI-Mask and a value of the CSI-Mask is False, the UE needs to report the CSI report triggered by the specific DCI or the specific PDCCH or MAC CE or the specific signal. In one embodiment, if a higher layer configures the CSI-Mask and a value of the CSI-Mask is True, the UE needs to report the CSI report carried on the PUCCH and triggered by the specific DCI or the specific PDCCH or MAC CE or the specific signal. In one embodiment, if a higher layer configures the CSI-Mask and a value of the CSI-Mask is False, the UE needs to report the CSI report carried on the PUCCH and triggered by the specific DCI or the specific PDCCH or MAC CE or the specific signal. In one embodiment, if a higher layer configures the CSI-Mask and a value of the CSI-Mask is True, the UE needs to report the CSI report carried on the PUSCH and triggered by the specific DCI or the specific PDCCH or MAC CE or the specific signal. In one embodiment, if a higher layer configures the CSI-Mask and a value of the CSI-Mask is False, the UE needs to report the CSI report carried on the PUSCH and triggered by the specific DCI or the specific PDCCH or MAC CE or the specific signal.

After the above operations are performed, the base station knows the downlink channel condition and the uplink channel condition (and the condition of the beam), thereby improving the transmission efficiency and saving power.

In a thirteenth exemplary implementation, first, a base station configures some configuration parameters for the UE. These configuration parameters include: a CORESET used by a power saving signal/channel, a CSI-RS resource, a PUCCH resource and an SRS resource.

The base station may configure a plurality of CORESETs (e.g. 3 CORESETs) for the power saving signal/channel, and a beam direction of each CORESET may be different. In one embodiment, each BWP may configure CORESETs for the power saving signal/channel. In one embodiment, the minimum RB identity of a CORESET is the minimum RB identity of a BWP where the CORESET is located. In one embodiment, the CORESET has the same starting RB identity as the BWP where the CORESET is located. In one embodiment, the maximum RB identity of a CORESET is the maximum RB identity of a BWP where the CORESET is located. In one embodiment, the CORESET has the same ending RB identity as the BWP where the CORESET is located. In one embodiment, the CORESET has the same CORESET size as CORESET 0 (that is, both the CORESET and the CORESET 0 includes the same number of RBs).

The base station may configure one or more CSI-RS resources (or CSI-RS resource sets) for each beam direction. In one embodiment, the base station may configure one or more CSI-RS resources (or CSI-RS resource sets) in the same beam direction as a CORESET used for the power saving signal/channel (that is, the CORESET and the CSI-RS have the same beam direction). In one embodiment, the base station may configure one or more CSI-RS resources (or CSI-RS resource sets) on the CORESET used for the power saving signal/channel. In one embodiment, These CSI-RS resources may be periodic resources, semi-persistent periodic resources, or aperiodic resources.

The base station may configure one or more PUCCH resources (or PUCCH resource sets; or PUCCH channel indexes) for reporting the CSI to the UE. In one embodiment, the base station may configure one or more PUCCH resources for feeding back a correctly received power saving signal/channel to the UE. In one embodiment, the base station may configure one or more PUCCH resources (or PUCCH resource sets; or PUCCH channel indexes) associated with the power saving signal/channel to the UE.

The base station may configure one or more SRS resources associated with a CSI-RS resource identity (NZP-CSI-RS-ResourceId) to the UE. In one embodiment, the base station may configure one or more SRS resources associated with the power saving signal/channel to the UE. In one embodiment, the base station may configure one or more SRS resources associated with a CORESET of the power saving signal/channel to the UE. In one embodiment, the base station may configure one or more SRS resources associated with a beam direction of the power saving signal/channel to the UE. In one embodiment, These SRS resources may be periodic resources, semi-persistent periodic resources, or aperiodic resources.

Secondly, the base station transmits the CSI-RS before transmitting the power saving signal/channel. Since the UE is moving, the base station may not know exactly which direction the UE is in, when the base station transmits the CSI-RS, the base station may transmit the CSI-RS in the beam direction of the power saving signal/channel to be transmitted by the base station next. For example, if the base station is to transmit the power saving signal/channel in three beam directions in the future, the base station may transmit the CSI-RS in these three beam directions respectively. For example, the base station may perform a beam scanning and transmit only one CSI-RS at one moment.

Thirdly, the base station transmits the power saving signal/channel. The base station may use a beam scanning manner to transmit one power saving signal/channel in one beam direction at one moment. For example, in a first slot, the base station transmits the power saving signal/channel by using the CORESET corresponding to the first beam direction; in a second slot, the base station transmits the power saving signal/channel by using the CORESET corresponding to the second beam direction; and in a third slot, the base station transmits the power saving signal/channel by using the CORESET corresponding to the third beam direction. As another example, the base station sequentially transmits one power saving signal/channel on a CORESET for different beam directions. In one embodiment, the base station simultaneously transmits power saving signals/channels in multiple beam directions on multiple CORESETs (e.g. each CORESET corresponds to one beam direction; in one embodiment, one CORESET may have multiple beam directions). In one embodiment, the base station transmits the power saving signal/channel in the beam direction corresponding to the CSI-RS.

Then, the base station transmits the CSI-RS again. In one embodiment, the CSI-RS transmitted in this time is triggered by the power saving signal/channel. In one embodiment, a CSI-RS transmitted in this time is triggered by a respective power saving signal/channel corresponding to a respective CSI-RS. In one embodiment, a CSI-RS transmitted in this time is triggered by a respective power saving signal/channel of a respective beam direction corresponding to a respective CSI-RS. In one embodiment, each CSI-RS transmitted in this time corresponds to a respective one power saving signal/channel. In one embodiment, each beam direction of a CSI-RS transmitted in this time corresponds to a respective one beam direction of a power saving signal/channel. In one embodiment, the CSI-RS transmitted in this time is transmitted by using the beam scanning manner. In one embodiment, the transmitted CSI-RS uses the same beam scanning manner as the power saving signal/channel. In one embodiment, the CSI-RS transmitted in this time uses the same beam scanning manner as a CORESET where the power saving signal/channel is located.

Then, the UE receives the CSI-RS and reports the CSI. In one embodiment, the UE reports the CSI of beam directions corresponding to all power saving signals/channels. In one embodiment, the UE reports only the CSI (including the beam identity in one embodiment) of the beam direction corresponding to the power saving signal/channel having the best channel quality. In one embodiment, the UE reports the beam identities of the power saving signals/channels in the order of channel qualities from good to poor. In one embodiment, the UE reports the beam identity of the power saving signal/channel having the best channel quality. In one embodiment, the CSI report may be a periodic CSI report, a semi-persistent periodic CSI report, or an aperiodic CSI report.

Then, the base station receives a report of the UE.

Then, the UE transmits the SRS. In one embodiment, the UE transmits the SRS in the beam scanning manner. For example, the UE transmits the SRS on a first beam and in a first slot; the UE transmits the SRS on a second beam and in a second slot; and the UE transmits the SRS on a third beam and in a third slot. In one embodiment, the UE transmits the SRS in multiple beam directions at one time. In one embodiment, the SRS is associated with the above CSI-RS. In one embodiment, the UE only transmits the SRS in the beam direction corresponding to the power saving signal/channel having the best channel quality. In one embodiment, the UE only transmits the SRS associated with the CSI-RS in the beam direction corresponding to the CSI-RS having the best channel quality. In one embodiment, the UE only transmits the SRS associated with the CSI-RS in the beam direction corresponding to the CSI-RS having the best channel quality according to the beam scanning manner.

Finally, the base station receives the above SRS. Through receiving the CSI report and measuring the SRS, the base station knows the downlink channel condition and the beam condition, and also knows the uplink channel condition and the beam condition, thereby improving the transmission efficiency and saving power of the UE.

Figure 14:
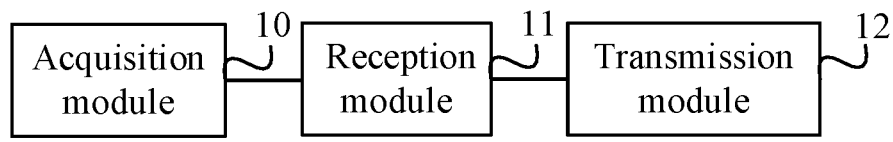
FIG. 14 is a structural diagram of a data transmission device according to an embodiment.

FIG. 14 is a structural diagram of a data transmission device according to an embodiment. The data transmission device may be configured in a first communication node. As shown in FIG. 14, the data transmission device includes: an acquisition module 10, a reception module 11 and a transmission module 12.

The acquisition module 10 is configured to acquire a configuration parameter configured by a second communication node for the first communication node.

The reception module 11 is configured to receive a first message transmitted by the second communication node, where the first message includes a power saving signal or a power saving channel.

The transmission module 12 is configured to transmit a second message to the second communication node.

The data transmission device provided by the embodiment is configured to implement the data transmission method of the above embodiments. The implementation principle and effects of the data transmission device provided by the embodiment are similar and are not repeated here.

In one embodiment, the second message is triggered by the first message.

In one embodiment, the configuration parameter includes a resource of a DM-RS used for decoding the first message, and a scrambling code identity of the DM-RS.

In one embodiment, the transmission module 12 is configured to transmit, according to the first message, an SRS to the second communication node.

In one embodiment, the transmission module 12 is configured to transmit, after the first message is decoded, aperiodic CSI to the second communication node by using a PUSCH.

In one embodiment, a resource indication value (RIV) is used for representing a resource used in a case of transmitting the aperiodic CSI to the second communication node by using the PUSCH.

In one embodiment, a resource used in a case of transmitting the aperiodic CSI to the second communication node by using the PUSCH is configured by a higher layer.

In one embodiment, a to-be-transmitted bit in the PUSCH is scrambled according to a PS-RNTI.

In one embodiment, an initialization seed of a DM-RS sequence in the PUSCH includes a PS-RNTI.

In one embodiment, a cyclic redundancy check (CRC) bit of the PUSCH is scrambled according to a PS-RNTI.

In one embodiment, the transmission module 12 is configured to transmit, after the first message is decoded, aperiodic CSI to the second communication node by using a PUCCH.

In one embodiment, a to-be-transmitted bit in the PUCCH is scrambled according to a PS-RNTI.

In one embodiment, an initialization seed of a DM-RS sequence in the PUCCH includes a PS-RNTI.

In one embodiment, a CRC bit of the PUCCH is scrambled with a PS-RNTI.

In one embodiment, a PUCCH resource used when the first communication node transmits the aperiodic CSI is indicated by the first message.

In one embodiment, a PUCCH resource identity used when the first communication node transmits the aperiodic CSI is implicitly indicated by the first message.

Figure 15:
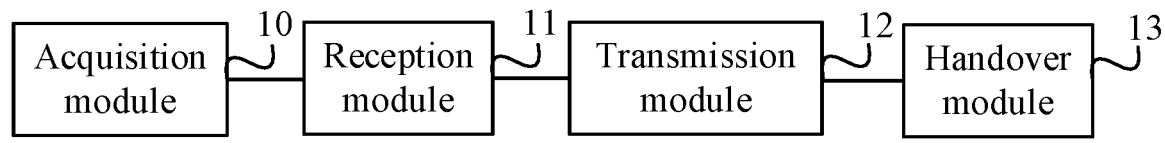
FIG. 15 is a structural diagram of another data transmission device according to an embodiment.

In one embodiment, referring to FIG. 14, FIG. 15 is a structural diagram of another data transmission device according to an embodiment. The data transmission device further includes:
a handover module 13.

The handover module 13 is configured to perform a bandwidth part (BWP) handover, where the BWP handover is triggered by the first message.

In one embodiment, the transmission module 12 is configured to transmit, when the BWP handover exists, CSI to the second communication node.

In one embodiment, the transmission module 12 is configured to transmit the CSI to the second communication node on an $X^{th}$ slot after the BWP handover is completed, where X is a positive integer.

In one embodiment, the first message belonging to a primary cell is used for triggering the first communication node to transmit CSI of a plurality of serving cells to the second communication node.

In one embodiment, the first message includes a CSI-RS resource configured on a resource of a control-resource set (CORESET) of the first message and associated with the resource of the CORESET, an SRS resource configured for the first communication node and associated with the first message, a PUCCH resource configured for the first communication node and associated with the first message, and a PUSCH resource configured for the first communication node and associated with the first message.

Figure 16:
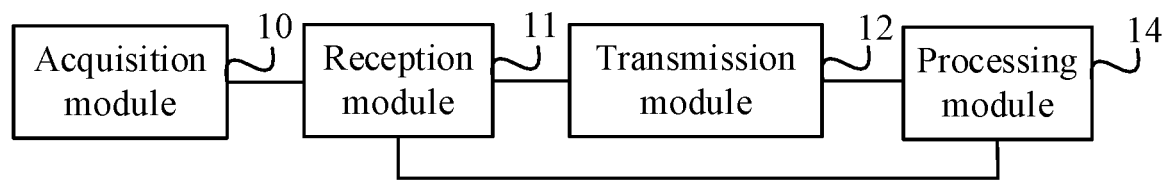
FIG. 16 is a structural diagram of another data transmission device according to an embodiment.

In one embodiment, referring to FIG. 14, FIG. 16 is a structural diagram of another data transmission device according to an embodiment. The data transmission device further includes: a processing module 14.

In one embodiment, the processing module 14 is configured to add, when the first communication node calculates CRC of the first message, L "0"s before original information to be calculated, where L is a positive integer.

In one embodiment, when the first message is received, the first communication node assumes that a DM-RS of the first message and a synchronization signal block (SSB) have a same quasi-co-location (QCL) characteristic.

In one embodiment, the transmission module 12 is configured to transmit the CSI to the second communication node according to a mask of the CSI.

In one embodiment, the transmission module 12 is configured to transmit CSI of a secondary cell defining a dormant behavior to the second communication node according to specific signaling.

In one embodiment, the transmission module 12 is configured to transmit CSI of a secondary cell configured with a temporary reference signal to the second communication node according to specific signaling.

In one embodiment, the configuration parameter indicates an initialization manner of a CSI-RS sequence, and that a PS-RNTI is used as part of an initialization seed of the CSI-RS sequence.

In one embodiment, the configuration parameter includes a time offset of the CSI-RS transmitted earlier than the first message.

In one embodiment, the configuration parameter includes a maximum number of multi-input multi-output layers for one BWP.

In one embodiment, if the configuration parameter does not include the maximum number of multi-input multi-output layers for the one BWP, the configuration parameter includes a maximum number of multi-input multi-output layers for a serving cell where the one BWP is located.

In one embodiment, a to-be-transmitted bit in the first message is scrambled according to a PS-RNTI.

In one embodiment, an encoded bit in the first message is scrambled according to a PS-RNTI.

In one embodiment, an initialization seed of a DM-RS sequence in the first message includes a PS-RNTI.

In one embodiment, a CRC bit of the first message is scrambled with a PS-RNTI.

Figure 17:
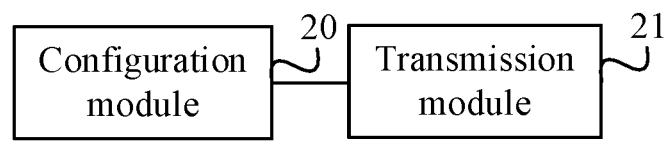
FIG. 17 is a structural diagram of another data transmission device according to an embodiment.

FIG. 17 is a structural diagram of another data transmission device according to an embodiment. The data transmission device may be configured in a second communication node. As shown in FIG. 17, the data transmission device includes an configuration module 20 and a transmission module 21.

The configuration module 20 is configured to configure a configuration parameter for a first communication node.

The transmission module 21 is configured to transmit a first message to the first communication node, where the first message includes a power saving signal or a power saving channel; and transmit a third message to the first communication node, where the third message includes a reference signal.

The data transmission device provided by the embodiment is configured to implement the data transmission method of the above embodiments. The implementation principle and effects of the data transmission device provided by the embodiment are similar and are not repeated here.

In one embodiment, the third message is triggered by the first message.

In one embodiment, a CRC bit of the first message is scrambled with a PS-RNTI.

In one embodiment, the PS-RNTI is used for initializing a sequence in sequence generation, and the sequence is used for generating the reference signal.

In one embodiment, the configuration parameter includes a DM-RS resource of the first message, and a scrambling code identity of the DM-RS.

In one embodiment, the configuration parameter indicates an initialization manner of a channel-state information reference signal (CSI-RS) sequence, and that a PS-RNTI is used as part of an initialization seed of the CSI-RS sequence.

In one embodiment, the configuration parameter includes a time offset of the CSI-RS transmitted earlier than the first message.

In one embodiment, the first message includes a CSI-RS resource configured on a resource of a control-resource set (CORESET) of the first message and associated with the resource of the CORESET, a sounding reference signal (SRS) resource configured for the first communication node and associated with the first message, a physical uplink control channel (PUCCH) resource configured for the first communication node and associated with the first message, and a physical uplink shared control channel (PUSCH) resource configured for the first communication node and associated with the first message.

An embodiment of the present application further provides a data transmission device. The data transmission device includes a processor, which is configured to, when executing a computer program, implement the method provided by any one of the above embodiments of the present application. Specifically, the data transmission device may be the first communication node provided by any one of the embodiments of the present application, or may be the second communication node provided by any one of the embodiments of the present application, which is not specifically limited in the present application.

The embodiments described below respectively provide schematic diagrams of structures in which the data transmission device is a base station and the data transmission device is a UE.

Figure 18:
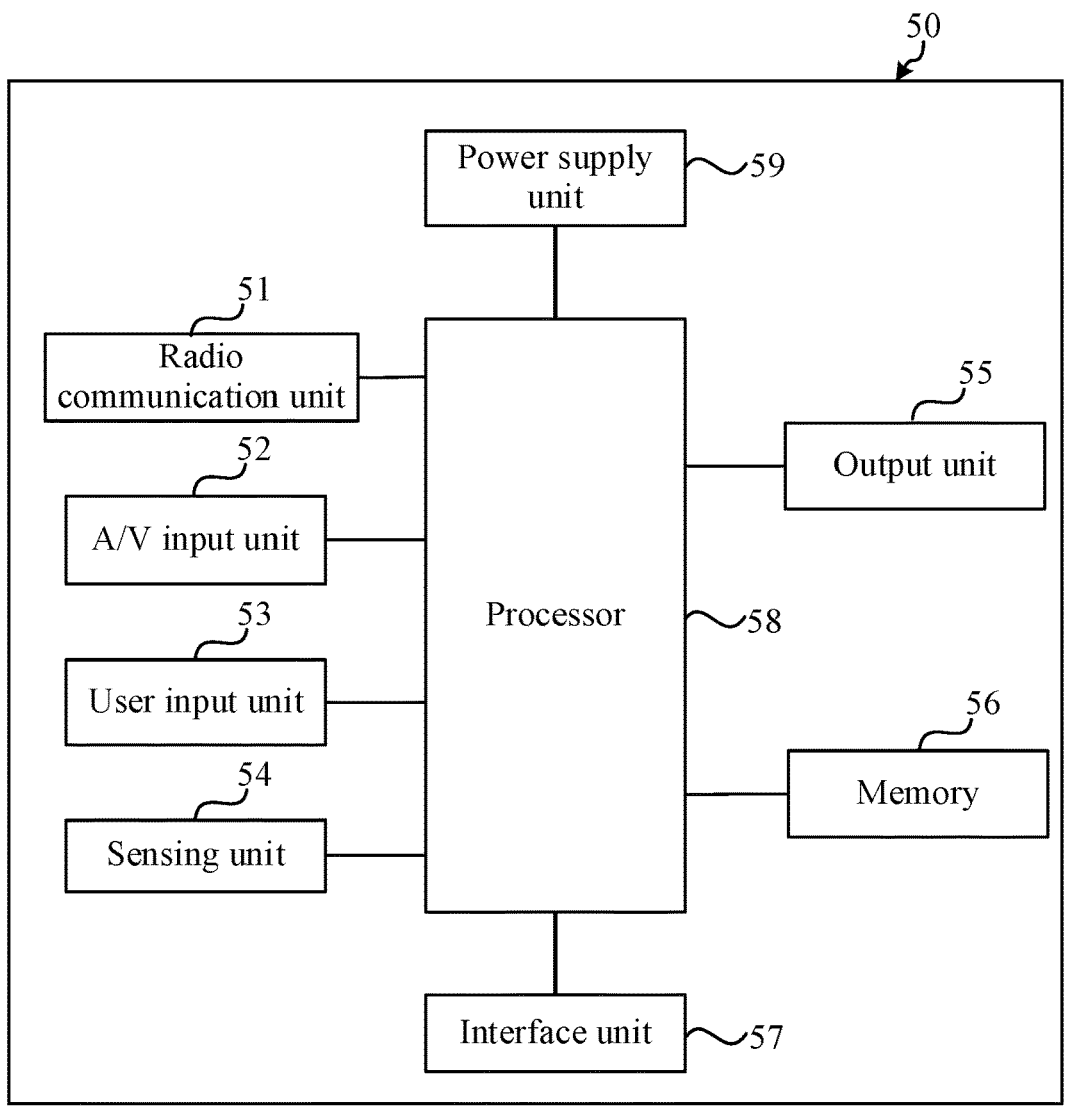
FIG. 18 is a structural diagram of a UE according to an embodiment.

FIG. 18 is a structural diagram of a UE according to an embodiment. The UE may be implemented in multiple forms. The UE in the present application includes, but is not limited to, mobile terminal devices such as a mobile phone, a smart phone, a notebook computer, a digital broadcast receiver, a personal digital assistant (PDA), a portable device (PAD), a portable multimedia player (PMP), a navigation apparatus, a vehicle-mounted terminal device, a vehicle-mounted display terminal and a vehicle-mounted electronic rearview mirror and fixed terminal devices such as a digital television (TV) and a desktop computer.

As shown in FIG. 18, the UE 50 may include a radio communication unit 51, an audio/video (A/V) input unit 52, a user input unit 53, a sensing unit 54, an output unit 55, a memory 56, an interface unit 57, a processor 58, a power supply unit 59, etc. FIG. 18 illustrates the UE including multiple assemblies; but it should be noted that it is not required to implement all the illustrated assemblies. More or fewer components may be implemented instead.

In this embodiment, the radio communication unit 51 allows wireless communication between the UE 50 and a base station or a network. The A/V input unit 52 is configured to receive audio or video signals. The user input unit 53 may generate key input data according to commands input by the user to control various operations of the UE 50. The sensing unit 54 detects, for example, the current state of the UE 50, the location of the UE 50, the presence or absence of the user's touch input to the UE 50, the orientation of the UE 50, and the movement and direction of the acceleration or deceleration of the UE 50, and generates commands or signals for controlling the operation of the UE 50. The interface unit 57 serves as an interface through which at least one external apparatus can be connected to the UE 50. The output unit 55 is configured to provide output signals in a visual, audio, and/or tactile manner. The memory 56 may store, for example, a software program for processing and controlling an operation executed by the processor 58 or may temporarily store data that has been output or is to be output. The memory 56 may include at least one type of storage medium. Moreover, the UE 50 may cooperate with a network storage apparatus that performs the storage function of the memory 56 through network connection. The processor 58 is generally configured to control the overall operation of the UE 50. The power supply unit 59 receives external power or internal power under the control of the processor 58 and provides appropriate power required for operating various elements and assemblies.

The processor 58 runs the programs stored in the memory 56 to execute at least one function application and data processing, for example, to implement the method provided by the embodiments of the present application.

Figure 19:
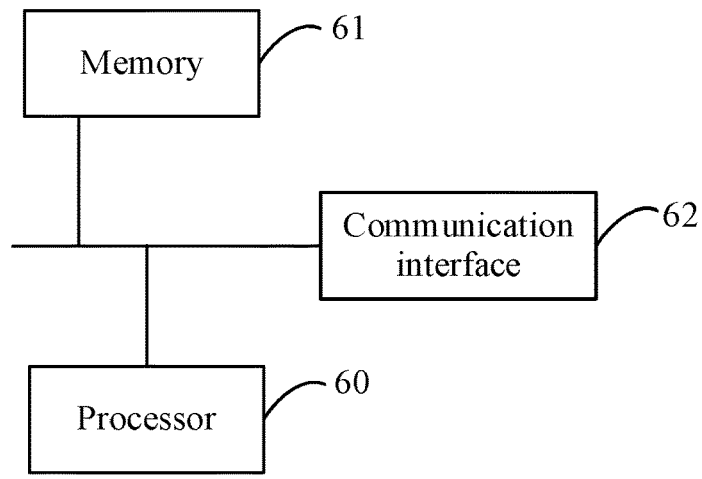
FIG. 19 is a structural diagram of a base station according to an embodiment.

FIG. 19 is a structural diagram of a base station according to an embodiment. As shown in FIG. 19, the base station includes a processor 60, a memory 61, and a communication interface 62. One or more processors 60 may be provided in the base station, and one processor 60 is used as an example in FIG. 19. The processor 60, the memory 61, and the communication interface 62 that are in the base station may be connected through a bus or in other manners. In FIG. 19, the connection through a bus is used as an example. The bus represents one or more of several types of bus structures, including a memory bus or a memory controller, a peripheral bus, an accelerated graphics port, a processor, or a local bus using any bus structure among multiple bus structures.

As a computer readable storage medium, the memory 61 may be configured to store software programs, computer executable programs and modules, such as program instructions/modules corresponding to the data transmission method in the embodiments of the present application. The processor 60 runs the software programs, instructions and modules stored in the memory 61 to execute at least one of function applications and data processing of the base station, that is, to implement the data transmission method described above.

The memory 61 may include a program storage region and a data storage region. The program storage region may store an operating system and an application program required by at least one function; and the data storage region may store data created depending on use of a terminal. Additionally, the memory 61 may include a high-speed random access memory and may further include a non-volatile memory, for example, at least one magnetic disk memory element, flash memory element or other non-volatile solid-state memory element. In some examples, the memory 61 may include memories that are remotely disposed with respect to the processor 60. These remote memories may be connected to the base station via a network. Examples of the preceding network include, but are not limited to, the Internet, an intranet, a local area network, a mobile communication network, and a combination thereof.

The communications interface 62 may be configured to receive and transmit data.

An embodiment of the present application further provides a computer-readable storage medium. The computer-readable storage medium is configured to store computer programs which, when executed by a processor, implement the method provided by any one of the embodiments of the present application.

The computer storage medium in embodiments of the present application may use any combination of one or more computer-readable media. The computer-readable media may be computer-readable signal media or computer-readable storage media. The computer-readable storage medium may be, but is not limited to, an electrical, magnetic, optical, electromagnetic, infrared, or semiconductor system, apparatus, or element, or any combination thereof. The computer-readable storage medium includes (a non-exhaustive list): an electrical connection having one or more wires, a portable computer disk, a hard disk, a random access memory (RAM), a read-only memory (ROM), an electrically erasable programmable read-only memory (EPROM), a flash memory, an optical fiber, a portable compact disc read-only memory (CD-ROM), an optical memory device, a magnetic memory device, or any suitable combination thereof. In this application, the computer-readable storage medium may be any tangible medium including or storing a program. The program may be used by or used in conjunction with an instruction execution system, apparatus, or element.

The computer-readable signal medium may include a data signal propagated in a baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than a computer-readable storage medium. The computer-readable medium may send, propagate, or transmit the program used by or used in conjunction with the instruction execution system, apparatus, or element.

The program codes included on the computer-readable medium may be transmitted on any suitable medium including, and not limited to, a wireless medium, a wire, an optical cable, the radio frequency (RF), or any suitable combination thereof.

Computer program codes for performing the operations of the present disclosure may be written in one or more programming languages or a combination of multiple programming languages. The programming languages include object-oriented programming languages such as Java, Smalltalk, C++, Ruby, and Go and conventional procedural programming languages such as "C" language or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

It is to be understood by those skilled in the art that the term "user terminal" covers any suitable type of radio UE, for example, a mobile phone, a portable data processing device, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type appropriate for the local technical environment and may be implemented by using any appropriate data storage technology, such as, but not limited to, a read-only memory (ROM), a random access memory (RAM), an optical storage apparatus and system (a digital video disc (DVD) or a compact disk (CD)), and the like. Computer-readable media may include non-transitory storage media. The data processor may be of any type suitable to the local technical environment, such as, but is not limited to, a general purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. A data transmission method in a fifth-generation (5G) mobile communication network, comprising:
    configuring, by a second communication node, a configuration parameter for a first communication node;
    transmitting, by the second communication node, a first message to the first communication node, wherein the first message comprises a power saving signal, wherein the configuration parameter is configured to make the first communication node checking the power saving signal in a first time period prior to a start of a discontinuous reception; and
    transmitting, by the second communication node, a second message to the first communication node, wherein the second message comprises a reference signal;
    wherein a first situation arises during the data transmission method in which for one bandwidth part (BWP), the configuration parameter does not comprise a number of multi-input multi-output layers, and the first communication node applies to the one BWP a value of a maximum number of multi-input multi-output layers for a serving cell, and
    wherein a second situation arises during the data transmission method in which for the one BWP, the configuration parameter comprises a maximum number of multi-input multi-output layers, and the maximum number of multi-input multi-output layers comprised by the configuration parameter is applied to the one BWP.

2. The data transmission method of claim 1, wherein a cyclic redundancy check (CRC) bit of the first message is scrambled according to a power saving radio network temporary identifier (PS-RNTI).

3. The data transmission method of claim 1, wherein the configuration parameter comprises a maximum number of multi-input multi-output layers for one BWP.

4. The data transmission method of claim 2, further comprising:
    scrambling the CRC bit of the first message according to the PS-RNTI outside of active time.

5. The data transmission method of claim 2, wherein the first time period is 1 to 20 slots.

6. A data transmission method in a fifth-generation (5G) mobile communication network, comprising:
    acquiring, by a first communication node, a configuration parameter configured by a second communication node for the first communication node;
    receiving, by the first communication node, a first message transmitted by the second communication node, wherein the first message comprises a power saving signal, wherein the configuration parameter is configured to make the first communication node checking the power saving signal in a first time period prior to a start of a discontinuous reception; and
    receiving, by the first communication node, a second message from the second communication node, wherein the second message comprises a reference signal;
    wherein a first situation arises during the data transmission method in which for one bandwidth part (BWP), the configuration parameter does not comprise a number of multi-input multi-output layers, and the first communication node applies to the one BWP a value of a maximum number of multi-input multi-output layers for a serving cell, and
    wherein a second situation arises during the data transmission method in which for the one BWP, the configuration parameter comprises a maximum number of multi-input multi-output layers, and the maximum number of multi-input multi-output layers comprised by the configuration parameter is applied to the one BWP.

7. The data transmission method of claim 6, wherein a cyclic redundancy check (CRC) bit of the first message is scrambled according to a power saving radio network temporary identifier (PS-RNTI).

8. The data transmission method of claim 6, wherein the configuration parameter comprises a maximum number of multi-input multi-output layers for one BWP.

9. The data transmission method of claim 7, wherein the CRC bit of the first message is scrambled according to the PS-RNTI outside of active time.

10. The data transmission method of claim 6, wherein the first time period is 1 to 20 slots.

11. A data transmission device in a fifth-generation (5G) mobile communication network, comprising:
    a processor, which is configured to:
        configure a configuration parameter for a first communication node;
        transmit, via a transmitter, a first message to the first communication node, wherein the first message comprises a power saving signal, wherein the configuration parameter is configured to make the first communication node checking the power saving signal in a first time period prior to a start of a discontinuous reception; and
        transmit, via the transmitter, a second message to the first communication node, wherein the second message comprises a reference signal;
    wherein a first situation arises in which for one bandwidth part (BWP), the configuration parameter does not comprise number of multi-input multi-output layers, and the first communication node applies to the one BWP a value of a maximum number of multi-input multi-output layers for a serving cell, and
    wherein a second situation arises in which for the one BWP, the configuration parameter comprises a maximum number of multi-input multi-output layers, and the maximum number of multi-input multi-output layers comprised by the configuration parameter is applied to the one BWP.

12. The data transmission device of claim 11, wherein the processor is configured to scramble a cyclic redundancy check (CRC) bit of the first message according to a power saving radio network temporary identifier (PS-RNTI).

13. The data transmission device of claim 11, wherein the configuration parameter comprises a maximum number of multi-input multi-output layers for one BWP.

14. The data transmission device of claim 12, wherein the processor is further configured to scramble the CRC bit of the first message with the PS-RNTI outside of active time.

15. The data transmission device of claim 11, wherein the first time period is 1 to 20 slots.

16. A data transmission device in a fifth-generation (5G) mobile communication network, comprising:
a processor which is configured to:
acquire a configuration parameter configured by a second communication node;
receive, via a receiver, a first message transmitted by the second communication node, wherein the first message comprises a power saving signal, wherein the configuration parameter is configured to make the data transmission device checking the power saving signal in a first time period prior to a start of a discontinuous reception; and
receive, via the receiver, a second message from the second communication node, wherein the second message comprises a reference signal;
wherein a first situation arises in which for one bandwidth part (BWP), the configuration parameter does not comprise a number of multi-input multi-output layers, and the data transmission device applies to the one BWP a value of a maximum number of multi-input multi-output layers for a serving cell, and
wherein a second situation arises in which for the one BWP, the configuration parameter comprises a maximum number of multi-input multi-output layers, and the maximum number of multi-input multi-output layers comprised by the configuration parameter is applied to the one BWP.

17. The data transmission device of claim 16, wherein a cyclic redundancy check (CRC) bit of the first message is scrambled according to a power saving radio network temporary identifier (PS-RNTI).

18. The data transmission device of claim 16, wherein the configuration parameter comprises a maximum number of multi-input multi-output layers for one BWP.

19. The data transmission device of claim 17, wherein the CRC bit of the first message is scrambled according to the PS-RNTI outside of active time.

20. The data transmission device of claim 16, wherein the first time period is 1 to 20 slots.

21. A non-transitory computer-readable storage medium configured to store a computer program which, when executed by at least one processor, implements the data transmission method of claim 1.

* * * * *